United States Patent
Albano et al.

(10) Patent No.: US 12,401,042 B2
(45) Date of Patent: Aug. 26, 2025

(54) NANO-ENGINEERED COATINGS FOR ANODE ACTIVE MATERIALS, CATHODE ACTIVE MATERIALS, AND SOLID-STATE ELECTROLYTES AND METHODS OF MAKING BATTERIES CONTAINING NANO-ENGINEERED COATINGS

(71) Applicant: Forge Nano Inc., Thornton, CO (US)

(72) Inventors: Fabio Albano, Ann Arbor, MI (US); Kevin Dahlberg, Taylor, MI (US); Erik Anderson, Troy, MI (US); Subhash Dhar, Bloomfield Hills, MI (US); Srinivasan Venkatesan, Bloomfield Township, MI (US); James Trevey, Superior, CO (US); David M. King, Canton, MA (US); Paul R. Lichty, Louisville, CO (US)

(73) Assignee: Forge Nano Inc., Thornton, CO (US)

( * ) Notice: Subject to any disclaimer, the term of this patent is extended or adjusted under 35 U.S.C. 154(b) by 840 days.

(21) Appl. No.: 15/170,374

(22) Filed: Jun. 1, 2016

(65) Prior Publication Data
US 2016/0351973 A1 Dec. 1, 2016

Related U.S. Application Data

(63) Continuation-in-part of application No. 15/167,453, filed on May 27, 2016, which is a continuation-in-part of application No. 14/727,834, filed on Jun. 1, 2015.
(Continued)

(51) Int. Cl.
*H01M 10/42* (2006.01)
*H01M 4/13* (2010.01)
(Continued)

(52) U.S. Cl.
CPC ............. *H01M 4/628* (2013.01); *H01M 4/13* (2013.01); *H01M 4/366* (2013.01);
(Continued)

(58) Field of Classification Search
CPC .......................... H01M 10/0562; H01M 4/366
See application file for complete search history.

(56) References Cited

U.S. PATENT DOCUMENTS

| | | | |
|---|---|---|---|
| 6,613,383 B1 | 9/2003 | George et al. | |
| 6,713,177 B2 | 3/2004 | George et al. | |

(Continued)

FOREIGN PATENT DOCUMENTS

| | | |
|---|---|---|
| CA | 2674783 A1 | 6/2010 |
| CN | 102244231 A | 11/2011 |

(Continued)

OTHER PUBLICATIONS

Biwei Xiao et al., "Unravelling the Role of Electrochemically Active FePO$_4$ Coating by Atomic Layer Deposition for Increased High-Voltage Stability of LiNi$_{0.5}$Mn$_{1.}$O$_4$ Cathode Material," Adv. Sci. (2015) pp. 1500022-1500027.

(Continued)

*Primary Examiner* — Miriam Stagg
*Assistant Examiner* — Brent C Thomas
(74) *Attorney, Agent, or Firm* — Frank Rosenberg

(57) ABSTRACT

The present disclosure relates to a nano-engineered coating for cathode active materials, anode active materials, and solid state electrolyte materials for reducing corrosion and enhancing cycle life of a battery, and processes for applying the disclosed coating. Also disclosed is a solid state battery including a solid electrolyte layer having a solid electrolyte particle coated by a protective coating with a thickness of 100 nm or less. The protective coating is obtained by atomic layer deposition (ALD) or molecular layer deposition (Continued)

(MLD). Further disclosed is a solid electrolyte layer for a solid state battery, including a porous scaffold coated by a first, solid electrolyte coating. The solid electrolyte coating has a thickness of 60 µm or less and a weight loading of at least 20 wt. % (or preferable at least 40 wt. % or at least 50 wt. %). Further disclosed is a cathode composite layer for a solid state battery.

26 Claims, 27 Drawing Sheets

Related U.S. Application Data

(60) Provisional application No. 62/312,227, filed on Mar. 23, 2016.

(51) Int. Cl.
  *H01M 4/36* (2006.01)
  *H01M 4/62* (2006.01)
  *H01M 10/0525* (2010.01)
  *H01M 10/056* (2010.01)
  *H01M 10/0562* (2010.01)

(52) U.S. Cl.
  CPC ..... *H01M 10/0525* (2013.01); *H01M 10/056* (2013.01); *H01M 10/0562* (2013.01)

(56) References Cited

U.S. PATENT DOCUMENTS

| | | | |
|---|---|---|---|
| 6,911,280 | B1 | 6/2005 | De Jonghe et al. |
| 6,913,827 | B2 | 7/2005 | George et al. |
| 6,958,174 | B1 | 10/2005 | Klaus et al. |
| 7,081,267 | B2 | 7/2006 | Yadav |
| 7,081,367 | B2 | 7/2006 | Yadav |
| 7,132,697 | B2 | 11/2006 | Weimer et al. |
| 7,211,236 | B2 | 5/2007 | Stark et al. |
| 7,396,862 | B2 | 7/2008 | Weimer et al. |
| 7,413,982 | B2 | 8/2008 | Levy |
| 7,426,067 | B1 | 9/2008 | Bright et al. |
| 7,553,686 | B2 | 6/2009 | George et al. |
| 7,658,340 | B2 | 2/2010 | Pfeffer et al. |
| 7,833,437 | B2 | 11/2010 | Fan et al. |
| 8,124,179 | B2 | 2/2012 | Nilsen et al. |
| 8,133,531 | B2 | 3/2012 | King et al. |
| 8,163,336 | B2 | 4/2012 | Weimer et al. |
| 8,187,731 | B2 | 5/2012 | Weimer et al. |
| 8,439,283 | B2 | 5/2013 | Pfeffer et al. |
| 8,531,090 | B2 | 9/2013 | Spencer, II |
| 8,637,156 | B2 | 1/2014 | Weimer et al. |
| 8,735,003 | B2 | 5/2014 | Kim et al. |
| 8,808,901 | B2 | 8/2014 | Wang et al. |
| 8,894,723 | B2 | 11/2014 | Nilsen et al. |
| 8,956,761 | B2 | 2/2015 | Reynolds et al. |
| 8,993,051 | B2 | 3/2015 | Kelder et al. |
| 9,005,816 | B2 | 4/2015 | Amine et al. |
| 9,059,451 | B2 | 6/2015 | Xiao et al. |
| 9,093,707 | B2 | 7/2015 | Lee et al. |
| 9,107,851 | B2 | 8/2015 | Dave et al. |
| 9,243,330 | B2 | 1/2016 | Granneman et al. |
| 9,246,164 | B2 | 1/2016 | Lu et al. |
| 9,825,283 | B2 | 11/2017 | Kim |
| 10,230,099 | B2 | 3/2019 | Uchiyama |
| 2001/0041294 | A1 | 11/2001 | Chu et al. |
| 2003/0054250 | A1 | 3/2003 | Kweon et al. |
| 2004/0194691 | A1 | 10/2004 | George et al. |
| 2007/0004590 | A1 | 1/2007 | Furuta |
| 2007/0281089 | A1 | 12/2007 | Heller et al. |
| 2008/0057386 | A1 | 3/2008 | Visco et al. |
| 2008/0103204 | A1 | 5/2008 | Weller et al. |
| 2008/0111508 | A1 | 5/2008 | Dasgupta et al. |
| 2008/0221806 | A1 | 9/2008 | Bryant et al. |
| 2009/0214927 | A1 | 8/2009 | Dadheech et al. |
| 2010/0035152 | A1 | 2/2010 | Sastry et al. |
| 2010/0109130 | A1 | 5/2010 | Pinna et al. |
| 2010/0123993 | A1 | 5/2010 | Laor |
| 2010/0178481 | A1 | 7/2010 | George et al. |
| 2010/0203388 | A1 | 8/2010 | Kim et al. |
| 2011/0104553 | A1 | 5/2011 | Pol et al. |
| 2011/0236575 | A1 | 9/2011 | King et al. |
| 2011/0311882 | A1 | 12/2011 | Kim et al. |
| 2012/0077082 | A1 | 3/2012 | Se-Hee et al. |
| 2012/0094213 | A1 | 4/2012 | Ha et al. |
| 2012/0121932 | A1 | 5/2012 | George et al. |
| 2012/0145953 | A1 | 6/2012 | Pallem et al. |
| 2012/0161456 | A1 | 6/2012 | Riedmayr et al. |
| 2012/0301778 | A1 | 11/2012 | Trevey et al. |
| 2013/0164628 | A1 | 6/2013 | Visco et al. |
| 2013/0177808 | A1 | 7/2013 | Wang et al. |
| 2013/0224632 | A1 | 8/2013 | Roumi |
| 2013/0244063 | A1 | 9/2013 | Dhar et al. |
| 2013/0266842 | A1 | 10/2013 | Woehrle et al. |
| 2013/0280581 | A1* | 10/2013 | Sun .......... H01M 10/0562 429/127 |
| 2014/0091308 | A1* | 4/2014 | Dasgupta .......... H01L 29/2003 257/76 |
| 2014/0106186 | A1 | 4/2014 | Dudney et al. |
| 2014/0162132 | A1 | 6/2014 | Ishii et al. |
| 2014/0212767 | A1* | 7/2014 | Suzuki .......... H01M 10/0525 429/304 |
| 2014/0272578 | A1 | 9/2014 | Xiao et al. |
| 2015/0037660 | A1 | 2/2015 | Bedjaoui et al. |
| 2015/0056517 | A1 | 2/2015 | Zhou et al. |
| 2015/0064537 | A1* | 3/2015 | Christensen ...... H01M 10/0562 429/126 |
| 2015/0086865 | A1* | 3/2015 | Oda .......... H01M 10/052 429/211 |
| 2015/0140442 | A1 | 5/2015 | Cyman et al. |
| 2015/0152549 | A1 | 6/2015 | King et al. |
| 2015/0162606 | A1 | 6/2015 | Kelder et al. |
| 2015/0171431 | A1* | 6/2015 | Yamada .......... H01M 4/70 429/163 |
| 2015/0180023 | A1* | 6/2015 | Xiao .......... H01M 4/366 429/231 |
| 2015/0194701 | A1 | 7/2015 | Kim et al. |
| 2015/0225853 | A1 | 8/2015 | Mantymaki et al. |
| 2015/0270532 | A1 | 9/2015 | Sastry et al. |
| 2015/0357650 | A1 | 12/2015 | Lakshmanan et al. |
| 2016/0351973 | A1 | 12/2016 | Albano et al. |

FOREIGN PATENT DOCUMENTS

| | | |
|---|---|---|
| CN | 103078134 A | 5/2013 |
| CN | 104241614 A | 12/2014 |
| EP | 2 463 940 A1 | 6/2012 |
| EP | 3 304 635 A4 | 4/2018 |
| JP | 2008-103204 A | 5/2008 |
| JP | 2009-181901 A | 8/2009 |
| JP | 2012-094445 A | 5/2012 |
| JP | 2012-160379 A | 8/2012 |
| JP | 2013-137947 A | 7/2013 |
| JP | 2013-143375 A | 7/2013 |
| JP | 2014-041720 A | 3/2014 |
| JP | 2014-116111 A | 6/2014 |
| JP | 2014-170656 A | 9/2014 |
| JP | 2015-500558 A | 1/2015 |
| KR | 10-2007-0010961 A | 1/2007 |
| KR | 10-2013-0130862 A | 12/2013 |
| KR | 10-2014-0093529 A | 7/2014 |
| KR | 10-2014-0116274 A | 10/2014 |
| WO | WO 99/01902 | 1/1999 |
| WO | WO 2011/098233 A2 | 8/2011 |
| WO | WO 2013/011297 A1 | 1/2013 |
| WO | WO 2015/030407 | 3/2015 |
| WO | WO 2015/106769 A1 | 7/2015 |
| WO | WO 2015/153584 | 10/2015 |
| WO | WO 2015/189284 A1 | 12/2015 |
| WO | WO 2015/197589 A1 | 12/2015 |
| WO | WO-2016/196688 A1 | 12/2016 |

(56) References Cited

FOREIGN PATENT DOCUMENTS

OTHER PUBLICATIONS

Chunmei Ban et al., "Atomic layer deposition of amorphous $TiO_2$ on graphene as an anode for Li-ion batteries," Nanotechnology 24 (2013) 424002 (6pp).
Daniela Molina Piper et al., "Reversible High-Capacity Si Nanocomposite Anodes for Lithium-ion Batteries Enabled by Molecular Layer Deposition," Advanced Materials (2014), pp. 1596-1601.
Dongjoon et al, "Extended Lithium Titanate Cycling Potential Window with Near Zero Capacity Loss," Electrochemistry Communications 13 (2011), pp. 796-799.
Eunae Kang et al., "$Fe_3O_4$ Nanoparticles Confined in Mesocellular Carbon Foam for High Performance Anode Materials for Lithium-Ion Batteries," Advanced Functional Materials (2011), vol. 21, pp. 2430-2438.
Feng Lin et al., "Chemical and Structural Stability of Lithium-Ion Battery Electrode Materials under Electron Beam," Scientific Reports, Jul. 16, 2014.
Hsin-Yi Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources 233 (2013), pp. 1-5.
Hui Liu et al, "lithium-Rich $Li_{1.2}Ni_{0.13}Co_{0.13}Mn_{0.54}O_2$ Oxide Coated by $Li_3PO_4$ and Carbon Nanocomposite Layers as High Performance Cathode Materials for Lithium Ion Batteries," Journal of Materials Chemistry A (2015).
Hyea Kim et al., "Plasma-Enhanced Atomic Layer Deposition of Ultrathin Oxide Coatings for Stabilized Lithium-Sulfur Batteries," Advanced Energy Materials (2013), vol. 3, pp. 1308-1315.
Hyung-Man Cho et al., "Effect of Surface Modification on Nano-Structured $LiNi_{0.5}Mn_{1.5}O_4$ Spinel Materials," ACS Apl. Mater. Interfaces (2015) , pp. A-I (9 pages).
Indranil Lahiri et al., "Ultrathin alumina-coated carbon nanotubes as an anode for high capacity Li-ion batteries," Journal of Materials Chemistry (2011), vol. 21, pp. 13621-13626.
Ira Bloom, et al, "Effect of Interface Modifications on Voltage Fade in $0.5Li_2MnO_3$—$0.5LiNi_{0.375}Co_{0.25})_2$ Cathode Materials," Journal of Power Sources 249 (2014) pp. 509-514.
Jagjit Nanda, "Studies on Lithium Manganese Rich MNC Composite Cathodes," Oack Ridge National Laboratory, Project ID #ES106, May 16, 2013.
Ji Woo Kim et al., "Unexpected High Power Performance of Atomic Layer Deposition Coated $Li[Ni_{1/3}Mn_{1/3}Co_{1/3}])_2$ Cathodes," Journal of Power Sources 254 (2014), pp. 190-197.
Jian Liu et al., "Rational Design of Atomic-Layer-Deposited $LiFePO_4$ as a High-Performance Cathode for Lithium-Ion Batteries," Advanced Materials, vol. 26, No. 37, Oct. 8, 2014, pp. 6472-6477.
Jian Liu et al., "Ultrathin atomic layer deposited $ZrO_2$ coating to enhance the electrochemical performance of $Li_4Ti_5O_{12}$ as an anode material," Electrochimica Acta 93 (2013), pp. 195-201.
Jian-Hong Lee et al., "The effect of $TiO_2$ coating on the electrochemical performance of ZnO nanorod as the anode material for lithium-ion battery," Appl. Phys. A. (2011), vol. 102, pp. 545-550.
Jianming Zheng et al, "Mitigating Voltage Fade in Cathode Materials by Improving the Atonic Level Uniformity of Elemental Distribution," Nano Letters (2014), pp. 2628-2635.
Jianqing Zhao et al., "Atomic layer deposition of epitaxial $ZrO_2$ coating on $LiMn_2O_4$ nanoparticles for high-rate lithium ion batteries at elevated temperature," Nano Energy (2013) vol. 2, pp. 882-889.
Juchuan Li et al, "Artificial Solid Electrolyte Interphase to Address the Electrochemical Degradation of Silicon Electrodes," Applied Materials & Interfaces, Jun. 13, 2014.
Jun Lu et al, "Effectively Suppressing Dissolution of Manganese from Spinel Lithium Manganate Via a Nanoscale Surface-doping Approach," Nature Communications, Dec. 16, 2014.
Jyh-Tsung Lee et al, "Low-temperature Atomic Layer Deposited $Al_2O_3$ Thin Film on Layer Structure Cathode for Enhanced Cycleability in Lithium-ion Batteries," Electrochimica Acta 55 (2010), pp. 4002-4006.
Kevin Leung et al, "Using Atomic Layer Deposition to Hinder Solvent Decomposition in Lithium Ion Batteries: First-Principles Modeling and Experimental Studies," Journal of the American Chemical Society (2011).
Kyu Tae Lee et al, "Roles of Surface Chemistry on Safety and Electrochemistry in Lithium Ion Batteries," Interdisciplinary School of Green Energy, Ulsan Nat'l Institute of Science and Technology (UNIST), Ulsan 689-798, Korea (2011).
Leah A. Riley et al., "Electrochemical effects of ALD surface modification on combustion synthesized $LiNi_{1/3}Mn_{1/3}O_2$ as a layered-cathode material," Journal of Power Sources 196 (2011) pp. 3317-3324.
Meng-Lun Lee et al, Atomic Layer Deposition of $TiO_2$ on Negative Electrode for Lithium Ion Batteries,: Journal of Power Sources (2012), pp. 1-7.
Nulati Yesibolati et al., "$SnO_2$ Anode Surface Passivation by Atomic Layer Deposited $HfO_2$ Improves Li-Ion Battery Performance," Small (2014), vol. 10, No. 14, pp. 2849-2858.
Pilgun Oh, "Superior Long-Term Energy Retention and Volumetric Energy Density for Li-Rich Cathode Materials," Nano Letters (2014) pp. 5965-5972.
Qi-Hui Wu et al., "An Alumina-Coated $Fe_3O_4$-Reduced Graphene Oxide Composite Electrode as a Stable Anode for Lithium-ion Battery," Electrochimica Acta 156 (2015), pp. 147-153.
Raymond R. Unocic et al, "Direct Visualization of Solid Electrolyte Interphase Formation in Lithium-Ion Batteries with In Situ Electrochemical Transmission Electron Microscopy," Microscopy and Microanalysis (2014), pp. 1029-1037.
Renske Beetstra et al., "Improved Li-ion Battery Performance by Coating Cathode Nano-Particles Using Atomic Layer Deposition," Refereed Proceedings of the $12^{th}$ International Conference on Fluidization—New Horizons in Fluidization Engineering (2007) pp. 368-376.
V. Aravindan et al., "Atomic layer deposited (ALD)$SnO_2$ anodes with exceptional cycleability for Li-ion batteries," Nano Energy (2013), http://dx.doi.org/10.1016/j.nanoen.2012.12.007.
Xiangbo Meng et al., "Emerging Applications of Atomic Layer Deposition for Lithium-Ion Battery Studies," Advanced Materials, (2012).
Xiaogang Han et al., "Atomic-Layer-Deposition Oxide Nanoglue for Sodium Ion Batteries," Nano Letters (2014), vol. 14, pp. 139-147 (29 pages).
Xifei Li et al., "Significant impact on cathode performance lithium-ion batteries by precisely controlled metal oxide nanocoatings via atomic layer deposition," Journal of Power Sources 247 (2014), pp. 57-69.
Xifei Li et al., "Tin Oxide with Controlled Morphology and Crystallinity by Atomic Layer Deposition onto Graphene Nanosheets for Enhanced Lithium Storage," Advanced Functional Materials (2012), vol. 22, pp. 1647-1654.
Xingcheng Xiao et al, "Ultrathin Multifunctional Oxide Coatings for Lithium Ion Batteries," Advanced Materials, (2011), vol. 23, pp. 3911-3915.
Xingcheng Xiao, "Atomic Layer Coating to Mitigate Capacity Fading Associated with Manganese Dissolution in Lithium Ion Batteries," Electrochemistry Communications 32 (2013), pp. 31-34.
Yan Li et al, "Synthesis Characterization and Electrochemical Performance of $AlF_3$-coated $Li_{1.2}(Mn_{0.54}Ni_{0.16}Co_{0.08})O_2$ as Cathode for Li-ion Battery," Science Press, Trans. Nonferrous Met. Soc. China 24 (2014), pp. 3534-3540.
Yoon S. Jung et al., "Enhanced Stability of $LiCoO_2$ Cathodes in Lithium-ion Batteries Using Surface Modification by Atomic Layer Deposition," Journal of the Korean Ceramic Society (2010), vol. 47, No. 1, pp. 61-65.
Yoon S. Jung et al., "Enhanced Stability of $LiCoO_2$ Cathodes in Lithium-Ion Batteries Using Surface Modification by Atomic Layer Deposition," Journal of the Electrochemical Society (2010), vol. 157, pp. A75- A81.
Yoon Seok Jung et al, "Effects of Atomic Layer Deposition of $Al_2O_3$ on the $Li[Li_{0.20}Mn_{0.54}Ni_{0.13}]O_2$ Cathode for Lithium-Ion Batteries," Journal of the Electrochemical Society (2011), vol. 158, Issue 12, pp. A1298-A1302.

(56) References Cited

OTHER PUBLICATIONS

Yoon Seok Jung et al, "Unexpected Improved Performance of ALD Coated $LiCoO_2$/Graphite Li-ion Batteries," Advanced Energy Materials, (2012).
Yoon Seok Jung et al., "Ultrathin Direct Atomic Layer Deposition on Composite Electrodes for Highly Durable and Safe Li-Ion Batteries," Advanced Materials (2010), vol. 22, pp. 2172-2176.
Yu He et al., "Alumina-Coated Patterned Amorphous Silicon as the Anode for a Lithium-Ion Battery with High Coulombic Efficiency," Advanced Materials (2011), vol. 23, pp. 4938-4941.
Office Action from European Application EP 16 804 367.7 dated Jun. 10, 2021.
Office Action from Australian Application AU 2019240681 dated Nov. 11, 2020.
Office Action from Canadian Application CA 2987938 dated Jul. 30, 2021.
3rd Office Action from Chinese Application CN 201680032297.7 dated Jul. 13, 2021.
Translation of 3rd Office Action from Chinese Application CN 201680032297.7 dated Jul. 13, 2021.
Second Office Action from Korean Application KR 10-2020-7002674 dated Nov. 23, 2020.
Translation of Second Office Action from Korean Application KR 10-2020-7002674 dated Nov. 23, 2020.
Third Office Action from Korean Application KR 10-2020-7002674 dated Feb. 2, 2021.
Translation of Third Office Action from Korean Application KR 10-2020-7002674 dated dated Feb. 2, 2021.
Fourth Office Action for Japanese Patent Application No. JP 2017-562061, mailed Apr. 6, 2021.
Translation of Fourth Office Action for Japanese Patent Application No. JP 2017-562061, mailed Apr. 6, 2021.
Machine translation of Description of CN 102244231 A.
Machine translation of Description of CN 104241614.
Machine translation of Description of CN 103078134 A.
Third Office Action from Canadian Application CA 2987938 dated Mar. 14, 2022.
First Office Action in Korean Application No. 10-2022-7040748 dated Jan. 3, 2023.
Translation of First Office Action in Korean Application No. 10-2022-7040748 dated Jan. 3, 2023.
Second Office Action in Korean Application No. 10-2022-7040748 dated Nov. 27, 2023.
Translation of Second Office Action in Korean Application No. 10-2022-7040748 dated Nov. 27, 2023.
Kong, J. C. et al. "Ultrathin ZnO coating for improved electrochemical performance of $LiNi0.5Co0.2Mn0.3O2$ cathode material", Journal of Power Sources 266 (2014), pp. 433-439.
Translation of KR 10-2007-0010961 A.
Office Action in Australian Patent Application No. 2022201282 dated Apr. 16, 2024.
Third Office Action in Korean Application No. 10-2022-7040748 dated Nov. 29, 2024.
Translation of Third Office Action in Korean Application No. 10-2022-7040748 dated Nov. 29, 2024.
Office Action from European Application 16804367.7 dated Aug. 2, 2024.
First Office Action in Canadian Application No. 3,208,246 dated Sep. 12, 2024.

* cited by examiner

NANO-ENGINEERED COATINGS FOR ANODE ACTIVE MATERIALS, CATHODE ACTIVE MATERIALS, AND SOLID-STATE ELECTROLYTES AND METHODS OF MAKING BATTERIES CONTAINING NANO-ENGINEERED COATINGS

CROSS REFERENCE TO RELATED APPLICATION(S)

This is a continuation-in-part application of U.S. application Ser. No. 15/167,453, filed May 27, 2016, which is a continuation-in-part application of U.S. application Ser. No. 14/727,834, filed Jun. 1, 2015. This application also claims priority to U.S. Provisional Application No. 62/312,227, filed Mar. 23, 2016. The entire content of each of the above-identified applications is incorporated herein by reference.

TECHNICAL FIELD

Embodiments of the present disclosure relate generally to electrochemical cells. Particularly, embodiments of the present disclosure relate to batteries having nano-engineered coatings on certain of their constituent materials. More particularly, embodiments of the present disclosure relate to nano-engineered coatings for anode active materials, cathode active materials, and solid state electrolytes, and methods of manufacturing batteries containing these coatings.

BACKGROUND

Modern batteries suffer from various phenomena that may degrade performance. Degradation may affect resistance, the amount of charge-storing ions, the number of ion-storage sites in electrodes, the nature of ion-storage sites in electrodes, the amount of electrolyte, and, ultimately, the battery's capacity, power, and voltage. Components of resistance may be gas formation pockets between layers (i.e., delamination), lack of charge-storing ion salt in electrolyte, reduced amount of electrolyte components (i.e., dryout), electrode mechanical degradation, cathode solid-electrolyte-interphase (SEI) or surface phase transformation, and anode SEI.

Liquid-electrolyte batteries may be made by forming electrodes by applying a slurry of active material on a current collector, forming two electrodes of opposite polarity. The cell may be formed as a sandwich of separator and electrolyte disposed between the two electrodes of opposite polarity. A cathode may be formed by coating an aluminum current collector with an active material. An anode may be formed by coating a copper current collector with an active material. Typically, the active material particles are not coated before the slurry is applied to the current collectors to form the electrodes. Variations may include mono-polar, bi-polar, and pseudo-bi-polar geometries.

Solid-state electrolyte batteries may be made by building up layers of materials sequentially. For example, a current collector layer may be deposited, followed by depositing a cathode layer, followed by depositing a solid-state electrolyte layer, followed by depositing an anode layer, followed by depositing a second current collector layer, followed by encapsulation of the cell assembly. Again, the active materials are not typically coated before depositing the various layers. Coating of active materials and solid state electrolyte is not suggested or taught in the art. Rather, persons of ordinary skill strive to reduce internal resistance and would understand that coating active materials or solid-state electrolyte would tend to increase resistance and would have been thought to be counterproductive.

As with liquid-electrolyte batteries, variations may include mono-polar, bi-polar, and pseudo-bi-polar geometries.

In either a liquid-electrolyte or solid-electrolyte configuration, various side-reactions may increase the resistance of the materials. For example, when the materials are exposed to air or oxygen, they may oxidize, creating areas of higher resistance. These areas of higher resistance may migrate through the materials, increasing resistance and reducing capacity and cycle life of the battery.

In the positive electrode, diffusion polarization barriers may form as a result of these oxidation reactions. Similarly, in the electrolyte, diffusion polarization barriers may form. In the negative electrode, solid-electrolyte-interphase (SEI) layers may form. For ease of reference in this disclosure, "diffusion polarization barriers," "concentration polarization layers," and "solid-electrolyte interphase layers," are referred to as "solid-electrolyte interphase" or "SEI" layers.

SEI layers form due to electrochemical reaction of the electrode surface, namely, oxidation at the cathode and reduction at the anode. The electrolyte participates in these side-reactions by providing various chemical species to facilitate these side reactions, mainly, hydrogen, carbon, and fluorine, among other chemical species. This may result in the evolution of oxygen, carbon dioxide, hydrogen fluoride, manganese, lithium-ion, lithium-hydroxide, lithium-dihydroxide, and lithium carboxylate, and other undesirable lithium species, among other reaction products. Various electrochemistries may be affected by these side-reaction, including lithium-ion, sodium-ion, magnesium-ion, lithium-sulfur, lithium-titanate, solid state lithium, and solid state batteries comprising other electrochemistries. These side reactions result in thickening of the SEI layer over time, and during cycling. These side reactions may result in resistance growth, capacity fade, power fade, and voltage fade over cycle life.

Three mechanisms are known to be responsible for these oxidation reactions. First, various reactions occur in the liquid of the electrolyte. A variety of salts and additives are typically used in electrolyte formulation. Each is capable of decomposing and providing species that may contribute to SEI layer formation and growth. For example, the electrolyte may include lithium hexafluoride ($LiPF_6$).

In particular, the reduction of LiPF6, into a strong Lewis acid $PF_5$, fosters a ring-opening reaction with the ethylene carbonate solvent of the electrolyte (EC) and contaminates the anode active material surface in the presence of the Li+ ions. It also initiates the formation of insoluble organic and inorganic lithium species on the surface of the electrode (good SEI layer). A good SEI layer is a Li+ ion conductor but an insulator to electron flow. A robust SEI layer prevents further electrolyte solvent reduction on the negative electrode. However, the metastable species $ROCO_2Li$ within the SEI layer can decompose into more stable compounds —$Li_2CO_3$ and LiF at elevated temperature or in the presence of catalytic compounds, e.g. $Ni_2+$ or $Mn_2+$ ions. These products of side reactions are porous and expose the negative active material surface to more electrolyte decomposition reactions, which promote the formation of a variety of layers on the electrode surface. These layers lead to the loss/consumption of lithium ions at electrode/electrolyte interface and are one of the major causes of irreversible capacity and power fade.

Typical liquid electrolyte formulations contain ethylene carbonate (EC), diethyl carbonate (DEC), and dimethyl carbonate (DMC) solvents. EC is highly reactive and easily undergoes a one electron reduction reaction at the anode surface. The EC molecule is preferably reacted (solvation reaction) because of its high dielectric constant and polarity compared to other solvent molecules. The electrolyte decomposition is initiated during the intercalation of Li+ into the negative active materials particles. An electron is transferred from the electrode to the electrolyte salt (LiPF6 typically) to initiate an autocatalytic process that produces Lewis acid and lithium fluoride as shown in Equation 1. The Lewis acid $PF_5$ reacts further with impurities of water or alcohols (Eq. 2 and 3) in the electrolyte to produce HF and $POF_3$:

$$LiPF_6 \leftrightarrow LiF + PF_5 \quad (1)$$

$$PF_5 + H_2O \leftrightarrow PF_5 + {}^-OH_2 \quad (2)$$

$$PF_5 + H_2O \leftrightarrow 2HF + POF_3 \quad (3)$$

Various other components of the electrolyte may undergo similar processes by interacting with the active materials and produce more fluorinated compounds and $CO_2$. At high state of charge (high voltage) or when higher voltage materials are used in the manufacture of the battery electrodes, e.g., nickel-rich compounds, the decomposition reactions are even more electrochemically favored.

Second, reactions may occur on the surface of the active material. The surface of the active material may be nickel-rich or enriched with other transition metals and nickel may provide catalytic activity that may initiate, encourage, foster, or promote various side reactions. Side reactions at the surface of the active material may include oxidation at the cathode, reduction at the anode, and phase transformation reactions that initiate at the surface and proceed through the bulk of the active material. For example, the cathode active material may include nickel-manganese-cobalt-oxide (NMC). NMC may undergo a phase transition at the surface to form nickel-oxide or a spinel form of lithium-manganese-oxide. This may result in the evolution of $CO_2$, $MN_2^+$, HF, and various oxidized species. These may form an SEI on the anode surface.

In addition, less space is available in the remaining modified crystal structures on the cathode surface of the active material to accommodate lithium ions in the crystal lattice. This reduces capacity. These phases may also have lower intercalation voltage than the original structure, leading to voltage fade. The more these secondary phases occur, the greater the reduction in capacity for storing lithium ions and voltage fade. These changes are irreversible. Thus, capacity lost to these side reactions cannot be recovered on cycling the battery.

Third, bulk transition of NMC to spinel also reduces capacity and voltage. These reactions may initiate at the surface and proceed through the bulk material. These spinel transition reactions do not rely on electrolyte decomposition or oxidation-reduction reactions. Rather, spinel is a more stable crystalline form having a lower energy state and its formation is thermodynamically favored.

These SEI reactions can increase resistance due to increased thickness of a passivation layer on the active materials and/or electrodes that accumulates and grows thicker over time. Concentration gradients may form in the SEI. Electrolyte may become depleted in certain ionic species. Other elements, including, manganese, may be degraded at the anode side of the reaction, slowing lithium diffusion and increasing ionic transfer resistance.

Some past efforts have applied material layers to the anode or cathode of a battery by atomic layered deposition (ALD) to improve electrical conductivity of the active materials. See, for example, Amine, et al., U.S. Pat. No. 9,005,816 for "Coating of Porous Carbon for Use in Lithium Air Batteries," which is incorporated herein by reference in its entirety. Amine deposits carbon to enhance conductivity.

One shortcoming of this approach is that the chemical pathways at the cathode and/or anode surface of the above side reactions remain unaltered. Amine's coating is not engineered. Rather, whatever material is thermodynamically-favored is formed. The active materials are ceramic oxides that are not highly-electrically conductive. Amine deposits carbon, not to block side reactions but, rather, to promote electrical conductivity. Depositing a conductive material may enhance the charge rate but may not block these side reactions. Particularly in view of the fact that Amine's coating is electrically conductive and porous, the above side reaction mechanisms may continue to operate.

In addition to the problems associated with prior art discussed above, the present disclosure aims to solve one or more of the following problems: SEI layer growth and degradation due to secondary side-reactions at the electrode/electrolyte interphase; contact resistance due to increased thickness over time of the passivation layer on active materials or electrodes; phase transformations due to favorable surface energy landscape; reduced rate capability due to higher lithium diffusion barriers; cathode/anode dissolution processes; undesirable ionic shuttling reactions causing self-discharge.

For example, in the case of Lithium-ion batteries, the problems that can be addressed by the present disclosure include: surface formation of binary metal oxide structures, which propagate inward, causing capacity, voltage fade and resistance growth. The problems that can be addressed by the present disclosure include: electrolyte oxidation at high voltage (e.g., top of charge), which depletes electrolyte (and consequently Li ions), and produces HF causing transition metal dissolution. Transition metal dissolution alters the structure of the cathode surface, thereby increasing Li transport resistance. Both transition metal ions and electrolyte oxidation products shuttle to the anode and cause self-discharge and excessive SEI formation, further depleting the electrolyte. Transition metal deposition also increases the Li transport resistance of the SEI. Electrolyte oxidation also creates gas which delaminates the electrodes. The problems that can be addressed by the present disclosure also include: Ni segregation to surface, resulting in several processes that cause voltage, capacity, and power fade, including: higher Li diffusion barrier (poor rate capability and cycleability), reaction of electrolyte with $NO^+$ at high voltage that has various issues of electrolyte oxidation as well as deterioration of the cathode/electrolyte interface, and decreased Ni—Mn interaction causing $Mn^{3+}$ reduction (which may lead to spinel formation). The problems that can be addressed by the present disclosure also include: spinel phase and rock salt phase nucleation and propagation from the surface (voltage fade). The spinel phase also generally has lower capacity than layered structure (capacity fade).

Various approaches have been developed for addressing the above-mentioned degradation mechanisms that cause capacity, voltage, and power fade. However, these approaches do not directly address the fundamental mechanisms and therefore can only at best be partially effective. These approaches include using new cathode materials or dopants, new syntheses (e.g., hydrothermally assisted), chemical activation, pre-lithiation, optimization of particle size distribution, cathode structuring (e.g., uniform metal cation distributions, core-shell or gradient metal distributions, and optimization of primary and secondary particles), and electrolyte optimization. It is not uncommon to see improvements in cycle lifetime of high energy batteries through the above approaches. However, the fundamental degradation mechanisms, such as cathode structure transitions from layered to spinel crystal structures, have not been shown to be fully avoided. For example, electrolyte additives, especially synergistic additive combinations including vinylene carbonate (VC), have been shown to decrease the rate of electrolyte oxidation and capacity fade. However, these processes still occur, and the maximum factor of improvement is often shown to be less than 50%.

The common shortcoming of all the traditional approaches is that they do not alter the chemical pathways present at the cathode and anode surfaces, the sites where all degradation mechanisms initiate. For example, changes to the electrolyte composition and cathode composition can change the rates of the processes that occur at the surface, but they do not remove the sites of contact between the electrolyte and the cathode. There is a need for a new battery design that blocks undesirable chemical pathways.

All-solid-state secondary batteries employing inorganic solid state electrolytes (SSEs) offer a significant safety advantage over conventional liquid electrolyte-containing batteries, making them highly desirable for next generation energy storage. The safety feature of all-solid-state secondary batteries lies in the SSE which functions electrochemically and structurally within the battery, which reduces or eliminates the need for flammable liquid electrolytes. Much effort has gone into developing new SSEs with suitable electrochemical characteristics such as high ionic conductivity, chemical stability at high voltage, as well as into its structural role as the separator between the cathode and anode. However, prior to this invention, all-solid-state secondary batteries have not been commercially viable due not just to performance drawbacks such as the low conductivity of SSE materials relative to liquid electrolytes and the lack of chemical stability with conventional electrode materials, but also the inability to handle these materials in conventional secondary battery processing systems and to manufacture solid state batteries outside of a controlled environment devoid of moisture and oxygen.

SUMMARY

The present disclosure offers a new battery design that blocks undesirable chemical pathways. The anode and cathode coatings can directly address the degradation mechanisms. Some examples of the coatings include surface metal cation doping, metal oxide or carbon sol-gel coating, sputter coating, and metal oxide atomic layer deposition (ALD) coating. Of these, ALD coating offers impressive results due to its thinness (incremental atomic layers), completeness (leaving no uncoated surfaces), and that it does not remove electrically active material. In contrast, surface doping of cations replacing Mn cations reduces capacity by removing Mn intercalation centers. Sol-gel coatings give non-uniform thickness and extent of coating, where the thicker areas have high resistance and the non-coated areas experience degradation. However, ALD-coated anodes and/or cathodes commonly show no capacity, voltage, or power fade in batteries. Because proper ALD coating on particles leaves no uncoated surfaces, it can completely block electrolyte oxidation, cathode cation dissolution, and SEI precursor shuttling. Moreover, because binary metal oxide and spinel phase nucleation and growth initiates from the surface, complete coverage of cathode surfaces by ALD coating removes all nucleation sites and therefore prevents cathode restructuring. Unfortunately, ALD coating is known to introduce other well-known limitations such as lower rate capability and power, limited scalability, and high cost. Moreover, the majority of coating work has focused on NMC, and the rigid metal oxide coatings applied by ALD are quickly broken and rendered ineffective for Si anodes. The present disclosure introduces novel variants of ALD coating that offer characteristic advantages of ALD coatings but may overcome one or more of the above limitations. With the disclosed technology, high energy, long lifetime cells with the improvements of surface coatings can be implemented in high-volume and electric vehicle (EV) applications.

Although the present disclosure is not limited to the below theory, the present inventors believe that altering the interface to reduce charge transfer resistance, electronic resistance, ionic transfer resistance, and concentration polarization resistance may reduce the above-noted components that would otherwise increase resistance. The present inventors believe that it is desirable to inhibit undesirable chemical pathways and mitigate side reactions. By altering the behavior of the active material surface and tailoring and adapting its composition to reduce contact transfer or concentration polarization resistance, cycle life of high energy density materials may be improved and power fade and resistance growth reduced.

Embodiments of the present invention deposit a coating on anode active materials, cathode active materials, or solid state electrolyte. This coating is preferably thin, continuous, conformal, and mechanically stable during repeated cycling of the battery. The coating may be electrically conductive or non-conductive.

In various embodiments, a cathode, anode, or solid state electrolyte material is coated with a nano-engineered coating, preferably by one or more of: atomic layer deposition; molecular layer deposition; chemical vapor deposition; physical vapor deposition; vacuum deposition; electron beam deposition; laser deposition; plasma deposition; radio frequency sputtering; sol-gel, microemulsion, successive ionic layer deposition, aqueous deposition; mechanofusion; solid-state diffusion, or doping. The nano-engineered coating material may be deposited on the active materials of the cathode, active materials of the anode, or the solid state electrolyte prior to fabrication of the battery or after formation steps are applied to the finished battery. The nano-engineered coating material may be a stable and ionically-conductive material selected from a group including any one or more of the following: (i) metal oxide; (ii) metal halide; (iii) metal oxyhalide; (iv) metal phosphate; (v) metal sulfate; (vi) non-metal oxide, (vii) olivines, (viii) NaSICON structures, (ix) perovskite structures, (x) spinel structures, (xi) polymetallic ionic structures, (xii) metal organic structures or complexes, (xiii) polymetallic organic structures or complexes, (xiv) structures with periodic properties, (xv) functional groups that are randomly distributed, (xvi) functional groups that are periodically distributed, (xvii) block copolymers; (xviii) functional groups that have checkered microstructure, (xix) functionally graded materials; (xx) 2D periodic microstructures, (xxi) 3D periodic microstructures, metal nitride, metal oxynitride, metal carbide, metal oxycarbide, and non-metallic organic structures or complexes. Suitable metals may be selected from, but not limited to, the following: alkali metals, transition metals, lanthanum, boron, silicon, carbon, tin, germanium, gallium, aluminum, and indium. Suitable coatings may contain one or more of the above materials.

Embodiments of the present disclosure include methods of depositing a nano-engineered coating on cathode active materials, anode active materials, or solid state electrolyte using one or more of these techniques. In an embodiment, a coating is deposited on cathode material particles before they are mixed into a slurry to form active material that is applied to the current collector to form an electrode. The coating is preferably mechanically-stable, thin, conformal, continuous, non-porous, and ionically conductive. A battery may be made using a cathode active material coated in this manner, an anode, and a liquid electrolyte.

In certain embodiments, a battery includes: an anode; a cathode; and either a liquid or solid-state electrolyte configured to provide ionic transfer between the anode and the cathode; with a microscopic and/or nanoscale coating deposited either on the solid-state electrolyte, or on the anode or cathode active material regardless whether a solid-state or liquid electrolyte is used.

Certain embodiments of the present disclosure teach nano-engineered coatings for use in a battery to inhibit undesirable side-reactions. For example, by coating an atomic or molecular coating layer on the active materials and/or solid-state electrolyte, electron transfer from the active materials to a passivation layer normally formed onto the electrodes surfaces and into the electrodes pores can be prevented. As a result, undesired side-reactions can be prevented. In addition, the atomic or molecular coating layer can limit or eliminate resistance growth, capacity fade, and degradation over time that cells experience during cycling. Furthermore, embodiments of the present disclosure may inhibit undesirable structural changes resulting from side reactions of the electrolyte or solid state reactions of the active materials, e.g., phase transitions. Batteries of embodiments of the present disclosure may yield increased capacity and increased cycle life.

Certain embodiments of the present disclosure provide nano-engineered coating techniques that are less expensive alternatives to existing designs. These techniques may be relatively faster and require less stringent manufacturing environments, e.g., coatings can be applied in a vacuum or outside of a vacuum and at varying temperatures.

Another advantage of certain embodiments of the present disclosure is reduced cell resistance and increased cycle life. Certain embodiments of the present disclosure yield higher capacity and greater material selection flexibility. Certain embodiments of the present disclosure offer increased uniformity and controllability in coating application.

Other advantages of the present disclosure include: by using the ALD coating disclosed in the present disclosure, the capacity and cycle life of a battery can be increased. The battery can be made safer by the coatings disclosed. The ALD coating also enables high capacity, high voltage, and materials with large volume change issues, and previously unusable materials. The ALD coating also increases surface conductivity and makes the SEI layer more functional as the ALD coating is engineered in a certain way as opposed to be processed in a random process.

In addition, disclosed here are two methods for producing sufficiently stabilized SSE-based materials suitable for use in conventional liquid-based electrolyte energy storage production facilities.

The first method is a vapor deposition process for an encapsulation coating that is applied to a powder comprising SSE particles, which provides a suitable permanent, semi-permanent, sacrificial or temporary barrier against oxygen ingress, or other permanent or semi-permanent interfacial benefit to adjacent coated or uncoated particles in the finished layer or system. Said encapsulated SSE particles can then be cast, printed or coated as films (e.g. via a slurry or other conventional approach, or a more advanced approach such as via 3-D printing) onto finished electrodes in conventional fabrication equipment, and the functionality of any semi-permanent or temporary barrier is further designed (e.g., in composition, thickness, or other physicochemical attribute) to be sufficient enough to prevent degradation over the particular time scales the materials and films, layers or coatings thereof are exposed to a particular environment that is substantially different than the substrate. Devices that comprise the initially encapsulated materials produced in a non-inert environment retain substantially similar performance to comparable devices produced using current solid state techniques in an inert environment.

The second method is a vapor deposition process that produces the SSE material itself using a conventional flexible porous separator sheet or web as a template, which creates a flexible SSE comprising system that can be integrated using conventional device fabrication processes for integrating a pristine separator. Atomic Layer Deposition (ALD) chemistries and steps or sequences of the appropriate solid electrolyte composition can be deposited onto fixed or moving microporous substrates such as separators, membranes, foams, gels (e.g., aerogels or xerogels, etc.) that are rigid, semi-rigid or flexible. For example, a known SSE composition such as $xLi_2S(1-x)P_2S_5$, where x is a molar ratio and ranges from about 10 to about 90 can be produced using a lithium source (e.g. alkyllithiums, lithium hexamethyldisilazide or lithium t-butoxide), a sulfur source (e.g., $H_2S$) and a phosphorous source (e.g. $H_3P$) with other beneficial adhesion aids, promoters or steps (e.g., plasma exposure). Similarly, solid electrolyte layer comprising $Li_xGe_yP_zS_4$, where x, y, z are mole concentrations and range from $2.3 < x < 4$, $0 < y < 1$, and $0 < z < 1$ can also be produced easily using the right sequence of exposures of the aforementioned precursors along with the exposure of a germanium source (e.g., germanium ethoxide) interleaved. LLTO and LiPON can similarly be applied using ALD techniques onto such substrates. In addition, Molecular Layer Deposition (MLD) techniques that produce hybrid inorganic/organic coatings onto substrates with the same precision as ALD can also be deployed for advanced SSE-incorporated separators. A hybrid polymeric/LiPON coating can be applied using bifunctional organic chain molecules such as ethylenediamine, ethanolamine or similar as a nitrogen source, to produce flexible and/or compressible MLD coatings with high ionic conductivity on deformable/flexible substrates such as separators suitable for use in batteries, fuel cells, or electrolyzers, or membranes used for a variety of chemical processes involving reactions or separations. Similarly, lithium-containing polymers or ALD coatings can also demonstrate higher ionic conductivity than coatings devoid of lithium. The advantage of one embodiment of the invention is the subsequent encapsulation process that is applied to the produced flexible SSE-incorporated separator, which applies a similar encapsulating coating onto the exposed SSE surfaces throughout the system. Similar to the first method, devices that comprise the initially encapsulated SSE-incorporated separator produced in a non-inert environment retain substantially similar performance to comparable devices produced using current solid state techniques in an inert environment. Currently, particles, slurries and separators can be considered part of a family of "drop-in ready" raw materials for battery manufacturing operations, which can be surface modified while retaining a drop-in readiness aspect.

Varying compositions of the SSE-incorporated separator can be deployed, and particular compositions or loadings (relative to the separator template) may be used for all solid state energy storage devices, and others may be suitable for hybrid liquid-solid electrolyte based energy storage devices (e.g., through the incorporation of a conventional liquid electrolyte such as $LiPF_6$ or one or more ionic liquids such as described in WO 2015/030407 and U.S. application Ser. No. 14/421,055, which are incorporated by reference in their entirety). In some instances of each case, a different encapsulation coating composition may be applied to SSE materials on the cathode-facing and anode-facing interfaces, or further gradiated throughout a given coating layer, to further promote system compatibility. In the method in which SSE particles are coated, a first layer comprising a cathode-stable SSE encapsulation coating (e.g. $Al_2O_3$ or $TiO_2$, $LiAlO_x$ or $LiTiO_x$, $LiAlPO_4$ or $LiTiPO_4$, $LiAl_xTi_yPO_4$ or LATP, LiPON) may be cast onto a fabricated cathode to make a first SSE layer, and a second layer comprising an anode-stable SSE encapsulation coating (e.g. LiPON or advantageous MLD coatings) may be interposed between said first SSE layer and a fabricated anode. In the separator-based method, a cathode-stable encapsulation coating can be applied to the side of the SSE-incorporated separator intended to be cathode-facing using one vapor deposition process, and an anode-stable encapsulation coating can be applied (simultaneously or sequentially) to the side of the SSE-incorporated separator intended to be anode-facing.

One aspect of many embodiments of the invention relates to a population of solid-state electrolyte (SSE) particles each coated by a protective coating, wherein the protective coating has a thickness of 100 nm or less and is obtained by atomic layer deposition (ALD) or molecular layer deposition (MLD).

In some embodiments, the SSE particles comprise a lithium-conducting sulfide-based, phosphide-based or phosphate-based compound, an ionically-conductive polymers, a lithium or sodium super-ionic conductor, and/or an ionically-conductive oxide or oxyfluoride, and or a Garnet, and or LiPON, and or Li-NaSICon, and or Perovskites, and or NASICON structure electrolytes (such as LATP), Na Beta alumina, LLZO. In some embodiments, the SSE particles comprise lithium conducting sulfide-based, phosphide-based or phosphate-based systems such as $Li_2S$—$P_2S_5$, $Li_2S$—$GeS_2$—$P_2S_5$, $Li_3P$, LATP (lithium aluminum titanium phosphate) and LiPON, with and without dopants such as Sn, Ta, Zr, La, Ge, Ba, Bi, Nb, etc., ionically-conductive polymers such as those based upon polyethylene oxide or thiolated materials, LiSICON and NaSICON type materials, and ionically-conductive oxides and oxyfluorides such as lithium lanthanum titanate, tantalate or zirconate, lithiated and non-lithiated bismuth or niobium oxide and oxyfluoride, etc., lithiated and non-lithiated barium titanate and other commonly known materials with high dielectric strength, and combinations and derivations thereof. In some embodiments, the SSE particles comprise lithium phosphorus sulfide or lithium tin phosphorus sulfide.

SSEs may be made using different methods, such as ball milling, sol-gel, plasma spray, etc.

In some embodiments, the SSE particles comprise a material having an ionic conductivity of at least about $10^{-5}$ S cm$^{-1}$, or at least about $10^{-4}$ cm$^{-1}$, or at least about $10^{-3}$ cm$^{-1}$, or at least about $10^{-2}$ S cm$^{-1}$, or about $10^{-5}$ S cm$^{-1}$ to about $10^{-1}$ cm$^{-1}$, or about $10^{-4}$ S cm$^{-1}$ to about $10^{-2}$ cm$^{-1}$.

In some embodiments, the SSE particles have an average or mean diameter of about 60 μm or less, or about 1 nm to about 30 μm, or about 2 nm to about 20 μm, or about 5 nm to about 10 μm, or about 10 nm to about 1 μm, or about 10-500 nm, or about 10-100 nm.

In some embodiments, the protective coating has a thickness of about 100 nm or less, or about 0.1-50 nm, or about 0.2-25 nm, or about 0.5-20 nm, or about 1-10 nm.

In some embodiments, the SSE particles comprise a surface area of about 0.01 m$^2$/g to about 200 m$^2$/g, or about 0.01 m$^2$/g to about 1 m$^2$/g, or about 1 m$^2$/g to about 10 m$^2$/g, or about 10 m$^2$/g to about 100 m$^2$/g, or about 100 m$^2$/g to about 200 m$^2$/g.

In some embodiments, the SSE particles are synthesized using a spray pyrolysis process, such as plasma spray or flame spray with a reducing flame.

In some embodiments, the protective coating comprises metal oxide, metal nitride, metal oxynitride, metal carbide, metal oxycarbide, metal carbonitride, metal phosphate, metal sulfide, metal fluoride, metal oxyfluoride, metal oxyhalide, non-metal oxide, a non-metal nitride, a non-metal carbonitride, non-metal fluoride, non-metallic organic structures or complexes, or non-metal oxyfluoride. In some embodiments, the protective coating comprises alumina or titania.

In some embodiments, the protective coating comprises a material having an ionic conductivity of about $10^{-5}$ S cm$^{-1}$ or lower, or about $10^{-6}$ cm$^{-1}$ or lower, or about $10^{-7}$ S cm$^{-1}$ or lower, or about $10^{-8}$ S cm$^{-1}$ or lower.

In some embodiments, the SSE particles are capable of retaining at least about 80 wt. %, or at least about 90 wt. %, or at least about 95 wt. %, or at least about 98 wt. %, or at least about 99 wt. % of the encapsulated electrolyte material after being exposed to ambient air for 1 minute. In some embodiments, the SSE particles are capable of retaining at least about 80 wt. %, or at least about 90 wt. %, or at least about 95 wt. %, or at least about 98 wt. %, or at least about 99 wt. % of the encapsulated electrolyte material after being exposed to ambient air for 2 minutes. In some embodiments, the SSE particles are capable of retaining at least about 80 wt. %, or at least about 90 wt. %, or at least about 95 wt. %, or at least about 98 wt. %, or at least about 99 wt. % of the encapsulated electrolyte material after being exposed to ambient air for 5 minutes. In some embodiments, the SSE particles are capable of retaining at least about 80 wt. %, of at least about 90 wt. %, or at least about 95 wt. %, or at least about 98 wt. %, or at least about 99 wt. % of the encapsulated electrolyte material after being exposed to ambient air for 10 minutes. In some embodiments, the SSE particles are capable of retaining at least about 80 wt. %, of at least about 90 wt. %, or at least about 95 wt. %, or at least about 98 wt. %, or at least about 99 wt. % of the encapsulated electrolyte material after being exposed to ambient air for 30 minutes. In some embodiments, the SSE particles are capable of retaining at least about 80 wt. %, of at least about 90 wt. %, or at least about 95 wt. %, or at least about 98 wt. %, or at least about 99 wt. % of the encapsulated electrolyte material after being exposed to ambient air for 60 minutes.

In some embodiments, the coated or encapsulated SSE particles can be used for pressed or cast batteries of any size or shape or form factor.

Another aspect of many embodiments of the invention relates to a solid state battery comprising a solid electrolyte layer which comprises the SSE particles described herein.

In some embodiments, the solid state battery further comprises a cathode composite layer in contact with the solid electrolyte layer (shared or independent).

In some embodiments, the cathode composite layer comprises a cathode active material mixed with a conductive additive and an SSE (conductive additive might be ALD coated too).

In some embodiments, the cathode active material comprises a lithium metal oxide, a lithium metal phosphate, sulfur, a sulfide such as lithium sulfide, metal sulfide or lithium metal sulfide, a fluoride such as metal fluoride (e.g., iron fluoride), metal oxyfluoride, lithium metal fluoride or lithium metal oxyfluoride, or a sodium variant of the aforementioned compounds.

In some embodiments, the cathode active material comprises a cathode particle coated by a protective coating having a thickness of about 100 nm or less, or about 0.1-50 nm, or about 0.2-25 nm, or about 0.5-20 nm, or about 1-10 nm.

In some embodiments, the protective coating of the cathode active material in the cathode composite layer and the protective coating of the SSE particle in the solid electrolyte layer comprise the same material.

In some embodiments, the conductive additive in the cathode composite layer comprises a conductive carbon-based material such as carbon black, carbon nanotube, graphene, acetylene black, and graphite, and any coated version of them.

In some embodiments, the conductive additive comprises a particle coated by a protective coating having a thickness of about 100 nm or less, or about 0.1-50 nm, or about 0.2-25 nm, or about 0.5-20 nm, or about 1-10 nm.

In some embodiments, the protective coating of the conductive additive in the cathode composite layer and the protective coating of the SSE particle in the solid electrolyte layer comprise the same material.

In some embodiments, the solid state battery is free of an anode layer or an anode composite layer.

In some embodiments, the solid state battery further comprises a lithium metal anode layer in contact with the solid electrolyte layer.

In some embodiments, the solid state battery further comprises an anode composite layer in contact with the solid electrolyte layer.

In some embodiments, the anode composite layer comprises an anode active material mixed with a conductive additive and an SSE.

In some embodiments, the anode active material comprises carbon-based material (e.g., graphite, etc.), silicon, tin, aluminum, germanium, lithium variations of all (e.g., prelithiated silicon, etc.), metal alloys, oxides (e.g., LTO $MoO_3$, SiO, etc.), and mixtures and combinations of each.

In some embodiments, the anode active material comprises an anode particle coated by a protective coating having a thickness of about 100 nm or less, or about 0.1-50 nm, or about 0.2-25 nm, or about 0.5-20 nm, or about 1-10 nm.

In some embodiments, the protective coating of the anode particle in the anode composite layer and the protective coating of the SSE particle in the solid electrolyte layer comprise the same material.

In some embodiments, the conductive additive in the anode composite layer comprises a conductive carbon-based material such as carbon black, carbon nanotube, graphene, graphite, and carbon aerogels.

In some embodiments, the conductive additive comprises a particle coated by a protective coating having a thickness of about 100 nm or less, or about 0.1-50 nm, or about 0.2-25 nm, or about 0.5-20 nm, or about 1-10 nm.

In some embodiments, the protective coating of the conductive additive in the anode composite layer and the protective coating of the SSE particle in the solid electrolyte layer comprise the same material.

In some embodiments, the cathode composite layer and the solid electrolyte layer account for at least about 40 wt. %, or at least about 50 wt. %, or at least about 60 wt. %, or at least about 70 wt. %, or at least about 75 wt. %, or at least about 80 wt. %, or at least about 85 wt. %, or at least about 90 wt. %, or at least about 95 wt. %, of the solid state battery, based on the total weight of the cathode current collector, the cathode composite layer, the solid electrolyte layer, the separator layer if any, the anode layer or anode composite layer if any, and the anode current collector. In some embodiments, the separator layer and the anode layer or anode composite layer account for about 15 wt. % or lower, or about 10 wt. % or lower, or about 5 wt. % or lower, or about 3 wt. % or lower, or about 2 wt. % or lower, or about 1 wt. % or lower, of the solid state battery, based on the total weight of the cathode current collector, the cathode composite layer, the solid electrolyte layer, the separator layer if any, the anode layer or anode composite layer if any, and the anode current collector.

In some embodiments, the solid state battery has a first cycle discharge capacity that is at least about 20% higher, or least about 50% higher, or at least about 100% higher, or at least about 200% higher, or at least about 500% higher than a corresponding solid state battery in which the SSE particle in the solid electrolyte layer is not coated by a protective coating, where both the solid state battery of the invention and the corresponding solid state battery are fabricated under the same environment (e.g., a non-inert environment comprising an ambient $O_2$ content). In some embodiments, the solid state battery allows continued cycling at about 20%-500%, or about 20%-50%, or about 50%-100%, or about 100%-200%, or about 200%-500%, of the theoretical capacity of the material. In some embodiments, the protective coating of the SSE prevents growth of "native oxide" in ambient air to greater than about 5 nm in thickness. In some embodiments, the protective coating of the SSE maintains an oxygen content of no more than about 5% after exposure to ambient air for about 24 hours. In some embodiments, the solid electrolyte particle coated with the protective coating is adapted to maintain an ionic conductivity of at least $10^{-6}$ s cm$^{-1}$, or at least $10^{-5}$ S cm$^{-1}$, or at least $10^{-4}$ S cm$^{-1}$, after 1 hour of exposure to ambient air.

In some embodiments, the solid state battery is a lithium-ion battery. In some embodiments, the solid state battery is a sodium-ion battery. In some embodiments, the solid state battery is a lithium battery.

Another aspect of many embodiments of the invention relates to a solid electrolyte layer comprising a porous scaffold that is coated by an SSE coating, wherein the SSE coating has a thickness of 60 μm or less.

In some embodiments, the porous scaffold is a porous separator. In some embodiments, the porous separator has a size of at least about 1 cm$^2$, or at least about 10 cm$^2$, or at least about 100 cm$^2$, or at least about 1000 cm$^2$.

In some embodiments, the SSE coating comprises a lithium-conducting sulfide-based, phosphide-based or phosphate-based compound, an ionically-conductive polymers, a lithium or sodium super-ionic conductor, or an ionically-conductive oxide and oxyfluoride. In some embodiments, the SSE coating comprises lithium conducting sulfide-based, phosphide-based or phosphate-based systems such as $Li_2S$—$P_2S_5$, $Li_2S$—$GeS_2$—$P_2S_5$, $Li_3P$, LATP (lithium aluminum titanium phosphate) and LiPON, with and without dopants such as Sn, Ta, Zr, La, Ge, Ba, Bi, Nb, etc., ionically-conductive polymers such as those based upon polyethylene oxide or thiolated materials, LiSICON and NaSICON type materials, and ionically-conductive oxides and oxyfluorides such as lithium lanthanum titanate, tantalate or zirconate, lithiated and non-lithiated bismuth or niobium oxide and oxyfluoride, etc., lithiated and non-lithiated barium titanate and other commonly known materials with high dielectric strength, and combinations and derivations thereof and or a Garnet, and or LiPON, and or Li-NaSICon, and or Perovskites, and or NASICON structure electrolytes (such as LATP), Na Beta alumina, LLZO. In some embodiments, the SSE coating comprises lithium phosphorus sulfide or lithium tin phosphorus sulfide.

In some embodiments, the SSE coating has a thickness of about 60 µm or less, or about 1 nm to about 30 µm, or about 2 nm to about 20 µm, or about 5 nm to about 10 µm, or about 10 nm to about 1 µm, or about 10-500 nm, or about 10-100 nm, or down to about 0.1 nm.

In some embodiments, the porous scaffold is further coated by a protective coating having a thickness of about 100 nm or less, or about 0.1-50 nm, or about 0.2-25 nm, or about 0.5-20 nm, or about 1-10 nm. In some embodiments, the porous scaffold comprises a (conductive) SSE inner coating and a (non-conductive) passivation/protective outer coating disposed on the SSE inner coating. In some embodiments, the porous scaffold comprises a (non-conductive) passivation/protective inner coating and a (conductive) SSE outer coating disposed on the passivation/protective inner coating. In some embodiments, the porous scaffold comprises alternating, interleaved, and/or multi-layered structures of the (conductive) SSE coating and the (non-conductive) passivation/protective coating.

In some embodiments, the protective coating comprises metal oxide, metal nitride, metal carbide, or metal carbonitride. In some embodiments, the protective coating comprises alumina or titania. In some embodiments, the Lithium based active material may contain mixtures of both alumina and titania, or multilayers of protective coatings based on alumina and titania.

In some embodiments, one or both of the protective coating and the SSE coating are obtained by ALD. In some embodiments, one or both of the protective coating and the SSE coating are obtained by MLD.

Another aspect of many embodiments of the invention relates to a cathode composite layer for a solid state battery, comprising a cathode active material mixed with a solid electrolyte material, wherein the cathode active material comprises a plurality of cathode particles each coated by a first protective coating, and wherein the solid electrolyte material comprises a plurality of SSE particles each coated by a second protective coating. In some embodiments, the first protective coating and the second protective coating are different. For example, the SSE particles can be coated with TiN for increased conductivity and with $Al_2O_3$ for protection of the conductive coating, while the cathode particles can be coated with just LiPON which may serve both conductive and protective purposes. Could be multiple layers of multiple layers, such as Al2O3, then TiN, then Al2O3, then TiN for any combination.

In some embodiments, the first protective coating and the second protective coating each independently comprises metal oxide, metal nitride, metal carbide, or metal carbonitride. In some embodiments, the first protective coating and the second protective coating are different. For example, the SSE particles can be coated with TiN for increased conductivity and with $Al_2O_3$ for protection of the conductive coating, while the cathode particles can be coated with just LiPON which may serve both conductive and protective purposes. The coating can include multiple layers of multiple materials, such as $Al_2O_3$, then TiN, then $Al_2O_3$, then TiN for any combination.

In some embodiments, the first protective coating and the second protective coating each independently has an average thickness of about 100 nm or less, or about 0.1-50 nm, or about 0.2-25 nm, or about 0.5-20 nm, or about 1-10 nm.

In some embodiments, the cathode composite layer further comprises a conductive additive mixed with the cathode active material and the solid electrolyte material. In some embodiments, the ratio of the cathode active material:the solid electrolyte material:the conductive additive ranges from about 5:30:3 to about 80:10:10, or from 1:30:3 to about 95:3:2, or up to 97:3:0 if SSE ALD coated cathode active materials are used.

In some embodiments, one or both of the first protective coating and the second protective coating are obtained by ALD. In some embodiments, one or both of the first protective coating and the second protective coating are obtained by MLD.

Another aspect of many embodiments of the invention relates to a solid state battery comprising the cathode composite layer. In some embodiments, the solid state battery further comprises a cathode current collector, an anode current collector, an optional lithium metal anode layer or anode composite layer, an optional separator, and an optional solid electrolyte layer.

In some embodiments, the cathode composite layer comprises at least about 50 wt. %, or at least about 60 wt. %, or at least about 70 wt. %, or at least about 80 wt. %, or at least about 90 wt. %, of the solid state battery, based on the total weight of the cathode composite layer, the cathode current collector, the anode current collector, the optional lithium metal anode layer or anode composite layer, the optional separator, and the optional solid electrolyte layer.

A further aspect of many embodiments of the invention relates to a method for improving environmental stability of an SSE particle, comprising depositing a protective coating on the SSE particle by ALD or MLD, wherein the protective coating has a thickness of about 100 nm or less, or about 0.1-50 nm, or about 0.2-25 nm, or about 0.5-20 nm, or about 1-10 nm.

In some embodiments, the protective coating is obtained by about 1-100 ALD cycles, or about 2-50 ALD cycles, or about 4-20 ALD cycles.

In some embodiments, the method further comprises incorporating the SSE particle coated with the protective coating into a solid state battery, wherein the solid state battery has a first cycle discharge capacity that is at least about 20% higher, or least about 50% higher, or at least about 100% higher, or at least about 200% higher, or at least about 500% higher than a corresponding solid state battery obtained by incorporating a corresponding SSE particle with no protective coating under the same environment (e.g., a non-inert environment comprising an ambient $O_2$ content).

A further aspect of many embodiments of the invention relates to a method for making a solid electrolyte layer for a solid state battery, comprising depositing a first, SSE coating on a porous scaffold by ALD or MLD, wherein the solid electrolyte layer has a thickness of about 60 µm or less, or about 1 nm to about 30 µm, or about 2 nm to about 20 µm, or about 5 nm to about 10 µm, or about 10 nm to about 1 µm, or about 10-500 nm, or about 10-100 nm.

In some embodiments, the method further comprises depositing a second, protective coating on the porous scaffold by ALD or MLD, wherein the protective coating has a thickness of about 100 nm or less, or about 0.1-50 nm, or about 0.2-25 nm, or about 0.5-20 nm, or about 1-10 nm.

In some embodiments, the protective coating is obtained by about 1-100 ALD cycles, or about 2-50 ALD cycles, or about 4-20 ALD cycles.

In some embodiments, the method further comprises incorporating the solid electrolyte layer into a solid state battery, wherein the solid state battery has a first cycle discharge capacity that is at least about 20% higher, or least about 50% higher, or at least about 100% higher, or at least about 200% higher, or at least about 500% higher than a corresponding solid state battery obtained by incorporating a corresponding solid electrolyte layer with no protective coating under the same environment (e.g., a non-inert environment comprising an ambient $O_2$ content.

An additional aspect of many embodiments of the invention relates to heat treatment of the SSE, independent or in-line with ALD coating either before or after ALD coating or in a sequence of repeating steps. The SSE can be heat treated at, for example, about 200°-300° C., or about 300°-400° C., or about 400°-500° C., or about 500°-600° C., or more than 600° C. In some embodiments, the SSE particles are first heat treated and then coated with a protective layer by ALD. In some embodiments, the SSE particles are first coated with a protective layer by ALD and then heat treated. In some embodiments, the SSE particles are first coated with a first layer by ALD and then heat treated, followed by coating with a second layer by ALD.

An additional aspect of many embodiments of the invention relates to ALD coating of sulfur onto carbon for Li—S solid state batteries, and/or ALD coating of sulfur onto SSE to obtain a hybrid SSE-S electrolyte-electrode. In some embodiments, the SSE particles are first coated with sulfur and then coated with an electrically conductive material. In some embodiments, the SSE particles are first coated with sulfur and then coated with an electrically conductive material, followed by coating with an SSE layer or a 3-in-1 composite cathode material.

An additional aspect of many embodiments of the invention relates to an ALD enabled extreme-temperature solid state battery produced using encapsulated SSE powders.

In an additional aspect of many embodiments of the invention, an SSE-integrated separator can be burned out to be suitable for high temperature use. An MLD coating may get burned out later to make porous structures.

An additional aspect of many embodiments of the invention relates to a coated separator comprising one or more MLD coatings on the anode-facing side for silicon anodes.

In an additional aspect of many embodiments of the invention, a separator substrate comprises porous polymers which has natural flame retardant properties or comprises added flame retardant materials such as zinc borate or aluminum oxyhydroxide (which may be a natural byproduct of low temperature ALD of $Al_2O_3$) as a way to shut down or quench thermal runaway events that could occur when used in a liquid-containing electrolyte system.

Additional advantages of the disclosure will be set forth in part in the description which follows, and in part will be apparent from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate one or more exemplary embodiments of the disclosure and together with the description, serve to exemplify the principles of the disclosure.

The following detailed description refers to the accompanying drawings. Wherever possible, the same reference numbers may be used in the drawings and the following description to refer to the same or similar parts. Details are set forth to aid in understanding the embodiments described herein. In some cases, embodiments may be practiced without these details. In others, well-known techniques and/or components may not be described in detail to avoid complicating the description. While several exemplary embodiments and features are described herein, modifications, adaptations and other implementations are possible without departing from the spirit and scope of the invention as claimed. The following detailed description does not limit the invention. Instead, the proper scope of the invention is defined by the appended claims.

BRIEF DESCRIPTION OF THE DRAWINGS

FIG. 4A depicts the uncoated particle before cycling. FIG. 4B depicts the uncoated particle after cycling. A comparison of the images reflects that the surface of the uncoated material at the end of life is corroded and pitted and that the lattice has been disrupted relative to the nano-engineered coated material.

FIG. 6A depicts the particle before cycling. The yellow arrows indicate a reciprocal lattice, depicting the actual locations of the atoms in the lattice. FIG. 6B depicts a particle of the same material after cycling, showing that the positions of the atoms have been altered.

FIG. 7A is a graph of cycle number versus discharge capacity for a non-gradient HV NMC cathode and graphite anode, cycled under a 1C/1C rate between 4.2 V and 2.7 V. The line labelled A reflects that capacity has fallen to 80% within 200 cycles for the uncoated active material. FIG. 7B depicts cycle number versus discharge capacity for gradient cathode and Si-anode (B) and for mixed cathode (C), depicting that capacity of both has fallen to 80% within 150 cycles.

DETAILED DESCRIPTION

Embodiments of the present disclosure comprise nano-engineered coatings applied to cathode active materials, anode active materials, or solid-state electrolyte materials of batteries. Nano-engineered coatings of embodiments of the present disclosure may inhibit undesirable chemical pathways and side reactions. Nano-engineered coatings of embodiments of the present disclosure may be applied by different methods, may include different materials, and may comprise different material properties, representative examples of which are presented in the present disclosure.

Figure 1:
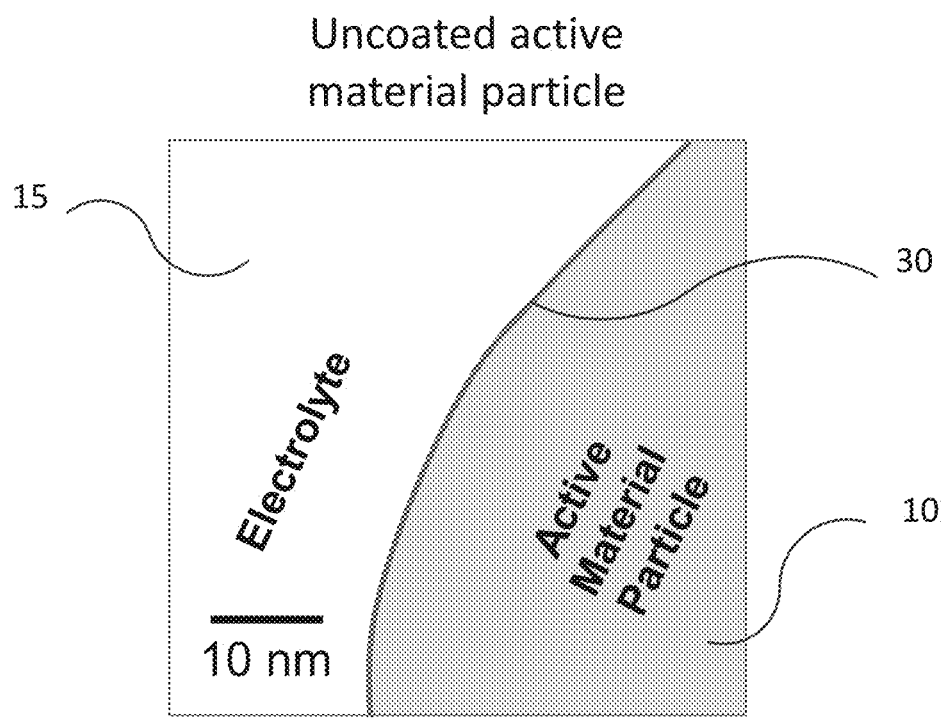
FIG. 1 is a schematic illustration of an uncoated active material particle.

FIG. 1 schematically depicts an uncoated active material particle 10 at a scale of 10 nanometer (10 nm). The surface 30 of the active material particle 10 is not coated with a nano-engineered coating. Without any coating, the surface 30 of the active material particle 10 is in direct contact with an electrolyte 15.

Figure 2:
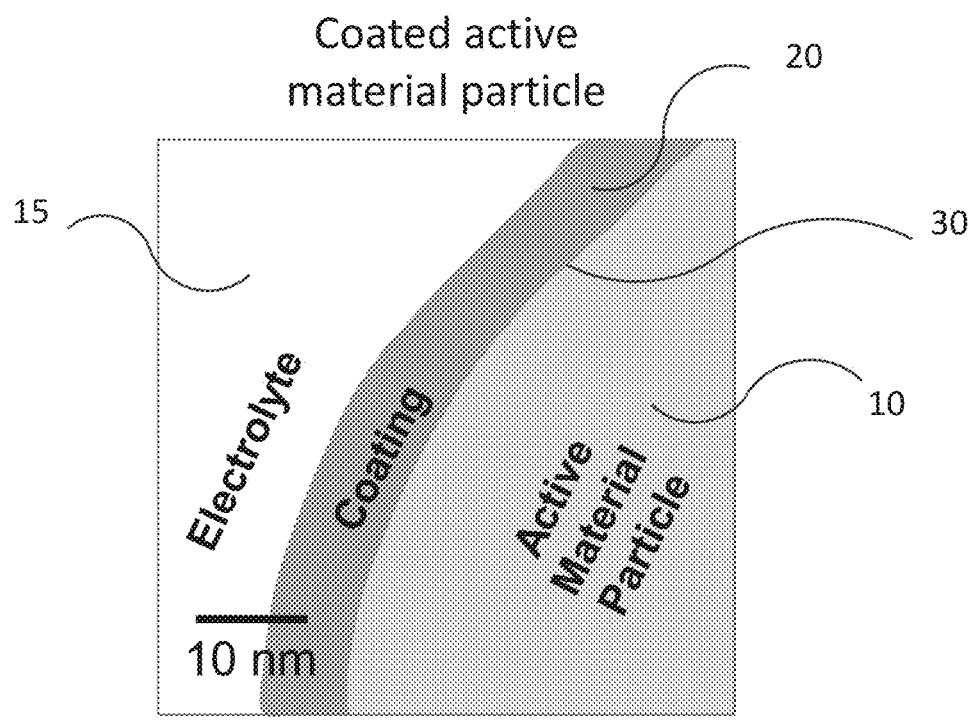
FIG. 2. is a schematic illustration of a coated active material particle.

FIG. 2 schematically depicts a coated active material particle 10 at a scale of 10 nanometer (10 nm). A coating 20, such as an nano-engineered ALD coating 20, is coated on the surface 30 of the active material particle 10. In one embodiment, as shown in FIG. 2, the thickness of the coating 20 is around 10 nm. In other embodiments, the thickness of the coating 20 may be of other values, such as a value falls within a range of 2 nm to 2000 nm, 2 nm to 20 nm, 5 nm to 20 nm, etc. The nano-engineered ALD coating 20 may be applied to the active material particle 10 used in a cathode or a anode. The nano-engineered coating depicted in FIG. 2 may form a thin, uniform, continuous, mechanically-stable coating layer that conforms to surface 30 of the active material particle. In some alternative embodiments, the coating can be non-uniform. It is understood that when a solid electrolyte is used, the coating may also be coated to the solid electrolyte.

In an embodiment of the present disclosure, the surface of cathode or anode active material particle 10 is coated with the nano-engineered ALD coating 20. Coated cathode or anode active material particles 10 are then mixed and formed into a slurry. The slurry is applied onto a current collector, forming an electrode (e.g., a cathode or an anode).

Figure 3:
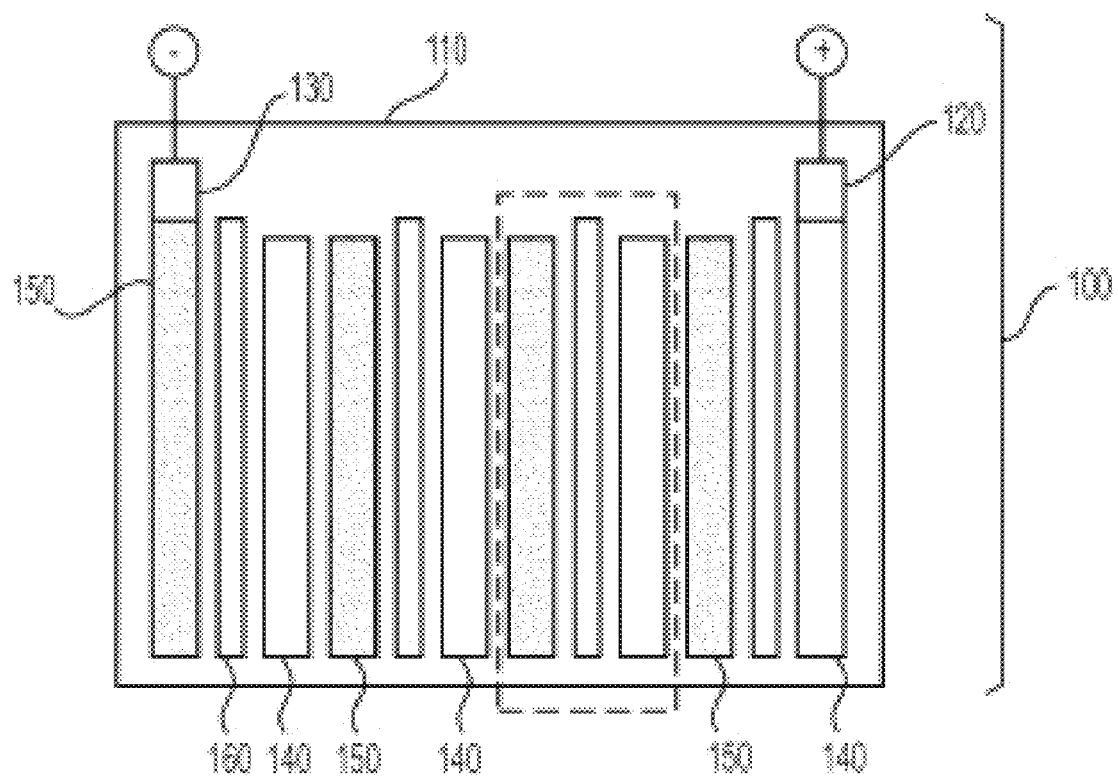
FIG. 3 is a schematic depiction of certain components of a battery of certain embodiments of the present disclosure.

FIG. 3 is a schematic representation of a battery 100 of an embodiment of the present disclosure. Battery 100 may be a Li-ion battery, or any other battery, such as a lead acid battery, a nickel-metal hydride, or other electrochemistry-based battery. Battery 100 may include a casing 110 having positive and negative terminals 120 and 130, respectively. Within casing 110 are disposed a series of anodes 140 and cathodes 150. Anode 140 may include graphite. In some embodiments, anode 140 may have a different material composition. Similarly, cathode 150 may include Nickel-Manganese-Cobalt (NMC). In some embodiments, cathode 150 may have a different material composition.

As shown in FIG. 3, positive and negative electrode pairs are formed as anodes 140 and cathodes 150 and assembled into battery 100. Battery 100 includes a separator and an electrolyte 160 sandwiched between anode 140 and cathode 150 pairs, forming electrochemical cells. The individual electrochemical cells may be connected by a bus bar in series or parallel, as desired, to build voltage or capacity, and disposed in casing 110, with positive and negative terminals 120 and 130. Battery 100 may use either a liquid or solid state electrolyte. For example, in the embodiment depicted in FIG. 3, battery 100 uses solid-state electrolyte 160. Solid-state electrolyte 160 is disposed between anode 140 and cathode 150 to enable ionic transfer between anode 130 and cathode 140. As depicted in FIG. 3, electrolyte 160 may include a ceramic solid-state electrolyte material. In other embodiments, electrolyte 160 may include other suitable electrolyte materials that support ionic transfer between anode 140 and cathode 150.

Figure 4A:
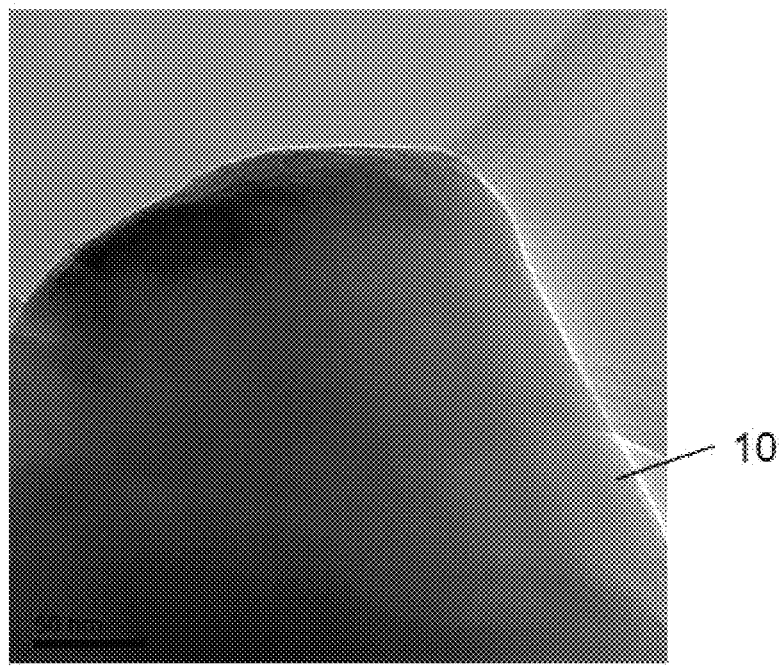
FIGS. 4A and 4B depict an uncoated particle before and after cycling.
Figure 4B:
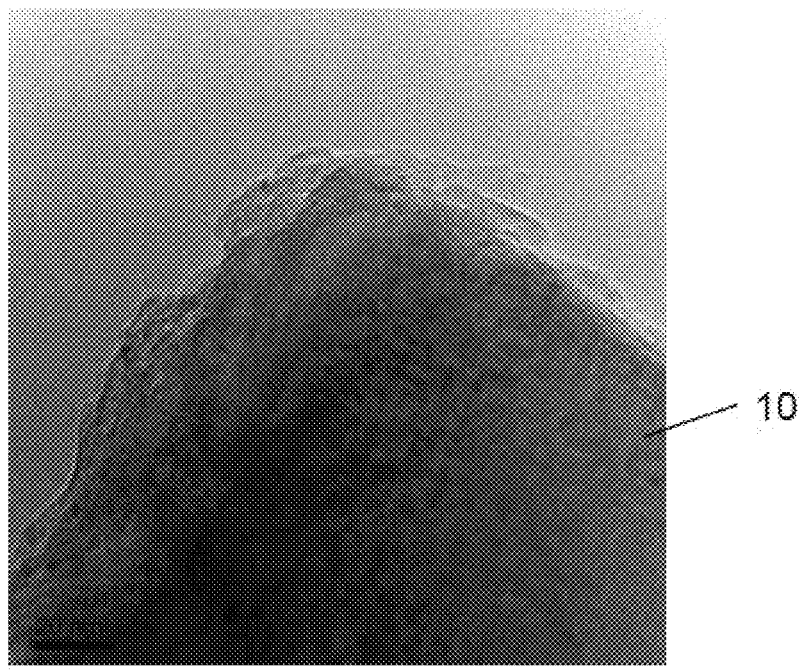
Figure 5A:
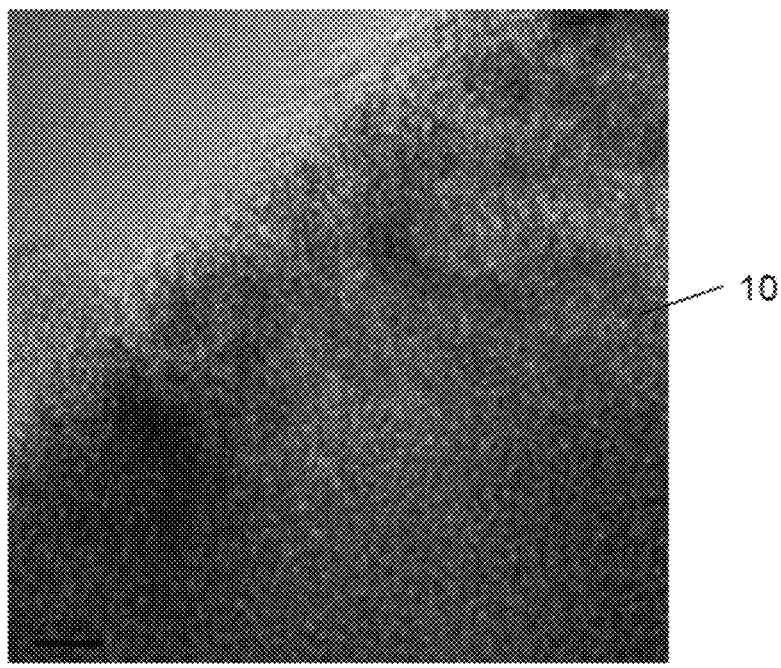
FIGS. 5A and 5B depict higher magnification images of the images shown in FIGS. 4A and 4B, showing increased corrosion of the surface (FIG. 4A) and disruption of the lattice (FIG. 4B) in the uncoated image.
Figure 5B:
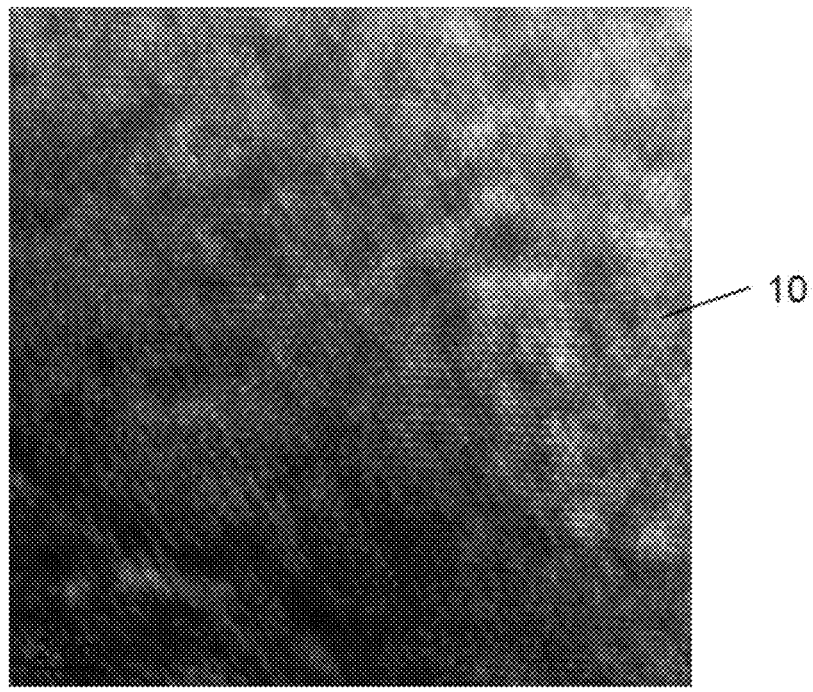

FIGS. 4A and 4B depict an uncoated cathode active material particle 10, before and after cycling. As depicted in FIG. 4A, the surface of the cathode particle 10 before cycling is relatively smooth and continuous. FIG. 4B depicts the uncoated particle 10 after cycling, exhibiting substantial corrosion resulting in pitting and an irregular surface contour. FIGS. 5A and 5B depict higher magnification views of particle 10 such as those depicted in FIGS. 4A and 4B, showing more irregular surface following corrosion of uncoated particle 10 as a result of cycling.

Figure 6A:
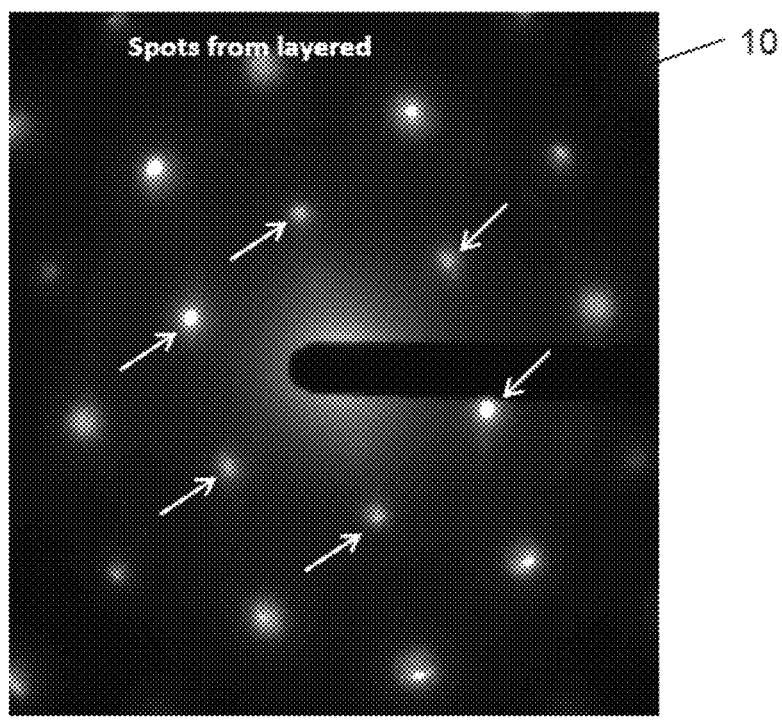
FIGS. 6A and 6B are representations of the reciprocal lattice by Fourier transform, depicting undesirable changes in the bulk material.
Figure 6B:
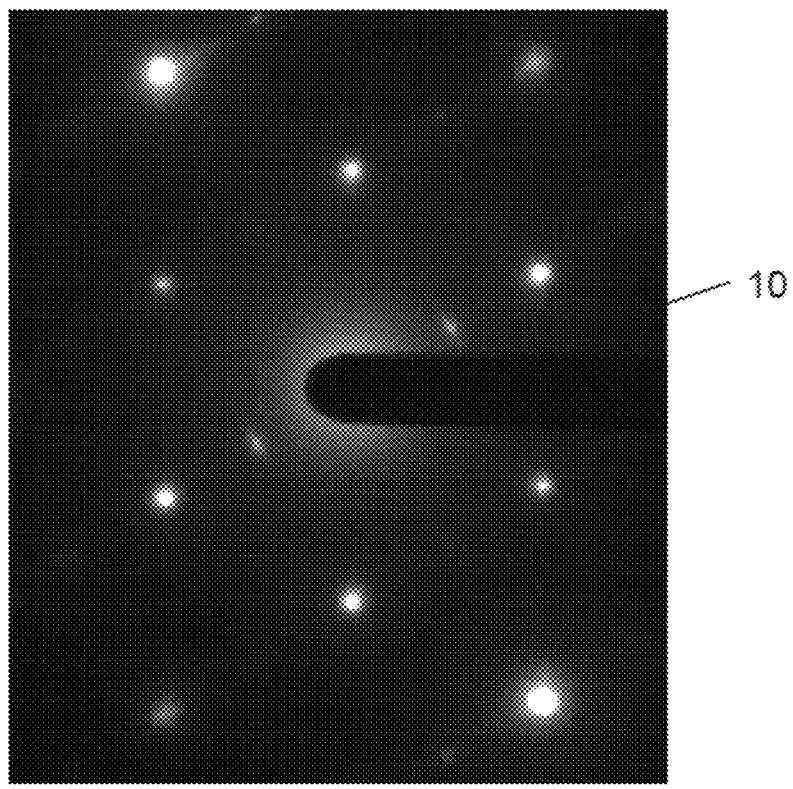

FIGS. 6A and 6B depict the dislocation of atoms in uncoated particle 10. Specifically, FIGS. 6A and 6B are representations of the reciprocal lattice. The reciprocal lattice is calculated by Fourier transform of the Transmission Electron Microscopy (TEM) image data to depict the positions of individual atoms in uncoated particle 10. FIG. 6A depicts the positions of atoms in an uncoated particle 10, before cycling. FIG. 6B depicts the positions of atoms in uncoated particle 10, after cycling. Comparing the atomic positions before and after cycling reveals undesirable changes in the atomic structure of the uncoated particle 10. The arrows in FIG. 6A indicate a reciprocal lattice, depicting the actual locations of the atoms in the lattice. FIG. 6B depicts a particle of the same material after cycling, showing that the positions of the atoms have changed.

Figure 7A:
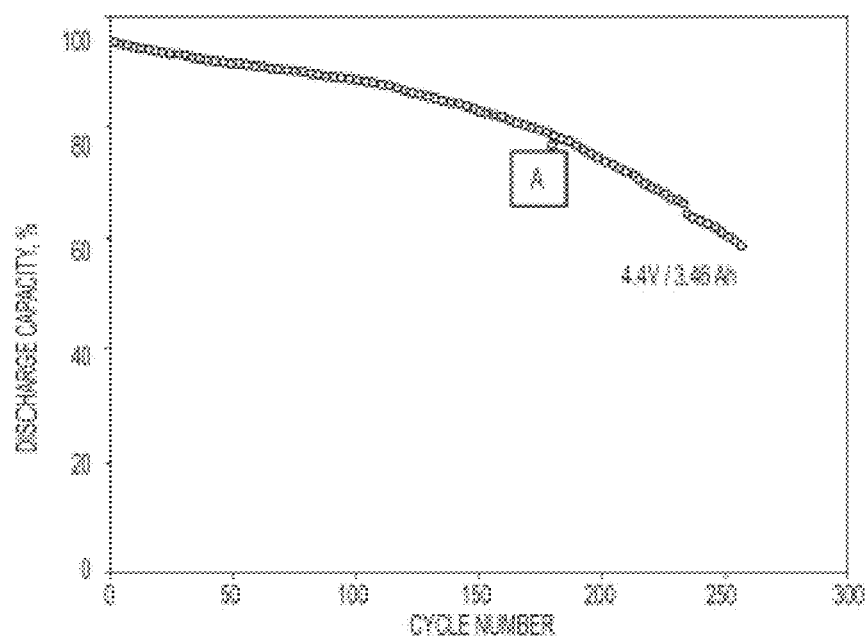
FIGS. 7A and 7B are graphs of cycle number versus discharge capacity for Li-ion batteries using uncoated active materials or solid-state electrolyte.
Figure 7B:
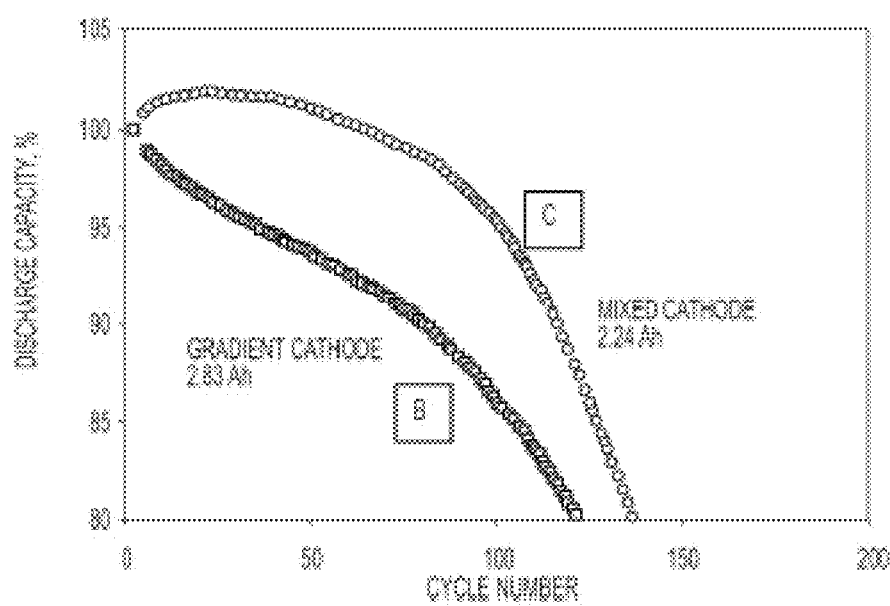

FIGS. 7A and 7B demonstrate limitations on cycle life of uncoated particles. Uncoated particles typically achieve 200 to 400 cycles and are generally limited to fewer than 400 cycles.

Figure 7C:
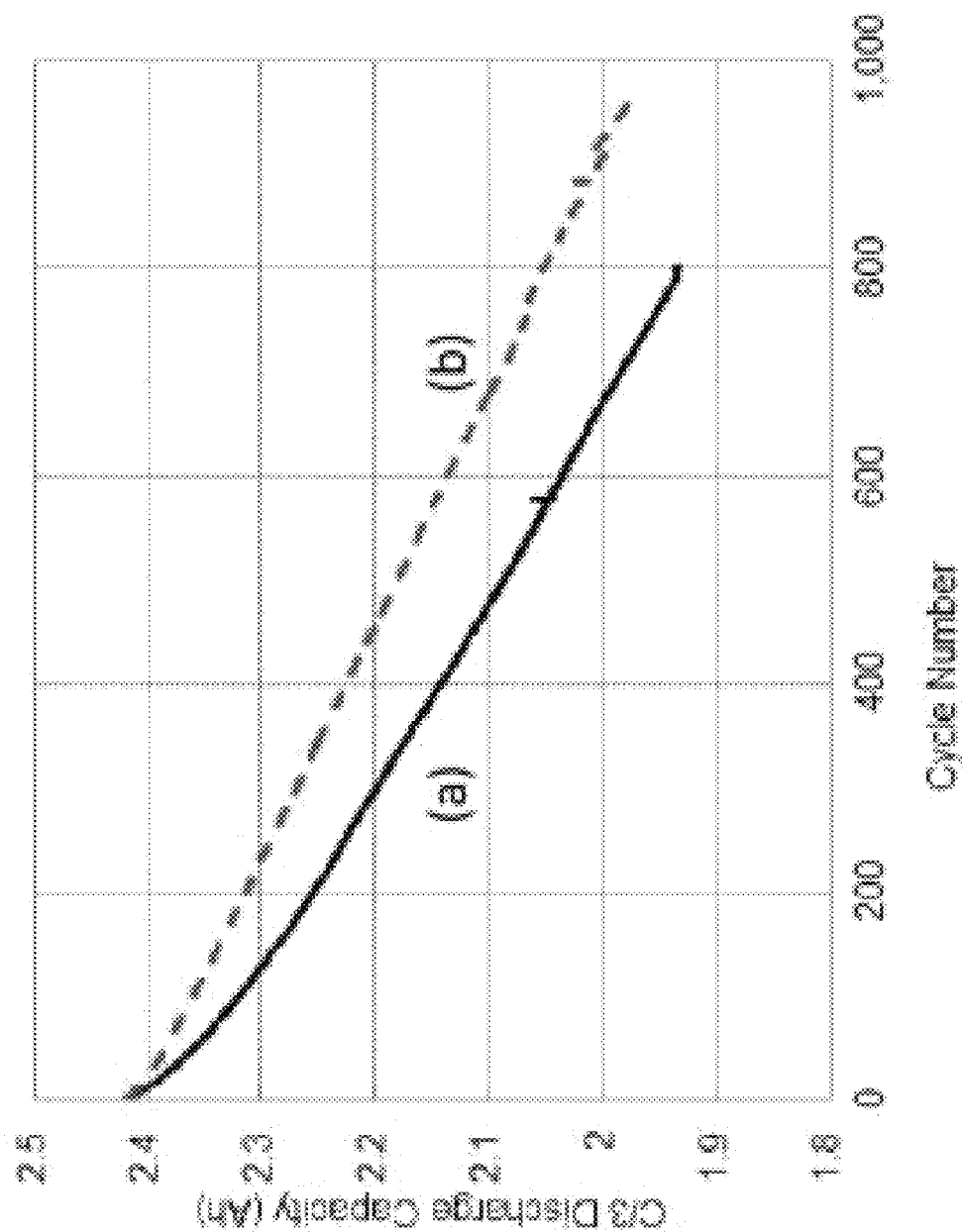
FIG. 7C depicts test results for full-cell NMC811-Graphite pouch cells with and without ALD coated $Al_2O_3$ at a cycling rate of C/3 and voltage window of 4.35V-3V.

FIG. 7C shows test results for full-cell NMC811-Graphite pouch cells with and without ALD coated $Al_2O_3$ at a cycling rate of C/3 and voltage window of 4.35V-3V. The horizontal axis shows the cycle number, and the vertical axis shows the C/3 discharge capacity in Ampere hours (Ah). The active cathode material used is Lithium Nickel Manganese Cobalt Oxide (NMC), e.g., $LiNi_{0.8}Mn_{0.1}CO_{0.1}O_2$ (NMC811). The solid line (a) shows results for unmodified NMC811 NMC811 without ALD coating), and the dashed line (b) shows results for NMC811 ALD-coated with $Al_2O_3$. As shown in FIG. 7C the 0.3C cycle life trends show that the cycle life is enhanced with $Al_2O_3$ ALD coating. For example, at a given discharge capacity (e.g., 2.0 Ah), the cycle life for unmodified NMC811 is about 675, while the cycle life for NMC811 ALD-coated with $Al_2O_3$ is about 900. The cycle life increase is attributed to the $Al_2O_3$ coating on the cathode particles of the cell.

Figure 8A:
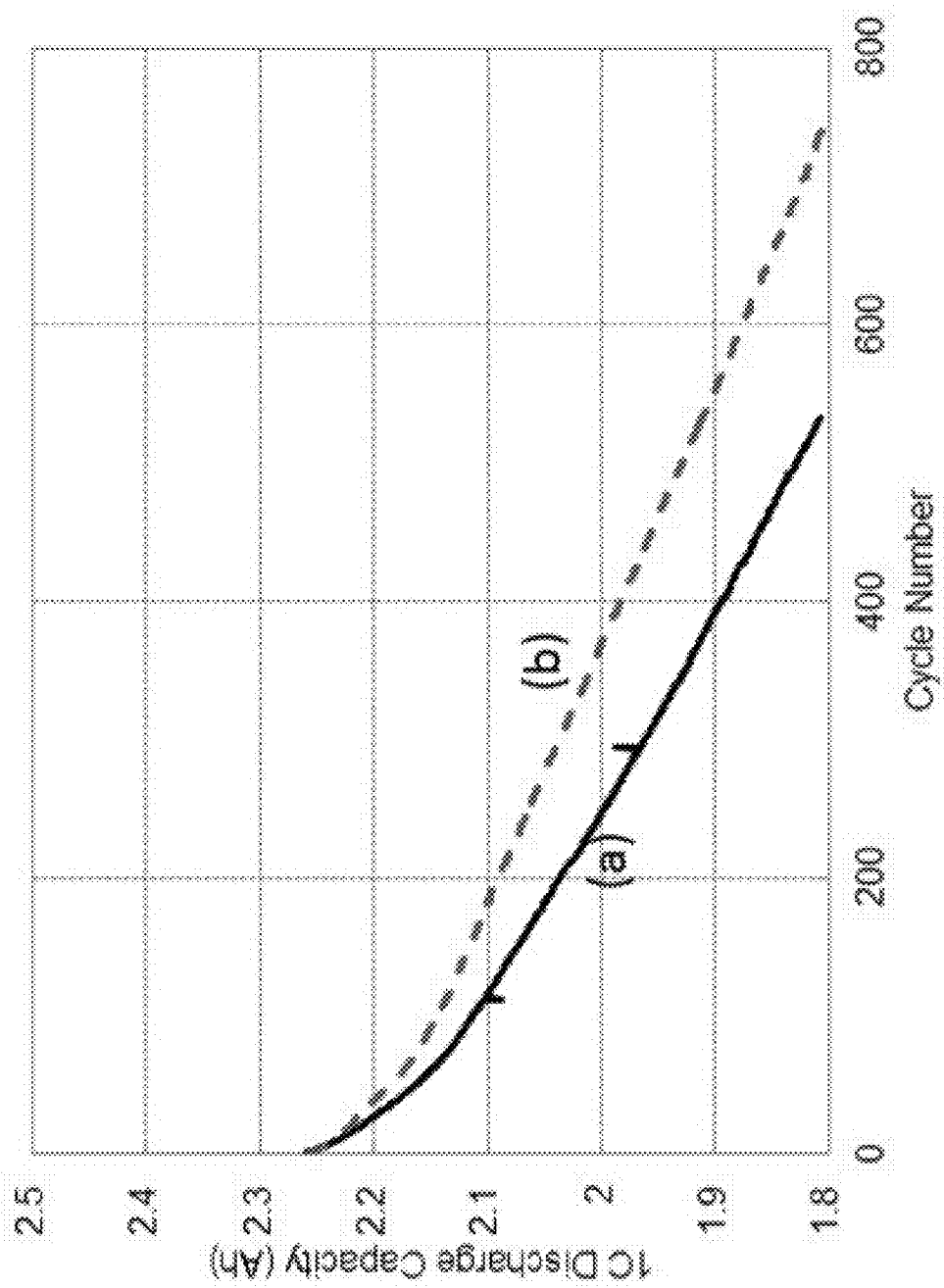
FIG. 8A depicts test results for full-cell NMC811-Graphite pouch cells with and without ALD coated $Al_2O_3$ at a cycling rate of 1C and voltage window of 4.35V-3V.

FIG. 8A shows test results for full-cell NMC811-Graphite pouch cells with and without ALD coated $Al_2O_3$ at a cycling rate of 1C and voltage window of 4.35V-3V. The horizontal axis shows the cycle number, and the vertical axis shows the 1C discharge capacity in Ampere hours (Ah). The active cathode material used is Lithium Nickel Manganese Cobalt Oxide (NMC), e.g., $LiNi_{0.8}Mn_{0.1}Co_{0.1}O_2$ (NMC811). The solid line (a) shows results for unmodified NMC811 (i.e., NMC811 without ALD coating), and the dashed line (b) shows results for NMC811 ALD-coated with $Al_2O_3$. As shown in FIG. 8A, the 1C cycle life trends show that the cycle life is enhanced with $Al_2O_3$ coating. For example, at a given discharge capacity (e.g., 1.8 Ah), the cycle life for unmodified NMC811 is about 525, while the cycle life for NMC811 ALD-coated with $Al_2O_3$ is about 725. The cycle life increase is attributed to the $Al_2O_3$ coating on the cathode particles of the cell.

Figure 8B:
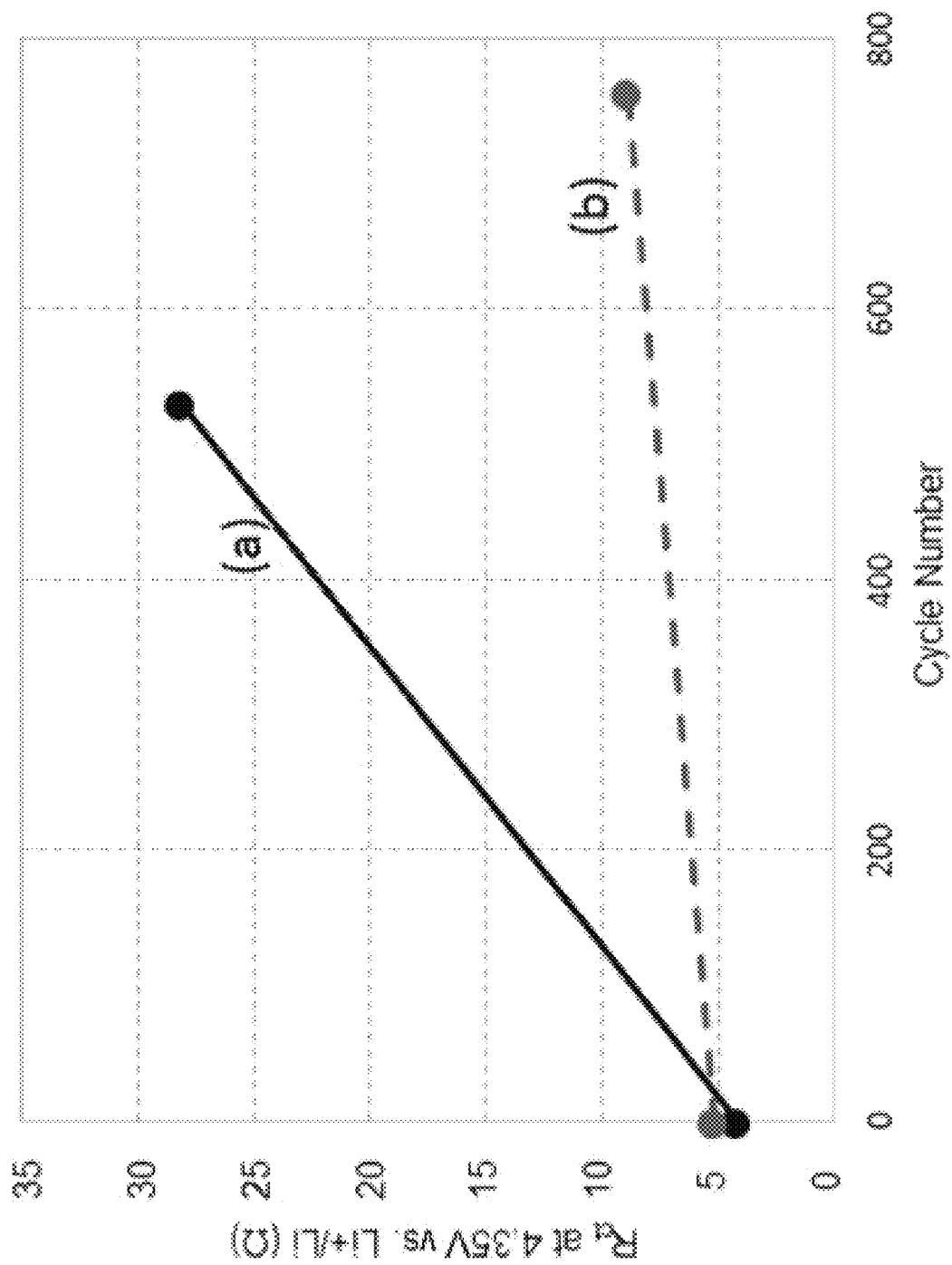
FIG. 8B depicts test results for full-cell NMC811-Graphite pouch cells with and without ALD coated $Al_2O_3$ at a cycling rate of 1C and voltage window of 4.35V-3V.

FIG. 8B shows test results for full-cell NMC811-Graphite pouch cells with and without ALD coated $Al_2O_3$ at a cycling rate of 1C and voltage window of 4.35V-3V. The horizontal axis shows the cycle number, the vertical axis shows the charge-transfer component of impedance measured by electrochemical impedance spectroscopy (EIS). Lines (a) and (b) show the charge-transfer component of the impedance measured by EIS for NMC811 fresh electrodes and electrodes cycled in pouch cells (the same pouch cells as used in obtaining the cycle life test results). Specifically, line (a) shows the charge-transfer component of the impedance for NMC811 without modification (i.e., NMC811 without ALD coating) and line (b) shows the charge-transfer component of the impedance fir NMC811 ALD-coated with $Al_2O_3$. As shown in FIG. 8B, with ALD coating using the charge-transfer component of the impedance is reduced. For example, at cycle number 400, the charge-transfer component of the impedance is about 22.5 Ohm on line (a) (without. ALD coating), and about 7.5 Ohm on line (b) (with ALD coating). The 1C/–1C cycle life trends show that ALD coating can reduce the impedance of the battery.

Figure 9A:
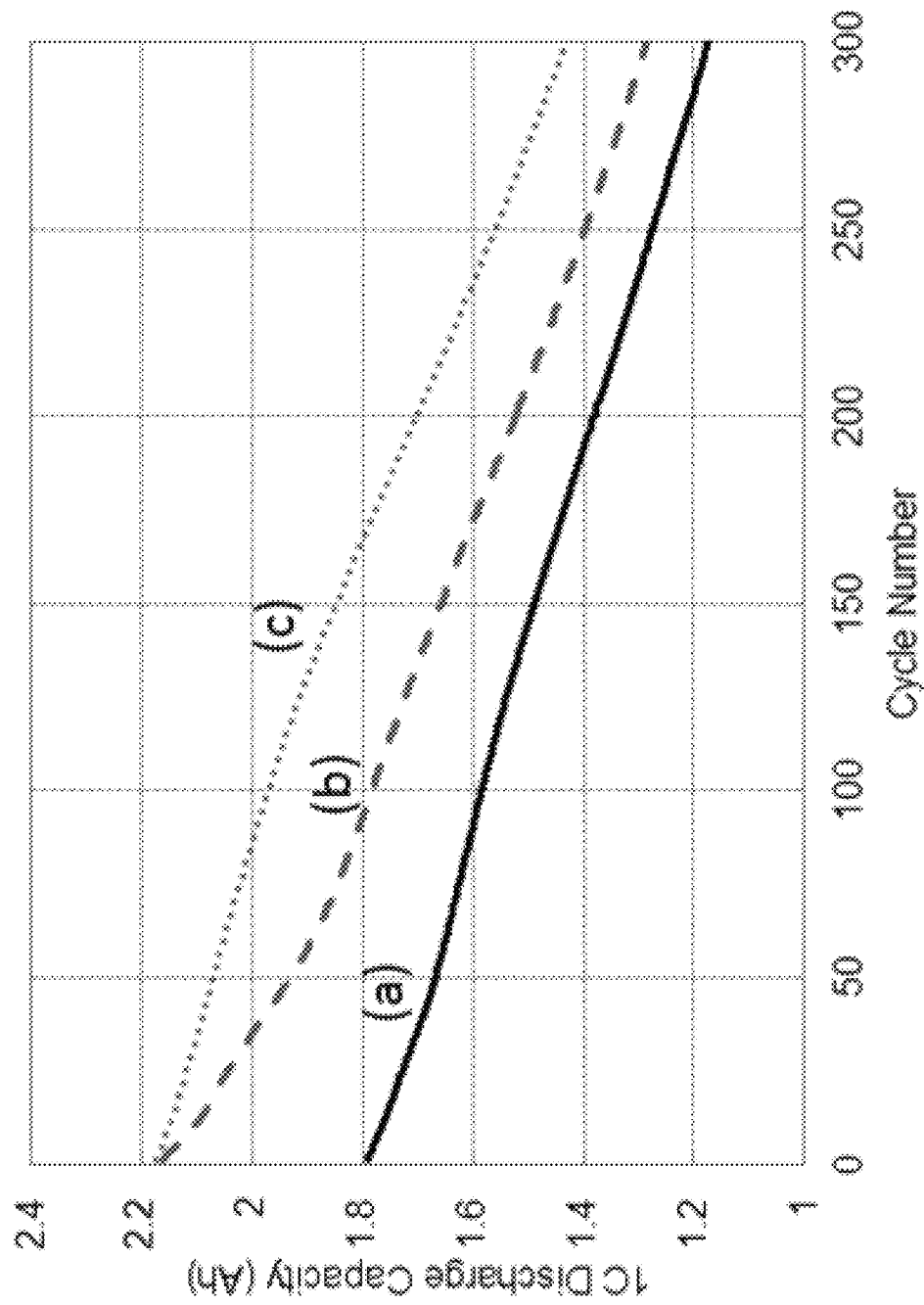
FIG. 9A depicts test results for full-cell NCA-Graphite pouch cells with and without ALD coated $Al_2O_3$ or $T_iO_2$ at a cycling rate of 1C and voltage window of 4.4V-3V.

FIG. 9A shows test results for full-cell NCA-Graphite pouch cells with and without ALD coated $Al_2O_3$ or $T_iO_2$ at a cycling rate of 1C and voltage window of 4.4V-3V. The horizontal axis shows the cycle number, and the vertical axis shows the 1C discharge capacity in Ampere hours (Ah). The active cathode material used is Lithium Nickel Cobalt Aluminum Oxide (NCA), e.g., $LiNi_{0.8}Co_{0.15}Al_{0.05}O_2$ (NCA), The solid line (a) shows results for unmodified NCA (i.e., NCA without ALD coating), the dashed line (h) shows results for NCA ALD-coated with $Al_2O_3$, and the dotted line (c) shows results for NCA ALD-coated with $T_iO_2$. As shown in FIG. 9A, the 1C cycle life trends show that the cycle life is enhanced with $Al_2O_3$ coating or $T_iO_2$ coatings. For example, at a given discharge capacity (e.g., 1.4 Ah), the cycle life for unmodified. NCA is about 190, while the cycle life for NCA ALD-coated with $Al_2O_3$ is about 250, and the cycle life for NCA ALD-coated with $T_iO_2$ is about 300. The cycle life increase is attributed to the $Al_2O_3$ or $T_iO_2$ coatings on the cathode particles of the cell.

Figure 9B:
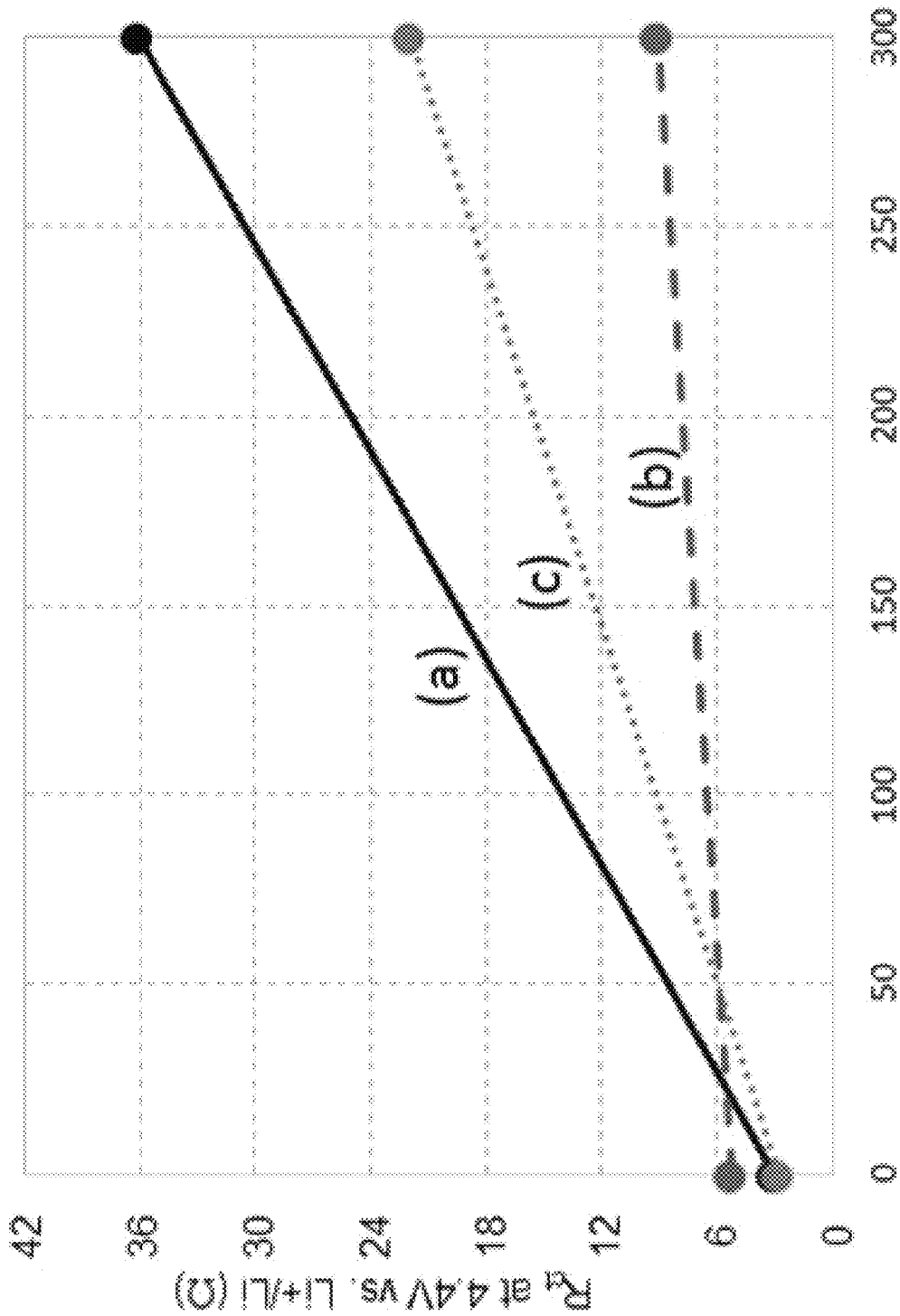
FIG. 9B depicts test results full-cell NCA-Graphite pouch cells with and without ALD coated $Al_2O_3$ or $T_iO_2$ at a cycling rate of 1C and voltage window of 4.4V-3V.

FIG. 9B shows test results full-cell NCA-Graphite pouch cells with and without ALD coated $Al_2O_3$ or $T_iO_2$ at a cycling rate of 1C and voltage window of 4.4V-3V. The active cathode material used is Lithium Nickel Cobalt Aluminum Oxide (NCA), e.g., $LiNi_{0.8}Co_{0.15}Al_{0.05}O_2$ (NCA). The horizontal axis shows the cycle number, the vertical axis shows the charge-transfer component of the impedance in Ohm, Solid line (a) shows the charge transfer component of impedance for pouch cells with unmodified NCA (i.e., NCA without ALD coating). Dashed line (b) shows the charge transfer component of impedance for pouch cells with NCA ALD-coated with $Al_2O_3$. Dotted line (c) shows the charge transfer component of impedance for pouch cells with NCA ALD-coated with $T_iO_2$. As shown in FIG. 9B, both lines (b) and (c) show reduced impedance when compared to line (a). In other words, both ALD coatings (with $Al_2O_3$ and with $W_2$) reduces the impedance of the battery.

Figure 9C:
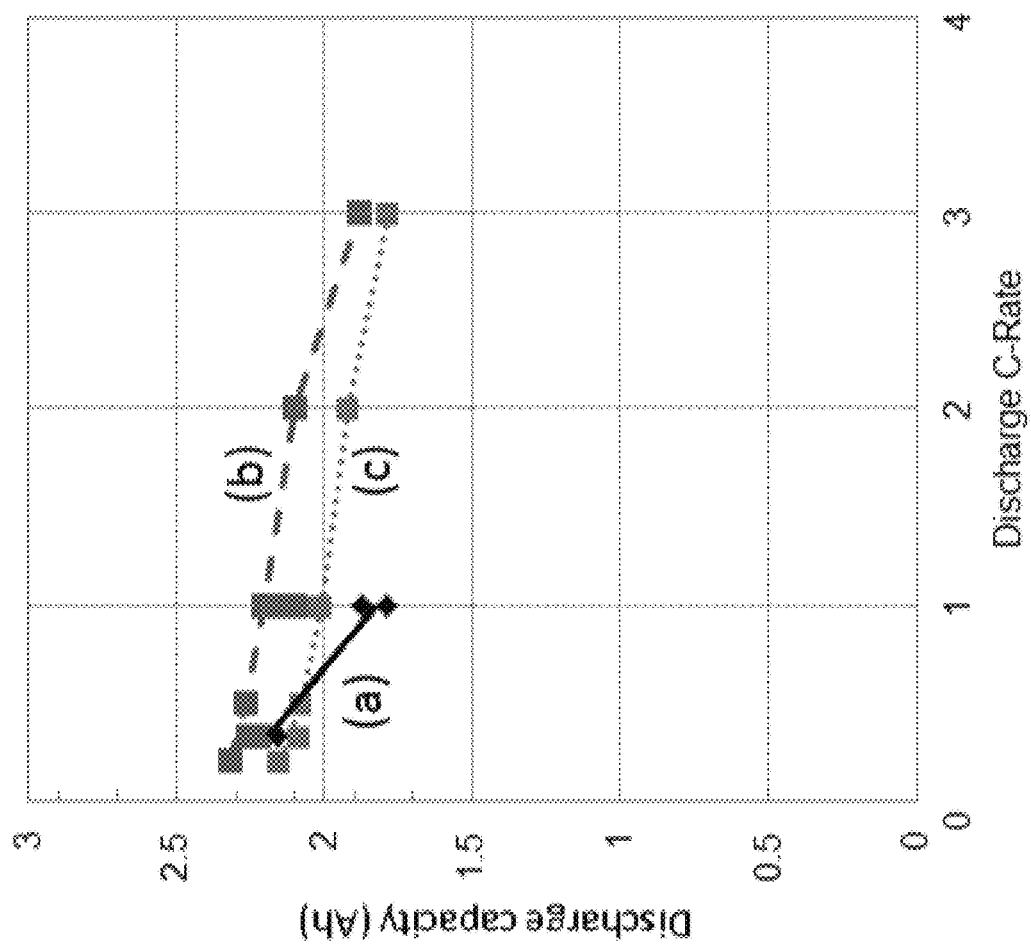
FIG. 9C depicts the full-cell (NCA/Graphite) capacity at different discharge rates from 4.4V-3V relative to $Al_2O_3$ or $T_iO_2$ coated NCA particles.

FIG. 9C depicts the full-cell (NCA/Graphite) capacity at different discharge rates from 4.4V-3V relative to $Al_2O_3$ or $T_iO_2$ coated NCA particles. The horizontal axis shows the discharge C-rate, and the vertical axis shows the discharge capacity in Ah. Solid line (a) shows the discharge rate capability results for pouch cells with unmodified. NCA (i.e., NCA without ALD coating). Dashed line (b) shows the discharge rate capacity results for pouch cells with NCA ALD-coated with $Al_2O_3$. Dotted line (c) shows the discharge rate capacity results for pouch cells with NCA ALD-coated with $T_iO_2$. FIG. 9C shows that the $Al_2O_3$ coated particle cell (dashed line (b)) has 19% higher capacity than the uncoated particle cell (solid line (a)) at the 1C rate. FIG. 9C also shows that the $T_iO_2$ coated particle cell (dotted line (c)) has 11% higher capacity than the uncoated particle cell (solid line (a)) at 1C rate. The capacity increase is attributed to the $Al_2O_3$ and $T_iO_2$ coatings on the cathode particles in the cells.

Peukert Coefficient is calculated based on the lines (a)-(c) shown in FIG. 9C. The Peukert. Coefficient is 1.15 for NCA without ALD coating, 1.04 for NCA ALD-coated with $Al_2O_3$, and 1.03 for NCA ALD-coated with $T_iO_2$. As shown in FIG. 9C, the ALD coatings (with $Al_2O_3$, and with $T_iO_2$) help with capacity retention during higher discharge C-rate. For example, at 1C discharge rate, the NCA with ALD coatings (lines (b) and (c)) both show higher discharge capacity as compared with the NCA without coating (line (a)).

Figure 10A:
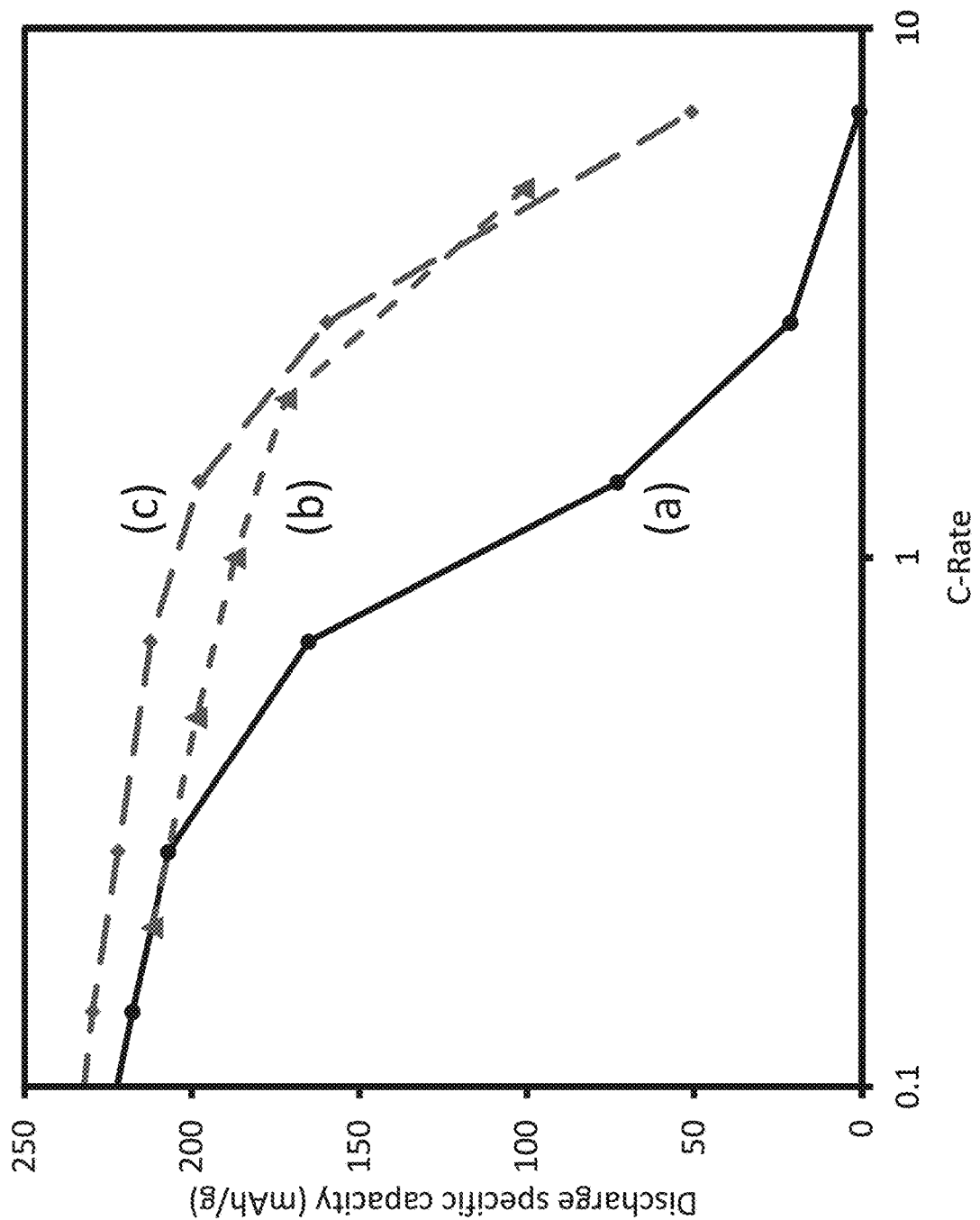
FIG. 10A depicts the half-cell (NMC811/Lithium) capacity at different discharge rates from 4.8V-3V vs. Li of an embodiment of the present disclosure relative to electrodes made from $Al_2O_3$ and LiPON coated NMC particles.

FIG. 10A depicts the half-cell (NMC811/Lithium) capacity at different discharge rates from 4.8V-3V vs. Li of an embodiment of the present disclosure relative to electrodes made from $Al_2O_3$ and LiPON coated NMC particles. Solid line (a) shows the discharge rate (or specific) capacity results for the half cell with unmodified NMC811 (i.e., NMC811 without ALD coating). Dashed line (b) shows the discharge rate capacity results for the half cell with NMC811 ALD-coated with $Al_2O_3$. Dashed line (c) shows the discharge rate capacity results for the half cell with NMC811 ALD-coated with UPON. FIG. 10A shows that the $Al_2O_3$ coated particle electrode (line (b)) has higher capacity than the uncoated particle electrode (solid line (a)) at nearly all C-rates. The $Al_2O_3$ coated particle has the same capacity at the C/5 rate, 8% higher capacity at the C/3 rate, 50% higher capacity at the 1C rate, and 1,000% higher capacity at the 5C rate. FIG. 10A also shows that the LiPON coated particle electrode (line (c)) has higher capacity than the uncoated particle electrode (solid line (a)) at all C-rates. The LiPON coated particle electrode has 6% higher capacity at the C/5 rate, 17% higher capacity at the C/3 rate, 65% higher capacity at the 1C rate, and 1,000% higher capacity at the 5C rate. The capacity increase is attributed to the LiPON coating on the cathode particles in the cell.

The Peukert Coefficient is calculated based on the lines (a)-(c) shown in FIG. 10A. The Peukert Coefficient is 1.44 for NMC811 without ALD coating, 1.08 for NMC811 ALD-coated with $Al_2O_3$, and 1.06 for NMC811 ALD-coated with UPON.

Figure 10B:
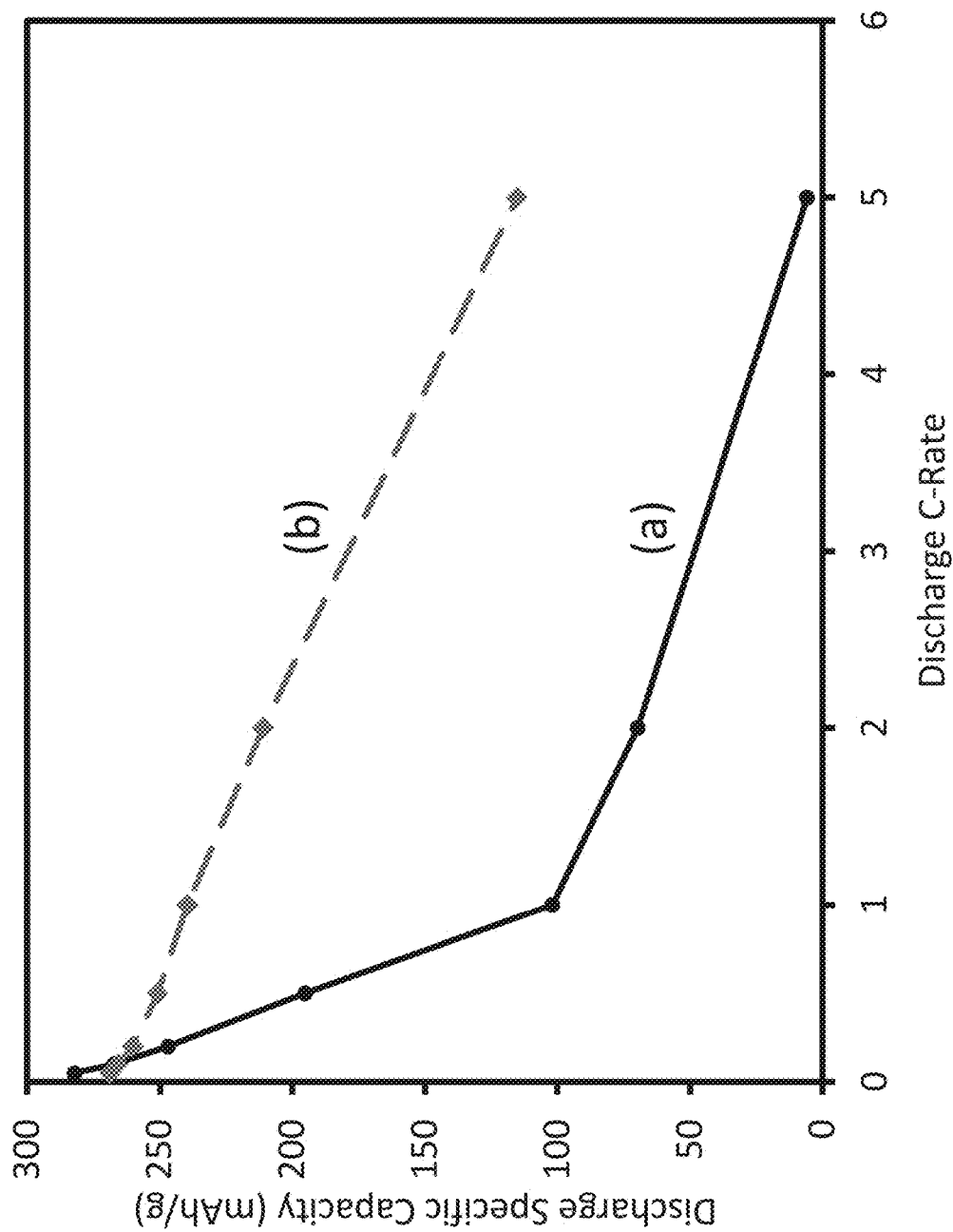
FIG. 10B depicts the half-cell (LMR-NMC/Lithium) capacity at different discharge rates from 4.8V-3V vs. Li of an embodiment of the present disclosure relative to electrodes made from LiPON coated NMC particles.

FIG. 10B depicts the half-cell (LMR-NMC/Lithium) capacity at different discharge rates from 4.8V-3V vs. Li of an embodiment of the present disclosure relative to electrodes made from LiPON coated NMC particles. FIG. 10B shows that the LiPON coated particle electrode (line (b)) has higher capacity than the uncoated particle electrode (line (a)) at all C-rates. The LiPON coated particle has 5% higher capacity at the C/5 rate, 28% higher capacity at the C/3 rate, 234% higher capacity at the 1C rate, and 3,700% higher capacity at the 5C rate. The capacity increase is attributed to the LiPON coating on the cathode particles in the cell.

Figure 10C:
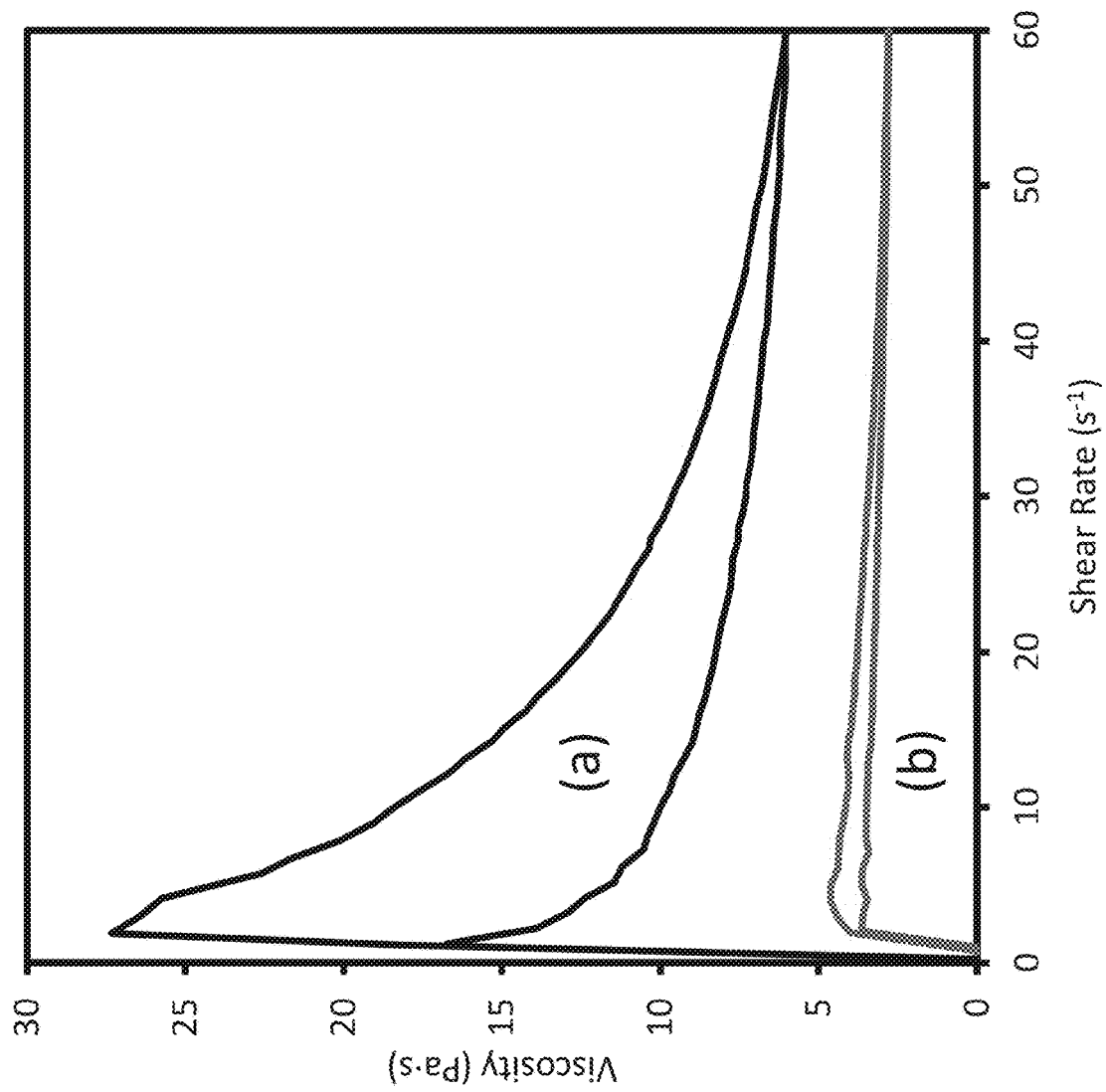
FIG. 10C depicts the viscosity vs shear rate for NMC811 with and without ALD coating.

FIG. 10C depicts the viscosity vs shear rate for NMC811 with and without ALD coating. The horizontal axis shows the shear rate, and the vertical axis shows the viscosity. Lines (a) shows the viscosity vs. shear rate for unmodified NMC811 (i.e., NMC811 without ALD coating). Lines (b) shows the viscosity vs. shear rate for NMC811 ALD-coated with $Al_2O_3$. The higher viscosity for an equivalent slurry of the unmodified NMC811, as well as the larger hysteresis between increasing and decreasing shear rates, are indicators of gelation. In other words, with the ALD coating, gelation in a battery can be reduced or prevented.

Embodiments of the present disclosure preferably include a thin coating. Nano-engineered coating 20 may be applied at a thickness between 2 and 2,000 nm. In an embodiment, nano-engineered coating 20 may be deposited at a thickness between 2 and 10 nm, 2 and 20 nm, 5 and 15 nm, 10 and 20 nm, 20 and 5 nm, etc.

In certain embodiments of the present disclosure, the thickness of coating 20 is also substantially uniform. However, uniformity may not be required for all applications with the nano-engineered coating. In some embodiments, the coating can be non-uniform. As embodied herein, a thin coating 20 is within 10% of the target thickness. In an embodiment of the present disclosure, thin coating 20 thickness is within about 5% of the target thickness. And, in another embodiment, thin coating thickness is within about 1% of the target thickness. Certain techniques of the present disclosure, such as atomic layer deposition, are readily able to provide this degree of control over the thickness of coating 20, to provide a uniform thin coating.

In some embodiments, the thickness of nano-engineered coating 20 may vary such that the coating is not uniform. For example, coating 20 that varies in thickness by more than about 10% of a target thickness of coating 20 may be considered as not uniform. Nonetheless, coatings varying in thickness by more than 10% are considered to be within the scope of non-uniform coatings of embodiments of the present invention.

As embodied herein, coating 20 may be applied to active material (e.g., cathode and anode) particles 10 either before forming a slurry of active material. Preferably, coating 20 is applied to the particles 10 of an active material before forming a slurry and pasting to form an electrode. Similarly, coating 20 may be applied to a solid-state electrolyte. In various embodiments, coating 20 is disposed between the electrode active material (e.g., cathode and/or anode) and electrolyte, whether liquid or solid-state electrolyte, to inhibit side reactions and maintain capacity of the electrochemical cell.

In an embodiment of the present disclosure, nano-engineered coating 20 conforms to the surface of the active material particle 10 or solid state electrolyte 160. Coating 20 preferable maintains continuous contact with the active material or solid-state electrolyte surface, filling interparticle and intraparticle pore structure gaps. In this configuration, nano-engineered coating 20 serves as a lithium diffusion barrier.

In certain embodiments, nano-engineered coating 20 may substantially impede or prevent electron transfer from the active material to SEI. In alternative embodiments, it may be conductive. Nano-engineered coating 20 form an artificial SEI. In an embodiment of the present disclosure, coating 20 limits electrical conduction between the electrolyte and the active material (e.g., cathode and/or anode) in a way that electrolyte 160 does not experience detrimental side reactions, e.g., oxidation and reduction reactions, while permitting ionic transfer between the active material and the electrolyte. In certain embodiments, nano-engineered coating 20 is electrically conductive and, preferably, has a higher electrical conductivity than the active material. In other embodiments, nano-engineered coating 20 is electrically insulating, and may have a lower electrical conductivity than the active material. The coating 20 can be applied to the particles or the electrodes, and can be made of an ionic solid or liquid, or covalent bonded materials such as polymers, ceramics, semiconductors, or metalloids.

Figure 14:
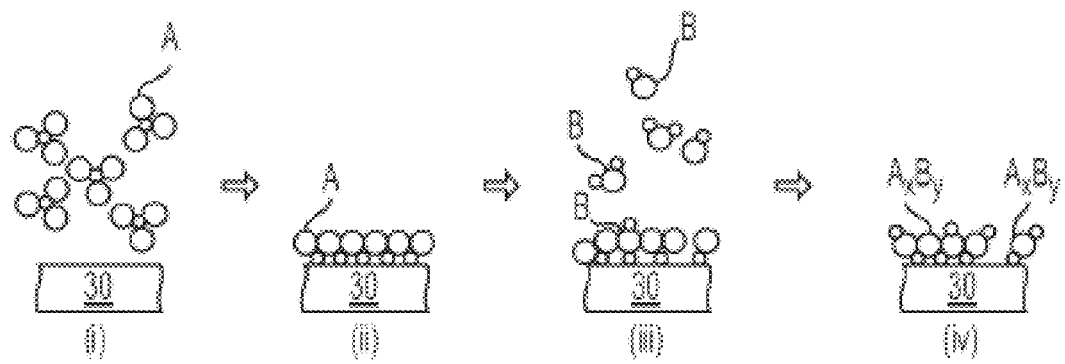
FIG. 14 is a schematic depiction of a process for manufacturing a coating of an embodiment of the present disclosure using atomic layer deposition.

FIG. 14 is a schematic illustration of a multi-step application process for forming a coating on an active material (cathode and/or anode) or a solid-state electrolyte. As depicted in FIG. 14, nano-engineered coating 20 is applied to surface 30 of particle 10 or solid-state electrolyte 160. Coating 20 is formulated and applied so that it forms a discrete, continuous coating on surface 30. Coating may be non-reactive with surface 30 or may react with surface 30 in a predictable way to form a nano-engineered coating on surface 30. Preferably, coating 20 is mechanically-stable, thin, uniform, continuous, and non-porous. The detailed description of the process shown in FIG. 14 is discussed later.

In certain embodiments of the present disclosure, nano-engineered coating 20 may include an inert material. The present inventors consider several formulations of the coated active material particles to be viable. Coatings may be applied to the active material precursor powders, including: (i) metal oxide; (ii) metal halide; (iii) metal oxyflouride; (iv) metal phosphate; (v) metal sulfate; (vi) non-metal oxide; (vii) olivine(s); (viii) NaSICON structure(s); (ix) perovskite structure(s); (x) spinel structure(s); (xi) polymetallic ionic structure(s); (xii) metal organic structure(s) or complex(es); (xiii) polymetallic organic structure(s) or complex(es); (xiv) structure(s) with periodic properties; (xv) functional groups that are randomly distributed; (xvi) functional groups that are periodically distributed; (xvii) functional groups that are checkered microstructure; (xviii) 2D periodic arrangements; and (ixx) 3D periodic arrangements. Metals that may form appropriate metal phosphates include: alkali metals; transition metals; lanthanum; boron; silicon; carbon; tin; germanium; gallium; aluminum; and indium.

The selection of a suitable coating depends, at least in part, on the material of the coating 20 and surface 30 to which it is applied. Not every one of the above coating materials will provide enhanced performance relative to uncoated surfaces on every potential active material or solid-state electrolyte material. Specifically, the coating material is preferably selected so that it forms a mechanically-stable coating 20 that provides ionic transfer while inhibiting undesirable side reactions. Suitable coating materials may be selected in a manner that the coating 20 does not react with surface 30 to cause modification to the underlying surface material in an unpredictable manner. Suitable coating materials may be selected in a manner that the coating 20 is non-porous and inhibits the direct exposure to electrolyte of the active materials.

Persons of ordinary skill in the art understand that undesirable combinations of coating 20 and surface 30 may be identified by criteria known as "Hume-Rothery" Rules (H-R). These rules identify thermodynamic criteria for when a solute and solvent will react in solid state, giving rise to solid solutions. The H-R rules may help identify when undesirable reactions between coating 20 and surface 30 may occur. These rules include four criteria. When the criteria are satisfied, undesirable and uncontrolled reactions between the coating and underlying active material may occur. Even if all four of the criteria are satisfied, a particular combination of coating 20 and substrate 30 may, nonetheless, be viable, namely, be mechanically-stable and effective as a coating of the present disclosure. Other thermodynamic criteria, in addition to the H-R rules, may be required to initiate reaction between the coating 20 and surface 30. The four H-R rules are guidelines. All four of the rules need not be satisfied for side reactions to take occur, moreover, side reactions may occur even if only a subset of the rules is satisfied. Nonetheless, the rules may be useful in identifying suitable combinations of coating 20 and surface 30 materials.

First, the atomic radius of the solute and solvent atoms must differ by no more than 15%. This relationship is defined by Equation 4.

$$\% \text{ difference} = \left(\frac{r_{solute} - r_{solvent}}{r_{solvent}}\right) \times 100\% \leq 15\% \tag{4}$$

Second, the crystal structures of the solvent and solute must match.

Third, complete solubility occurs when the solvent and solute have the same valency. A metal dissolves in a metal of higher valency to a greater extent than it dissolves into one of lower valency.

Fourth, the solute and solvent should have similar electronegativity. If the difference in electronegativity is too great, the metals tend to form intermetallic compounds instead of solid solutions.

In general, when selecting coating materials, the H-R rules may be used to help identify coatings that will form mechanically-stable, thin, uniform and continuous layers of coating that will not dissolve into the underlying active materials. Hence the more thermodynamically dissimilar the active material and the coatings are, the more stable the coating will likely be.

In certain embodiments, the material composition of the nano-engineered coating 20 may meet one or more battery performance characteristics. In certain embodiments, nano-engineered coating 20 may be electrically insulating. In other embodiments, it may not. Nano-engineered coating 20 may support stronger chemical bonding with electrolyte surface 30, or cathode or anode active material surface 30, to resist transformation or degradation of the surface 30 to a greater or lesser degree. Undesirable structural transformations or degradations may include cracking, changes in metal distribution, irreversible volume changes, and crystal phase changes. In another embodiment, a nano-engineered coating may substantially prevent surface cracking.

Example 1

An embodiment of the present invention was prepared using an alumina coating on NMC811. The active material, NMC811 powder, was processed through atomic layer deposition to deposit a coating of $Al_2O_3$ on the active material particles of NMC811. Atomic layer deposition is typically performed at temperatures ranging from room temperature to over 300° C. and at deposition rates that are sufficient to ensure a satisfactory coating while providing good throughput. The NMC811 powder was coated through the ALD process under conditions sufficient to deposit a 10 nm coating of $Al_2O_3$ on the NMC active material particles. The coated particles were then used to form a slurry of active material paste that was applied to current collectors to form electrodes. The electrodes were then made into batteries and tested relative to uncoated active material.

The coated material resulted in full-cell cycle life improvements of 33% at a C/3 cycling rate as shown in FIG. 7C and an improvement of 38% at 1C cycling rate as shown in FIG. 8A. The coated material also showed improvement in half-cell rate capability testing at higher voltages, as shown in FIG. 10A. As shown in FIG. 10A, the $Al_2O_3$ coated particle has 8% higher capacity at the C/3 rate, 50% higher capacity at the 1C rate, and 1,000% higher capacity at the 5C rate when compared to the uncoated material when charged to 4.8V vs. Li.

X-ray Photoelectron Spectroscopy was used to analyze the SEI on the surface of graphite anodes cycled in pouch cells with modified and unmodified NMC811 cathodes at 1C/–1C. Anode samples were analyzed from pouch cells with 3 different cathodes, uncoated NMC811, NMC811 coated with $Al_2O_3$, and NMC811 coated with $T_iO_2$. Depth profiling results showed that the surface 1 nm of the SEI of the graphite cycled with uncoated NMC811 was enriched in phosphorous, whereas the phosphorous content was constant with depth for the graphite samples cycled with $Al_2O_3$ and $T_iO_2$-coated NMC811. Results also showed that Mn was present in the SEI of the graphite cycled with uncoated NMC811, but no Mn was detected for the graphite samples cycled with $Al_2O_3$ and $T_iO_2$-coated NMC811.

Example 2

An embodiment of the present invention was prepared using an alumina coating on NCA. The active material, NCA powder, was processed through atomic layer deposition to deposit a coating of $Al_2O_3$ on the active material particles of NCA. Atomic layer deposition is typically performed at temperatures ranging from room temperature to over 300° C. and at deposition rates that are sufficient to ensure a satisfactory coating while providing good throughput. The NCA powder was coated through the ALD process under conditions sufficient to deposit a 10 nm coating of $Al_2O_3$ on the NCA active material particles. The coated particles were then used to form a slurry of active material paste that was applied to current collectors to form electrodes. The electrodes were then made into batteries and tested relative to uncoated active material.

The coated material resulted in full-cell cycle life improvements of 31% at 1C cycling rate as shown in FIG. 9A. The coated material also showed an improvements in capacity of 19% at the 1C discharge rate, as shown in FIG. 9C.

Example 3

An embodiment of the present invention was prepared using a titania coating on NCA. The active material, NCA powder, was processed through atomic layer deposition to deposit a coating of $T_iO_2$ on the active material particles of NCA. Atomic layer deposition is typically performed at temperatures ranging from room temperature to over 300° C. and at deposition rates that are sufficient to ensure a satisfactory coating while providing good throughput. The NCA powder was coated through the ALD process under conditions sufficient to deposit a 10 nm coating of $T_iO_2$ on the NCA active material particles. The coated particles were then used to form a slurry of active material paste that was applied to current collectors to form electrodes. The electrodes were then made into batteries and tested relative to uncoated active material.

The coated material resulted in full-cell cycle life improvements of 57% at 1C cycling rate as shown in FIG. 9A. The coated material also showed an improvements in capacity of 11% at the 1C discharge rate, as shown in FIG. 9C.

Example 4

An embodiment of the present invention was prepared using a LiPON coating on NMC811. The active material, NMC811 powder, was processed through atomic layer deposition to deposit a coating of LiPON on the active material particles of NMC811. Atomic layer deposition is typically performed at temperatures ranging from room temperature to over 300° C. and at deposition rates that are sufficient to ensure a satisfactory coating while providing good throughput. The NMC811 powder was coated through the ALD process under conditions sufficient to deposit a 10 nm coating of LiPON on the NMC811 active material particles. The coated particles were then used to form a slurry of active material paste that was applied to current collectors to form electrodes. The electrodes were then made into batteries and tested relative to uncoated active material.

The coated material showed improvement in half-cell rate capability testing at higher voltages. As shown in FIG. 10A, the LiPON coated particle electrode has 6% higher capacity at the C/5 rate, 17% higher capacity at the C/3 rate, 65% higher capacity at the 1C rate, and 1,000% higher capacity at the 5C rate when compared to the uncoated material when charged to 4.8V vs. Li.

Example 5

An embodiment of the present invention was prepared using a LiPON coating on LMR-NMC. The active material, LMR-NMC powder, was processed through atomic layer deposition to deposit a coating of LiPON on the active material particles of LMR-NMC. Atomic layer deposition is typically performed at temperatures ranging from room temperature to over 300° C. and at deposition rates that are sufficient to ensure a satisfactory coating while providing good throughput. The LMR-NMC powder was coated through the ALD process under conditions sufficient to deposit a 10 nm coating of LiPON on the LMR-NMC active material particles. The coated particles were then used to form a slurry of active material paste that was applied to current collectors to form electrodes. The electrodes were then made into batteries and tested relative to uncoated active material.

The coated material showed improvement in half-cell rate capability testing at higher voltages. As shown in FIG. 10B, the LiPON coated particle has 5% higher capacity at the C/5 rate, 28% higher capacity at the C/3 rate, 234% higher capacity at the 1C rate, and 3,700% higher capacity at the 5C rate when compared to the uncoated material when charged to 4.8V vs. Li.

In certain embodiments, nano-engineered coating 20 may substantially prevent cathode metal dissolution, oxidation, and redistribution. FIG. 4A depicts an uncoated active material before cycling. As depicted in FIG. 4A, the surface is nonporous, compact, and uniform. FIG. 4B depicts the cathode material of FIG. 4A after experiencing cathode metal dissolution, oxidation, and redistribution. The surface appears porous, rough and non-uniform.

In some embodiments, nano-engineered coating 20 may mitigate phase transition. For example, in an uncoated material, such as that depicted in FIGS. 4B and 5B, cycling of the active material results in a phase transition of layered-NMC to spinel-NMC. This spinel form has a lower capacity. This transition is depicted in FIGS. 6A and 6B as a change in position of the reciprocal lattice points. In a coated material of the present disclosure, an alumina coating of $Al_2O_3$ is applied in a thickness of about 10 nm to the cathode active material particles. Upon cycling of the coated active material, no change is seen in the peaks of the SEM images. And no degradation of the lattice and of the surface after cycling is observed.

In some embodiments, nano-engineered coating 20 may enhance lithium-ion conductivity and lithium-ion solvation in the cathode. FIGS. 8B and 9B depict the cycling performance of with an ALD coating, which exhibits a lower charge-transfer component of the impedance than the uncoated active material. This is due to Li-ion conductivity remaining high over cycling.

In some embodiments, nano-engineered coating 20 may filter passage of other atoms and/or molecules on the basis of their sizes. In some embodiments, the material composition of the nano-engineered coating 20 is tailored to support size selectivity in ionic and molecular diffusion. For example, coating 20 may allow lithium ions to diffuse freely but larger cations, such as cathode metals and molecules such as electrolyte species, are blocked.

In some embodiments, nano-engineered coating 20 includes materials that are elastic or amorphous. Exemplary coatings 20 include complexes of aluminum cations and glycerol, complexes of aluminum cations and glucose. In some of those embodiments, coating 20 maintains conformal contact with active material surfaces even under expansion. In certain embodiments, coating 20 may assist surface 30 to which it is applied in returning to its original shape or configuration.

In some embodiments, nano-engineered coating 20 includes materials such that diffusion of intercalation ions from electrolyte 160 into coating 20 has a lower energy barrier than diffusion into active material uncoated surface 30. These may include an alumina coating of lithium nickel cobalt aluminum oxide, for example. In some embodiments, nano-engineered coating 20 may facilitate free intercalation ion-transport across the interface from coating into active material thereby bonding with active material surfaces 30.

In some embodiments, nano-engineered coating 20 includes materials that undergo a solid state reaction with the active material at surface 30 to create a new and mechanically-stable structure. Exemplary materials include a titania coating of lithium-nickel-cobalt-aluminum-oxide.

In some embodiments, electrolyte 160 may be chemically stable and coating 20 may include alumina or titania coating 20 on lithium titanate.

A non-exhaustive listing of materials that may be used in the nano-engineering coating 20 may include: $Al_2O_3$, ZnO, $TiO_2$, $SnO_2$, $AlF_3$, LiPON, $Li_xFePO_4$, $B_2O_3$, $Na_xV_2(PO_4)_3$, $Li_{10}GeP_2S_{12}$, $LaCoO_3$, $Li_xMn_2O_4$, Alucone, $Rh_4(CO)_{12}$, $Mo_6Cl_{12}$, $B_{12}H_{12}$, $Li_7P_3S_{ii}$, $P_2S_5$, Block co-polymers, zeolites.

One of ordinary skill in the art would appreciate that any of the aforementioned exemplary material compositions of nano-engineered coating 20 may be used singularly or combined with one another, or with another material or materials to form composite nano-engineered coating 20.

Figure 11:
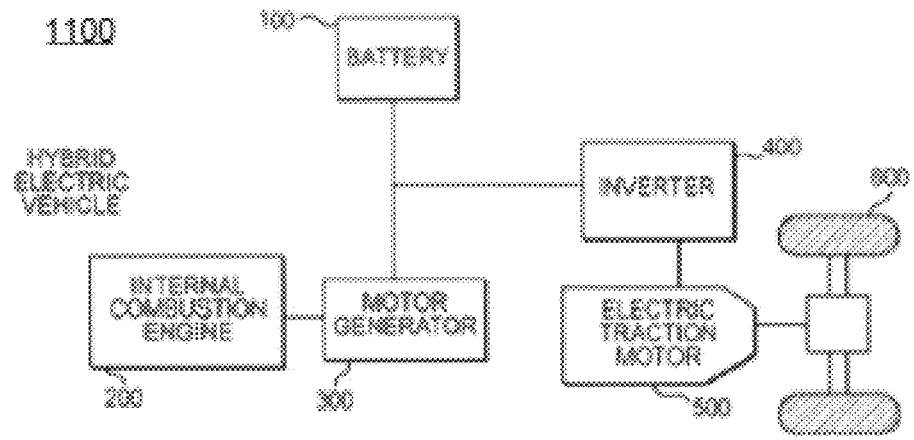
FIG. 11 is a schematic a hybrid-electric vehicle drive train.
Figure 12:
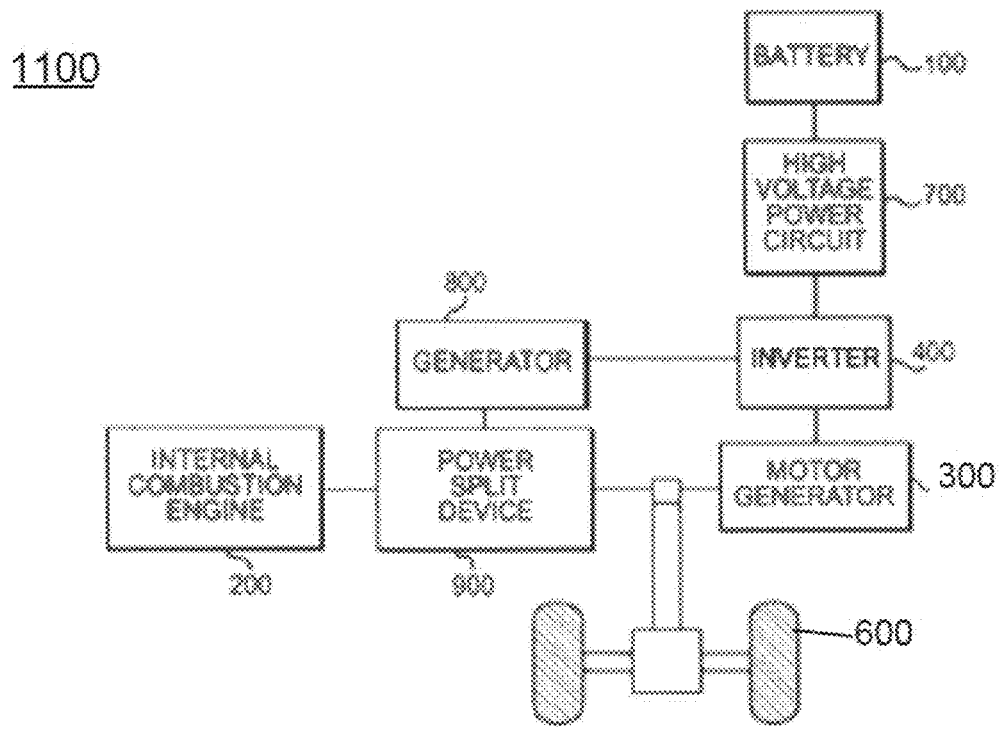
FIG. 12 is a schematic of another embodiment of a hybrid-electric vehicle drive train. Batteries of embodiments of the present disclosure may be appropriate for use in various types of electric vehicles including, without limitation, hybrid-electric vehicles, plug-in hybrid electric vehicles, extended-range electric vehicles, or mild-/micro-hybrid electric vehicles.

Batteries of embodiments of the present disclosure may be used for motive power or stationary power applications. FIGS. 11 and 12 are schematic diagrams depicting an electric vehicle 1100 having a battery 100 of an exemplary embodiment of the present disclosure. As depicted in FIG. 11, vehicle 1100 may be a hybrid-electric vehicle. An internal combustion engine (ICE) 200 is linked to a motor generator 300. An electric traction motor 500 is configured to provide energy to vehicle wheels 600. Traction motor 500 may receive power from either battery 100 or motor generator 300 through a power inverter 400. In some embodiments, motor generator 300 may be located in a wheel hub and directly linked to traction motor 500. In some embodiments, motor generator 300 may be directly or indirectly linked to a transmission configured to provide power to wheels 600. In some embodiments, regenerative braking is incorporated in vehicle 1100 so that motor generator 300 receives power from wheels 600 as well. As shown in FIG. 12, a hybrid-electric vehicle 1100 may include other components, such as a high voltage power circuit 700 configured to control battery 100. The high voltage power circuit 700 may be disposed between the battery 100 and the inverter 400. Hybrid-electric vehicle 1100 may include a generator 800 and a power split device 900. The power split device 900 may be configured to split the power from the internal combustion engine 200 into two parts. One part of the power may be used to drive the wheels 600, another part of the power may be used to drive the generator 800 to generate electricity using the power from the internal combustion engine 200. The electricity generated by generator 800 may be stored in battery 100.

As depicted in FIGS. 11 and 12, an embodiment of the present disclosure may be used in battery 100. As depicted in FIGS. 11 and 12, battery 100 may be a lithium-ion battery pack. In other embodiments, battery 100 may be of other electrochemistries or multiple electrochemistries. See Dhar, et al., U.S. Patent Publication No. 2013/0244063, for "Hybrid Battery System for Electric and Hybrid Electric Vehicles," and Dasgupta, et al., U.S. Patent Publication No. 2008/0111508, for "Energy Storage Device for Loads Having Variable Power Rates," both of which are incorporated herein by reference in their entireties, as if fully set forth herein. Vehicle 1100 may be a hybrid electric vehicle or all-electric vehicle.

Figure 13:
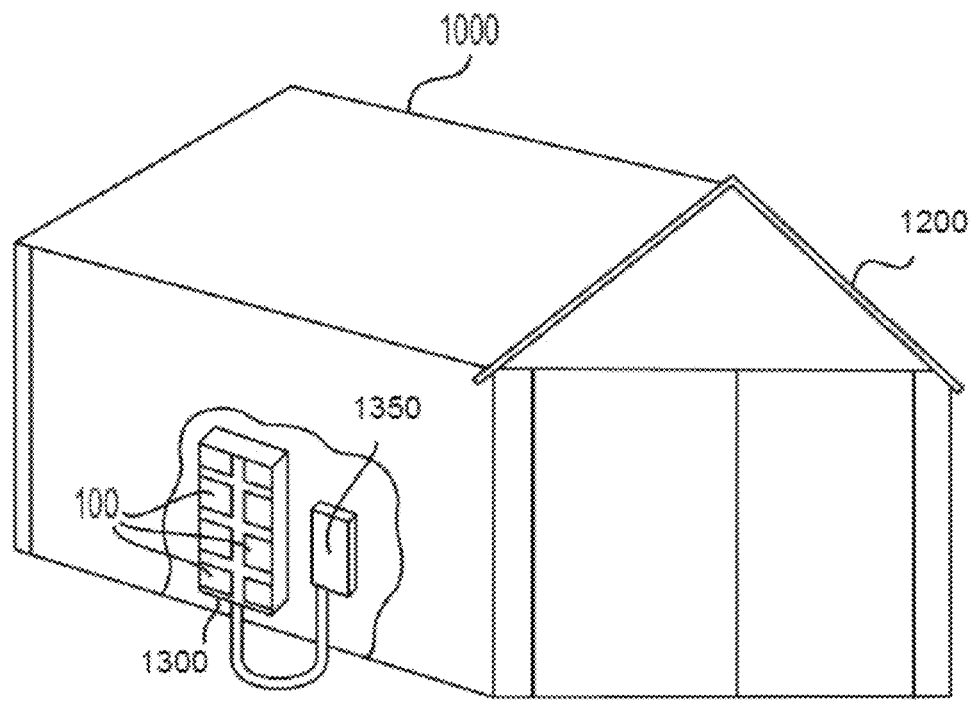
FIG. 13 depicts a stationary power application of batteries of certain embodiments of the present disclosure.

FIG. 13 depicts a stationary power application 1000 powered by battery 100. Facility 1200 may be any type of building including an office, commercial, industrial, or residential building. In an exemplary embodiment, energy storage rack 1300 includes batteries 100. Batteries 100 may be nickel cadmium, nickel-metal hydride (NiMH), nickel zinc, zinc-air, lead acid, or other electrochemistries, or multiple electrochemistries. Energy storage rack 1300, as depicted in FIG. 13, may be connected to a distribution box 1350. Electrical systems for facility 1200 may be linked to and powered by distribution box 1350. Exemplary electrical systems may include power outlets, lighting, and heating, ventilating, and air conditioning systems.

Nano-engineered coating 20 of embodiments of the present disclosure may be applied in any of several ways. FIGS. 14, 15, 16, and 17 depict schematically several alternative application methods. FIG. 14 depicts a process for coating surface 30 of a cathode active material, an anode active material, or a solid-state electrolyte material surface using atomic layer deposition (ALD). As depicted in FIG. 14, the process includes the steps of: (i) surface 30 is exposed to a precursor vapor (A) that reacts with surface 30; (ii) the reaction between surface 30 and precursor vapor (A) yields a first layer of precursor molecules on surface 30; (iii) modified surface 30 is exposed to a second precursor vapor (B); (iv) the reaction between surface 30 and precursor vapors (A) & (B) yields a second layer, bonded to the first layer, comprising compound $A_XB_Y$, $A_X$, or $B_Y$.

In this disclosure, atomic layer deposition and molecular layer deposition are used synonymously and interchangeably.

In some embodiments, nano-engineered coating 20 is applied by molecular layer deposition (e.g., coatings with organic backbones such as aluminum glyceride). Surface 30 may be exposed to precursor vapors (A) and (B) by any of a number of techniques, including, but not limited to, adding the vapors to a chamber having the electrolyte therein; agitating a material to release precursor vapors (A) and/or (B); and/or agitating a surface of electrolyte to produce precursor vapors (A) and/or (B).

In certain embodiments, atomic layer deposition is preferably performed in a fluidized-bed system. Alternatively or additionally, surface 30 may be held stationary and precursor vapors (A) and (B) may be allowed to diffuse into pores between surface 30 of particles 10. In some embodiments, surface 30 may be activated, e.g., heated or treated with a catalyst to improve contact between the electrolyte surface and precursor vapors. Atomic layer deposition is typically performed at temperatures ranging from room temperature to over 300° C. and at deposition rates that are sufficient to ensure a satisfactory coating while providing good throughput. In other embodiments, atomic layer deposition may be performed at higher or lower temperatures, e.g., lower than room temperature (or 70° F.) or temperatures ranging over 300° C. For example, atomic layer deposition may be performed at temperatures 25° C. to 100° C. for polymer particles and 100° C. to 400° C. for metal/alloy particles.

In another embodiment, surface 30 may be exposed to precursor vapors in addition to precursor A and/or B. For example, a catalyst may be applied by atomic layer deposition to surface 30. In other embodiments, catalyst may be applied by another deposition technique, including, but not limited to, the various deposition techniques discussed herein. Illustrative catalyst precursors include, but are not limited to, one or more of a metal nanoparticle, e.g., Au, Pd, Ni, Mn, Cu, Co, Fe, Pt, Ag, Ir, Rh, or Ru, or a combination of metals. Other catalysts may include, for example, PdO, NiO, $Ni_2O_3$, MnO, $MnO_2$, CuO, $Cu_2O$, FeO, $Fe_3O_4$, $SnO_2$.

In another embodiment, atomic layer deposition may include any one of the steps disclosed in Reynolds, et al., U.S. Pat. No. 8,956,761, for "Lithium Ion Battery and Method for Manufacturing of Such a Battery," which is incorporated herein by reference in its entirety as if fully set forth herein. In other embodiments, atomic layer deposition may include the step of fluidizing precursor vapor (A) and/or (B) before depositing nano-engineered coating 20 on surface 30. Kelder, et al., U.S. Pat. No. 8,993,051, for "Method for Covering Particles, Especially Battery Electrode Material Particles, and Particles Obtained with Such Method and A Battery Comprising Such Particle," is incorporated herein by reference in its entirety, as if fully set forth herein. In alternative other embodiments, any precursor (e.g., A or B) can be applied in a solid state.

In another embodiment, repeating the cycle of introducing first and second precursor vapors (e.g., A, B of FIG. 14) may add a second monolayer of material onto surface 30. Precursor vapors can be mixed before, during, or after the gas phase.

Exemplary preferred coating materials for atomic layer deposition include metal oxides, self-assembling 2D structures, transition metals, and aluminum.

Figure 15:
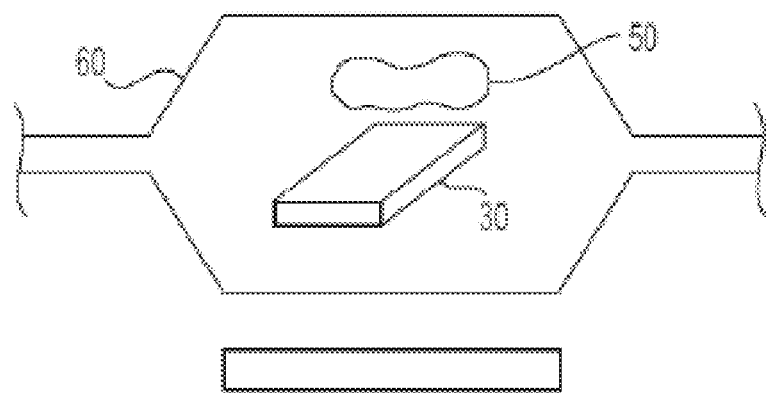
FIG. 15 is a schematic depiction of a process for manufacturing a coating of an embodiment of the present disclosure using chemical vapor deposition.

FIG. 15 depicts a process for applying coating 20 to surface 30 by chemical vapor deposition. In this embodiment, chemical vapor deposition is applied to a wafer on surface 30. Wafer is exposed to a volatile precursor 50 to react or decompose on surface 30 thereby depositing nano-engineered coating 20 on surface 30. FIG. 15 depicts a hot-wall thermal chemical vapor deposition operation that can be applied to a single electrolyte or multiple electrolytes simultaneously. Heating element is placed at the top and bottom of a chamber 60. Heating energizes precursor 50 or causes it to come into contact with surface 30. In other embodiments, nano-engineered coating 20 may be applied by other chemical vapor deposition techniques, for example plasma-assisted chemical vapor deposition.

Figure 16:
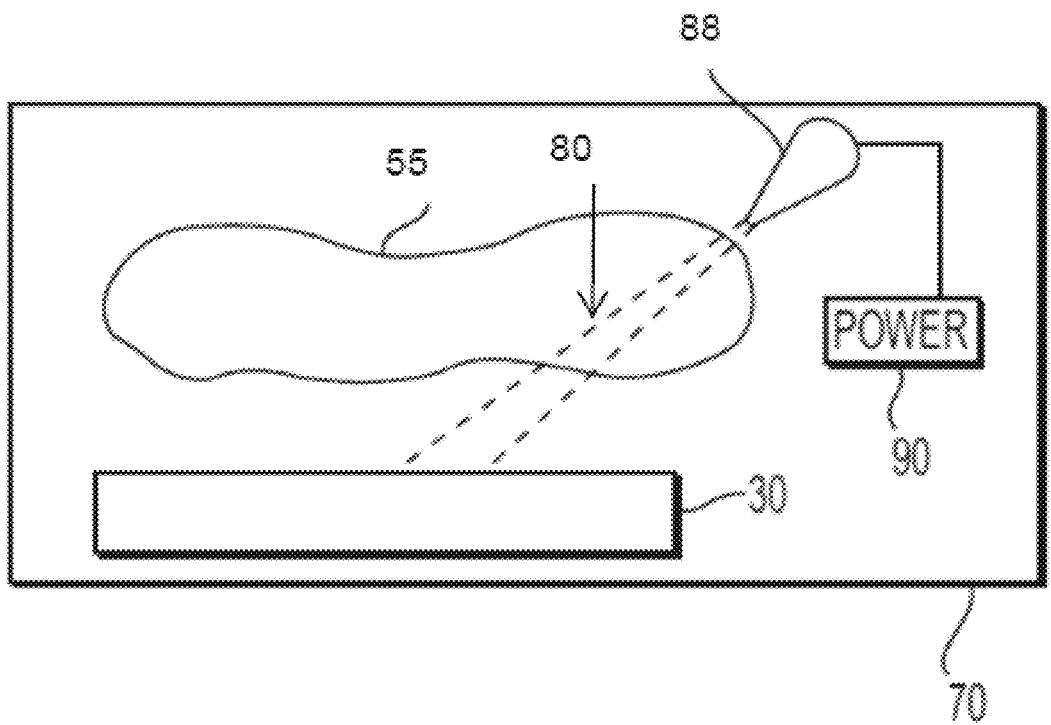
FIG. 16 is a schematic depiction of a process for manufacturing a coating of an embodiment of the present disclosure using electron beam deposition.

FIG. 16 depicts a process for applying coating 20 to surface 30 by electron beam deposition. Surface 30 and additive 55 are placed in vacuum chamber 70. Additive 55 is bombarded with an electron beam 80. Atoms of additive 55 are converted into a gaseous phase and precipitate on surface 30. Electron beam 80 is distributed by an apparatus 88 attached to a power source 90.

Figure 17:
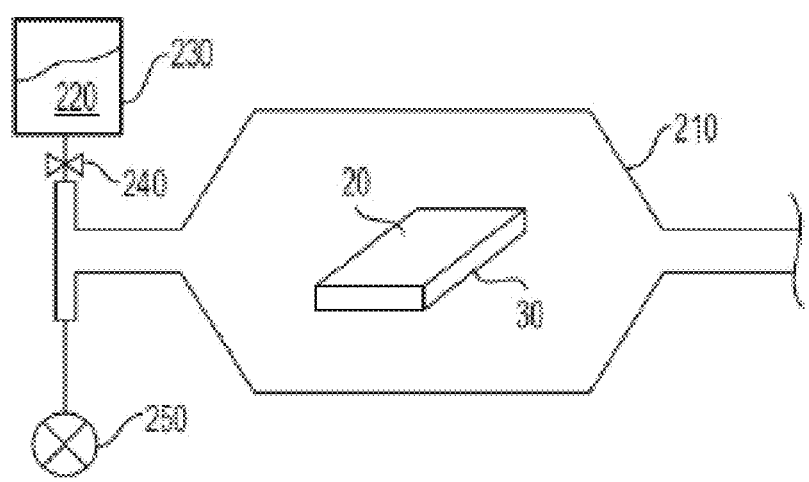
FIG. 17 is a schematic depiction of a process for manufacturing a coating of an embodiment of the present disclosure using vacuum deposition.

FIG. 17 depicts a process for applying coating 20 to surface 30 by using vacuum deposition (VD). Nano-engineered coating 20 is applied in a high-temperature vacuum chamber 210. Additives 220, stored in a reservoir 230, is supplied into the high-temperature vacuum chamber 210, where additives 220 evaporate and condensate onto surface 30. A valve 240 controls the flow of additives 220 into chamber 210. A pump 250 controls vacuum pressure in chamber 210.

Any of the aforementioned exemplary methods of applying nano-engineered coating 20 to surface 30 may be used singularly, or in combination with another method, to deposit nano-engineered coating 20 on surface 30. While one portion of surface 30 may be coated with a nano-engineered coating 20 of a certain material composition, another portion of surface 30 may be coated with a nano-engineered coating 20 of the same or different material composition.

Applications of nano-engineered coating 20 to an electrolyte surface are not limited to the embodiments illustrated or discussed herein. In some embodiments, nano-engineered coating 20 may be applied in a patterned formation to an electrolyte surface providing alternate zones with high ionic conductivity and zones of high elasticity or mechanical strength. Exemplary material selections for nano-engineered coating 20 of some embodiments include POSS (polyhedral oligomeric silsesquioxanes) structures, block co-polymer structures, 2D and 3D structures that self-assemble under an energy field or minimum energy state, such as e.g., glass free energy minima. NEC can be randomly or periodically distributed in these embodiments.

Other application techniques may also be used to apply nano-engineered coating other than those illustrated or discussed herein. For example, in other embodiments, nano-engineered coating application processes may include laser deposition, plasma deposition, radio frequency sputtering (e.g., with LiPON coatings), sol-gel (e.g., with metal oxide, self-assembling 2D structures, transition metals or aluminum coatings), microemulsion, successive ionic layer deposition, aqueous deposition, mechanofusion, solid-state diffusion, doping or other reactions.

Embodiments of the present disclosure may be implemented in any type of battery including solid-state batteries. Batteries can have different electrochemistries such as for example, zinc-mercuric oxide, zinc-copper oxide, zinc-manganese dioxide with ammonium chloride or zinc chloride electrolyte, zinc-manganese dioxide with alkaline electrolyte, cadmium-mercuric oxide, silver-zinc, silver-cadmium, lithium-carbon, Pb-acid, nickel-cadmium, nickel-zinc, nickel-iron, NiMH, lithium chemistries (like e.g., lithium-cobalt oxide, lithium-iron phosphate, and lithium NMC), fuel cells or silver-metal hydride batteries. It should be emphasized that embodiments of the present disclosure are not limited to the battery types specifically described herein; embodiments of the present disclosure may be of use in any battery type.

For example, the above disclosed nano-engineered coating 20 may be applied to lead acid (Pb-acid) batteries. In a typical lead acid battery, the production of reaction at the electrodes is lead sulfate. On charging lead sulfate is converted to $PbO_2$ on the positive electrode and to spongy lead metal at the negative electrode.

While the $PbO_2$ and lead are good semiconductors, lead sulfate is a non-conductor. Similarly on the negative electrode side, $PbSO_4$ is a non-conductor. The product of charging, namely, Pb is a good metallic conductor. As the electrodes are discharged, $PbO_2$ on the anode and Pb on the cathode are converted to lead sulfate and the resistance increases considerably. Since the realizable power is dependent on the resistance, any increase in resistance would be undesirable. This problem has been partially solved in the negative electrode by adding conducting additives which keep the resistances low despite the formation of insulating lead sulfate. For example high surface area conducting carbons can be added to the anode mix. This addition accomplishes two important activities. By virtue of the huge surface area increase, the effective operating current density is kept low and thus the cathode electrode polarization is minimized. In addition, the presence of carbon in the cathode mix improves the effective conductivity of the mix during charge or discharge. The choice of the type of carbon is important such that the additive does not influence the hydrogen over potential. If it does, there will be undesirable gassing issues. As a corollary, if the right carbon is used, it can postpone hydrogen evolution that minimizes gas evolution. At the potential the negative electrode of a lead acid battery operates, the carbon is cathodically protected so that it does not corrode or disappear. This is of great importance in the functioning of the lead acid battery.

In addition, there is a finite change in the volumes of lead sulfate and lead dioxide and lead metal. This increase in volume due to the formation of lead sulfate is a major concern for the lead acid battery. Volume changes produce stresses on the electrodes and the promote growth of the electrodes. Since lead sulfate is only sparingly soluble in the acid medium, the growth becomes somewhat permanent. With every cycle of charge and discharge, the transformation of lead sulfate to lead dioxide and lead metal is supposed to be reversible. Owing to efficiency issues, the transformation process becomes less and less reversible as the cell ages. The growth cannot be reversed by normal battery operation.

Another consequence of the lead sulfate growth is the increase in the resistance of the electrodes. The adhesion between the current collector and the active material is weakened by the presence of lead sulfate. Internal stresses also flex the grid/active material interface, leading to potential delamination. As the adhesion between the substrate and the active material becomes weaker, electrolyte enters the crevices and starts attacking the substrate leading to lead sulfate growth. Once this occurs, the resistance continues to increase.

As the demands of the auto industry for more powerful and low cost battery increase, it is essential to look for other means of reducing the module/cell resistance. The resistance of the anode appears to be a logical choice to attack the problem. Adopting a similar technique on the anode side of the electrode in addition to in the cathode side may not work well. This is mainly due to the potential at which the anode works. Also after about 60-70% charge input, the thermodynamics of the anode chemistry dictates that oxygen evolution be accompanied with the active material charging. At this anode potential and with nascent oxygen evolution, carbon addition to decrease the resistance would not be useful as the carbon will be oxidized. Any other additive to improve the conductivity of the anode will likely fail because of the potential as well as the aggressively acidic environment.

One way to solve these problems is to use atomic layer deposition technique to coat the carbon particles so that the particles would impart conductivity to the mix without getting oxidized or decomposed at the anodic potential they face.

Consistent with the disclosed embodiments, active materials may be designed to facilitate their functions according to their location and geometry within a battery pack. The functions that may be built in the electrodes include: chemical composition tailored to the electrode function (e.g., slower/faster reaction rates), weight of the electrodes to have a gradient according to the earth gravity field, gradient in electrode porosity to allow for compensating in different reaction rates at the center of the electrode stack and at the corners.

In addition, as the demands of the auto industry for more powerful and low cost battery increase, it is desirable to look for methods for keeping lead sulfate growth as low as possible so that high power capabilities can be achieved. From the cost point of view, currently, lead acid battery system is the most viable choice for the stop start applications.

Electrode growth, corrosion of the active materials, corrosion of the substrates, corrosion of the additives etc. do exist in other rechargeable battery systems and in certain fuel cells as well. Many of the active materials used in these systems either undergo volume changes, or are attacked by the environment they are exposed to, or corroded by the product of the reaction. For example, the metal hydride electrodes used in Nickel Metal Hydride batteries or the zinc electrode used in Nickel zinc or zinc air batteries, or the iron electrode used in Ni—Fe batteries all undergo corrosion as well as gradual irreversible volume changes. The decrepitation of the hydride electrode, the corrosion of cobalt and aluminum from the hydride alloy and the under-cutting of the bonding between the substrate and active materials are a few of the failure mechanisms present in nickel metal hydride cells. Similarly, "shape change" and irreversible growth contribute to the failure of Nickel zinc and zinc air batteries. Corrosion of iron electrode, gassing and poisoning of the positive electrode from contaminants leached out from the iron electrode are things to be concerned about in Ni—Fe batteries. All the nickel based positive electrodes also undergo volume changes and subsequent soft shorts and active material fall out. In all these systems it is also difficult to incorporate carbon additive in the positive electrode to improve the conductivity and reduce corrosion since carbon will be oxidized at the operating potentials of these positive electrodes. Fuel cells based on alkaline or acidic polymer electrolyte also have similar oxidation issues. In these cases carbon is used to enhance conductivity, increase surface area and provide a means to distribute the reactant gases. In the case of alkaline fuel cells, even at the cathode, carbon becomes undesirable. In spite of being at the cathodic potentials where carbon is supposed to be stable, oxygen reduction produces peroxide ions which react with the carbon additive and the substrates and undermine their stability.

Consistent with the disclosed embodiments, ALD/MLD techniques may be used to coat the positive and negative active materials with materials (e.g., nano-engineered coating materials) that keep the fundamental current producing reactions intact while containing the formation, growth and corrosion. Films produced by ALD and MLD are very thin and have sufficient amounts of nano pores to keep the reactions going while protecting the active materials. For example, atomic layer deposition technique may be used to coat the carbon particles so that the particles would impart conductivity to the mix without getting oxidized or decomposed at the anodic potential they face.

Consistent with the disclosed embodiments, active materials may be coated with protective coatings to facilitate their functions with the growth potential of active materials kept in containment. ALD/MLD coatings have been proven to be effective in preventing/postponing SEI layer formation in the lithium battery without affecting the performance. The ALD/MLD coatings may also be applied to other batteries, including most of the commercial rechargeable battery systems such as Lead Acid batteries and Nickel metal hydride batteries.

To coat the lead acid battery (or other battery) active materials, suitable precursors are selected to effectively coat the ALD coatings on the positive and negative active materials of the battery system (e.g., the lead acid battery system).

Consistent with the disclosed embodiments, electrodes may be built with different coatings applied to which using a novel technique that does not unduly increase the cost of the electrode materials but retain the functionalities.

The inventors are faced with a program of reducing the undue growth of active materials with a protective coating and evaluating its effectiveness in real life situations inside a battery. To solve the problem, the disclosed embodiments of applying the nano-engineered coatings to the active materials essentially reduce the overall resistance of the positive electrode and result in bulk addition of conducting additive to the cathode active materials. This promotes achievement of higher specific power values. The advantages of the disclosed embodiments may include lower resistance of electrodes, uniform heat and uniform chemical reaction rate/off gassing processes distribution within a pack and higher specific power realization. Cycle life can also be enhanced.

In some existing batteries, coating may be applied to negative electrodes. For positive electrodes, nano carbon additives and single walled and multi walled nano carbon additives have been used. These, however, are expensive additives whose life expectancies need to be improved.

Consistent with the disclosed embodiments, a low cost protective coating may be applied to the active materials of a lead acid battery (and other batteries) as well as to the additives.

Consistent with the disclosed embodiments, in lead acid batteries, an oxidation prevention coating may be deposited on carbon particles using atomic layer deposition (ALD). ALD coatings is a one of the more recent techniques developed to provide coatings on surfaces for various uses. This technique can be used to coat battery (e.g., lead acid battery, lithium ion battery, and any other suitable battery) active materials and achieve significant improvement in the performance and cycle life of the batteries. These coatings can also provide a certain degree of protection from thermal runaway situations. What is more remarkable about this technique is that the coatings are only under 0.1 microns, usually in the nano scale.

Some advantage of the disclosed embodiments include lowering the resistance of the Positive Active Material (PAM) and Negative Active Material (NAM) electrodes, lowering the overall resistance of the module, improving the specific power, and enhancing the cycle life.

Figure 18:
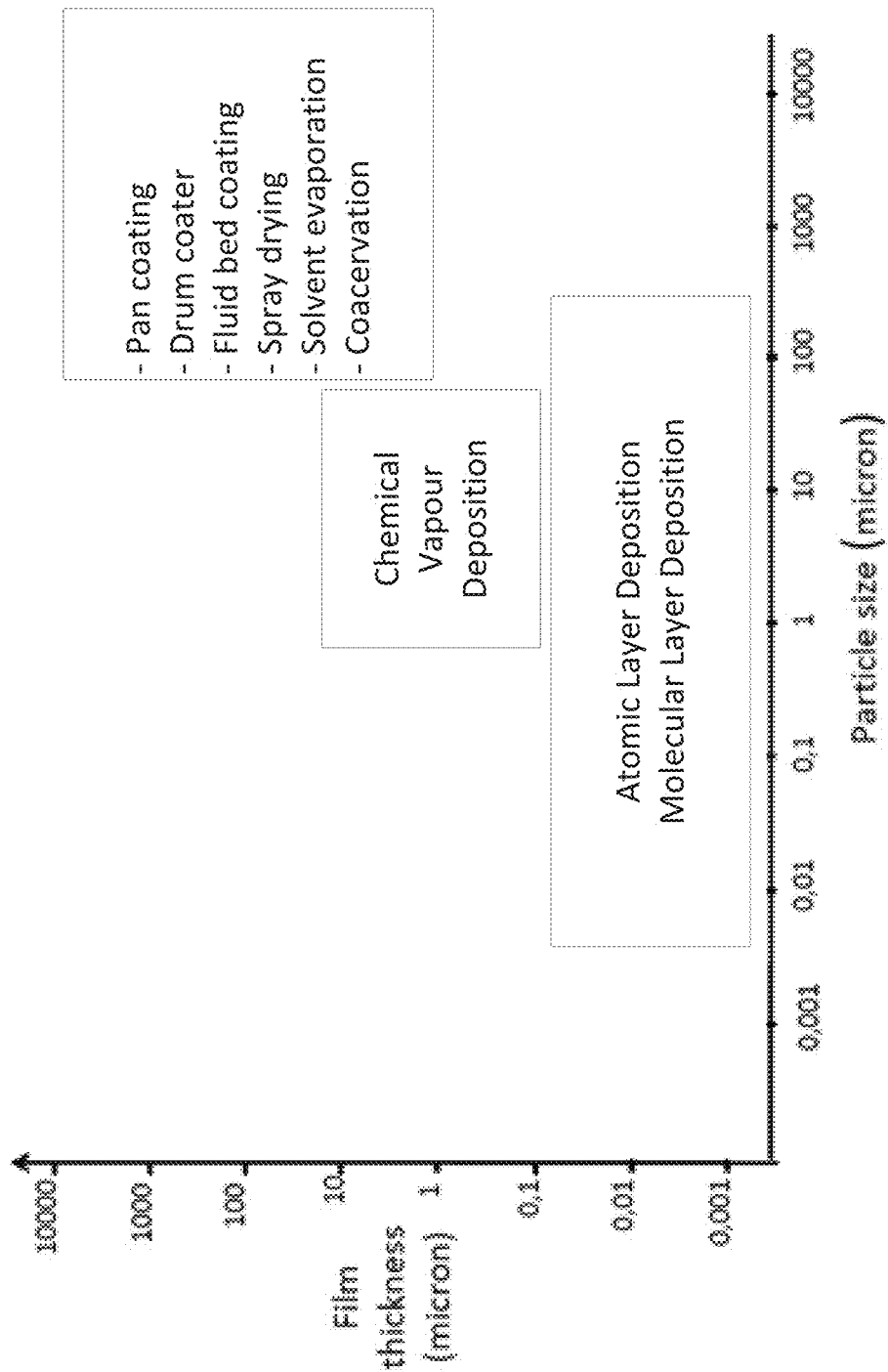
FIG. 18 shows atomic layer deposition relative to other techniques.

FIG. 18 shows atomic layer deposition relative to other techniques. As shown in FIG. 18, atomic layer deposition and molecular layer deposition use particles having sizes ranging from about 0.05 microns to about 500 microns and can produce films having thicknesses ranging from about 0.001 microns to about 0.1 microns. Chemical vapour deposition technique may use particles having sizes ranging from about 1 micron to about 80 microns, and can produce films having thicknesses ranging from about 0.1 microns to about 10 microns. Other techniques, such as pan coating, drum coater, fluid bed coating, spray drying, solvent evaporation, and coacervation may use particles having sizes ranging from about 80 microns to over 10000 microns, and can produce films having thicknesses ranging from about 5 microns to about 10000 microns. The ranges shown in FIG. 18 are schematic and illustrative only, and are not to exact scale.

ALD is a gas phase deposition technique with sub nanometer control of coating thickness. By repeating the deposition process, thicker coatings can be built as desired. These coatings are permeable to the transport of ions such as hydrogen, lithium, Pb-acid, etc., but do not allow larger ions. This is important in preventing unwanted side reactions from occurring. The disclosed embodiments may include coating carbon particles with ALD coatings and using the ALD coated carbon particles as an additive to the Positive Active Material (PAM) mix. While the carbon addition will improve the overall conductivity of the mix, oxidation of the carbon due to the electrode potential and evolution of oxygen will cease to occur thanks to the coating. The PAM/solution interface will only see the ALD coating on the electrode surface and corrosion will cease to occur.

Consistent with the disclosed embodiments, ALD/MLD coatings can be coated as discrete clusters or as continuous films depending upon whether access to other ions in solution is desired or not. Control of the open areas between the clusters can be controlled by the size of the clusters. In other words, the coating functions as nano filters on the active materials but still provide access to the reaction sites. In the case of ALD coatings on carbon particles on PAM oxygen molecules being much larger than the cluster pores, the carbon substrate will not be oxidized while other electrochemical reactions will still be allowed to proceed.

The inventors have conducted tests on the ALD coatings. Tests results show that with the ALD coatings, batteries have enhanced cycle life and reduced resistance. In addition, in the batteries with the ALD coatings, phase transition is inhibited, and gelling or gelation is hampered or inhibited. Gelation occurs in a battery when there is excessive water and heat in a mixture. The mixture turns into a gel, which does not flow. The gel can clog up the internal pipes inside the battery manufacturing plant. Clogged pipes needs to be cleaned or replaced. By coating the active materials and/or the solid state electrolyte of the battery, gelation issue can be inhibited. Test results shown in FIG. 10C demonstrates that the ALD coating can prevent or reduce gelation.

One aspect of the present disclosure involves removing LiOH species from NMC particle surfaces. Another aspect of the present disclosure also involves controlling the interaction between particle surfaces and binder additives such as PVDF or PTFE. A further aspect of the present disclosure involves controlling the surface acidity or basicity or pH. The present disclosure further includes an aspect involving particular solvents like water or NMP, or particular binder additives such as PVDF or PTFE. The disclosed ALD coating is of particular importance for materials with Ni content greater than 50% of total Ni, Mn, Co, Al, and other transition metals.

One aspect of the present disclosure involves in some order, in some combination, a layer for controlled water absorption or adsorption, or reduced absorption or adsorption, a layer for active material structure stability, a layer to provide atoms for doping other layers, a layer to provide atoms for doping the active material, and/or a layer for reducing electrolyte oxidation or controlled electrolyte decomposition and SEI information.

One aspect of the present disclosure involves enhanced battery thermal stability during events of nail penetration, short-circuit, crush, high voltage, overcharge, and other events. By coating the anode, cathode, solid-state electrolyte, a certain combination of these, or all of these, battery thermal stability can be improved The present teachings are applicable to batteries for supporting various electrical systems, e.g., electric vehicles, facility energy storage, grid storage and stabilization, renewable energy sources, portable electronic devices and medical devices, among others. "Electric vehicles" as used in this disclosure includes, but not limited to, vehicles that are completely or partially powered by electricity. The disclosed embodiments result in improved specific power performance, which will pave the way for lead acid batteries (coated with the nano-engineered coating) to be used for electric vehicles, hybrid electric vehicles, or plug-in hybrid electric vehicles.

Surface coatings and high throughput vapor deposition methods are instrumental for producing tailored compositions comprising stabilized substrates for all-solid-state secondary batteries at high efficiency and low cost. Examples of vapor deposition techniques can include chemical vapor deposition (CVD), physical vapor deposition (PVD), atomic layer deposition (ALD), molecular layer deposition (MLD), vapor phase epitaxy (VPE), atomic layer chemical vapor deposition (ALCVD), ion implantation or similar techniques. In each of these, coatings are formed by exposing a moving powder or substrate to reactive precursors, which react either in the vapor phase (e.g., in the case of CVD) or at the surface of the substrate (e.g., as in ALD and MLD). These processes can be augmented by the incorporation of plasma, pulsed or non-pulsed lasers, RF energy, and electrical arc or similar discharge techniques to further compatibilize the coating/encapsulation process with the substrate (s).

Solid-state electrolyte (SSE) layers can be produced using SSE substrates of varying compositions that initially have a sufficient ionic conductivity (on the order of $10^{-4}$-$10^{-2}$ S cm$^{-1}$) to potentially allow solid state secondary batteries comprising these materials to exhibit initial properties with equivalent performance to liquid-electrolyte comprised systems. Lithium conducting sulfide-based, phosphide-based or phosphate-based systems such as $Li_2S$—$P_2S_5$, $Li_2S$—$GeS_2$—$P_2S_5$, $Li_3P$, LATP (lithium aluminum titanium phosphate) and LiPON, with and without dopants such as Sn, Ta, Zr, La, Ge, Ba, Bi, Nb, etc., ionically-conductive polymers such as those based upon polyethylene oxide or thiolated materials, LiSICON and NaSICON type materials, and or a Garnet, and or LiPON, and or Li-NaSICon, and or Perovskites, and or NASICON structure electrolytes (such as LATP), Na Beta alumina, LLZO and even ionically-conductive oxides and oxyfluorides such as lithium lanthanum titanate, tantalate or zirconate, lithiated and non-lithiated bismuth or niobium oxide and oxyfluoride, etc., lithiated and non-lithiated barium titanate and other commonly known materials with high dielectric strength, and similar materials, combinations and derivations thereof may all be suitable as SSE substrates in the present invention. These systems are described in U.S. Pat. No. 9,903,707 and U.S. application Ser. No. 13/424,017, the entire contents of which are incorporated herein by reference. These materials may also be combined with anode and cathode materials (using conventional blending or a variety of milling techniques) prior to electrode fabrication, or otherwise used as conductive additives throughout components of a solid state, liquid-electrolyte or hybrid solid-liquid electrolyte battery cell.

An small subset of the aforementioned materials or compositions can also be deposited using vapor deposition techniques (e.g. doped and undoped LiPON, LLTO, LATP, BTO, $Bi_2O_3$, $LiNbO_3$, and others) such as CVD, PVD, and least frequently even ALD, which are pathways to incorporate the benefits of solid electrolyte materials as compatibilizing coatings between electrode and electrolyte (liquid, solid, hybrid liquid-solid or semi-solid glassy or polymeric) interfaces. Examples of such coatings and materials are described in U.S. application Ser. No. 13/651,043 and U.S. Pat. No. 8,735,003, the entire contents of which are incorporated herein by reference. In vapor deposition processes such as ALD and MLD, the particles are contacted with two or more different reactants in a sequential manner, and said reactant contacting steps may preferentially be self-limiting or not, self-terminating or not, or operated in conditions designed to promote or prevent the limitation or non-limitation thereof. In addition, any two sequential self-limiting reactions may occur most efficiently at different temperatures, which would require heating or cooling of any suitable reactor between cycle steps in order to accommodate each step and thereby capture the value of such efficiency. Ultimately to manufacture coatings and coated materials at lowest cost using vapor deposition techniques, it is commonly understood that high throughput systems that provide a transport means for the substrate, which maintaining control over the vapor deposition precursors, will provide the lowest cost per unit of produced material. Such systems are increasingly referred to as "spatial" techniques, relative to "temporal" techniques ascribed to batch systems that at most provide a recirculation means for each substrate to be coated and employ time-based processing steps. Spatial ALD is one such technique that employs an entirely different sequence than a Temporal ALD process. Example processing approaches and apparatuses suitable for Spatial ALD on particles and roll-to-roll systems for moving sheets, foils, films or webs are described in U.S. application Ser. Nos. 13/169,452, 11/446,077, and 12/993,562, and U.S. Pat. No. 7,413,982, the entire contents of which are incorporated herein by reference.

Figure 24:
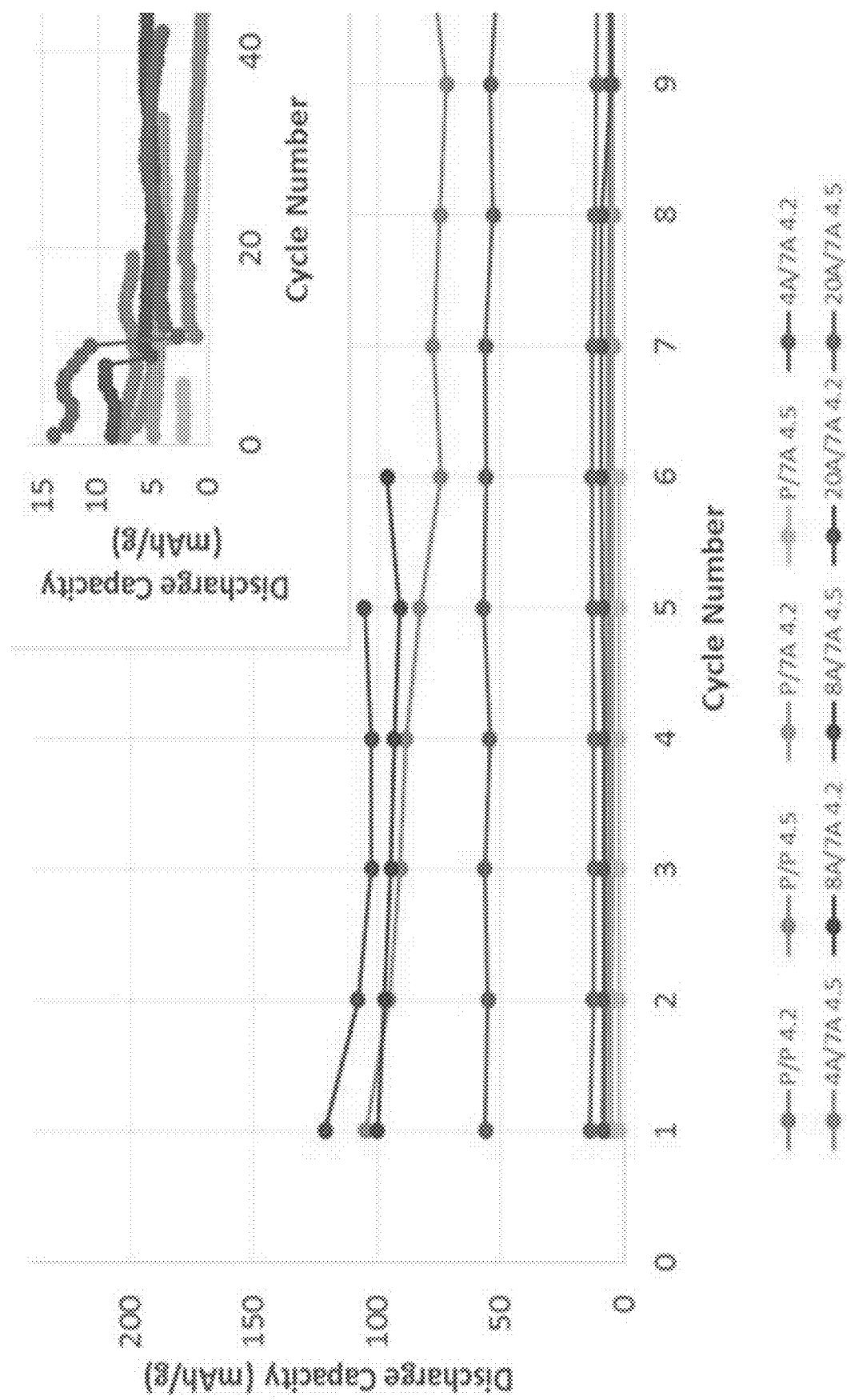
FIG. 24 shows discharge capacity of select NCA-based electrochemical cells showing huge cycling benefit of coated-SEs and coated-NCA. Plot labels indicate the type of SE, the type of NCA, and the upper cut-off voltage used, as for example, "P/P 4.5" indicates a cell made with pristine SE, pristine NCA, and an upper cut-off voltage of 4.5 V, whereas "8A/7A 4.2" indicates a cell made with 8 Cycle $Al_2O_3$-coated SE, 7 cycle $Al_2O_3$-coated NCA, and an upper cut-off voltage of 4.2 V.

For solid state energy storage systems to become cost-competitive with their commercial liquid electrolyte-based counterparts, the manufacturability and processability of such materials in common equipment is desirable. Thus it is important to allow sub-component and/or device fabrication to occur in simply a moisture-controlled environment such as a dry room, rather than an oxygen and moisture-controlled environment such as a glove box. An encapsulation coating on moisture-sensitive and/or oxygen-sensitive substrates can provide a means for such manufacturability, which would allow said materials to be "drop-in" ready in conventional processing equipment. A method for utilizing ALD to stabilize the interfaces between pre-fabricated SSE layers and pre-fabricated electrodes is described in U.S. application Ser. No. 14/471,421, which is an alternative approach to the ALD-coating of cathode powders interfaced with SSE materials described in U.S. application Ser. No. 13/424,017. However, neither of these teachings achieve the objective of being able to safely or reliably handle SSE particulate materials prior to the formation of such a bulk SSE layer or being able to intermix such materials that are intended to be as homogeneously co-located or co-mingled with the electroactive powders in the electrode layer. The ALD barrier applied in U.S. application Ser. No. 14/471,421 is preferentially polished to ensure direct contact between the electrolyte layer and the electrode layer, and as such the ALD process seems to have primarily served the purpose of filling void spaces at these interfaces, rather than to serve as a physicochemical barrier film to protect the interfaces immediately contacting one another. In addition, the present invention leads to unexpected results relative to the teachings of U.S. application Ser. No. 13/424,017, in which 10 $Al_2O_3$ ALD cycles applied to the interfaces of the electroactive cathode particles began to cause a reduction in performance in solid state batteries. In contrast, using the present invention net interfaces comprising a total number of ALD cycles exceeding 10 and sometimes 20 to 40 still provide increased performance improvements relative to pristine electrode and SSE powders and their interfaces. By way of example, FIG. 24 shows how ~15 ALD cycles at the interface of NCA and LPS SSE powder at both 4.2 V and 4.5 V top of charge exhibit an approximate 10-fold increase in capacity relative to pristine materials charged to the same voltage in the same cell configurations. Depending on growth rates and ALD conditions, this interfacial layer may be upwards of 7.5 nm in thickness. This is also different from the teachings of U.S. Pat. No. 8,993,051, in which >2 nm $Al_2O_3$ ALD films were shown to begin to decrease the performance of conventional Lithium-ion batteries that use liquid electrolytes.

The encapsulated or passivated SSE materials that are suitable for use in conventional slurry-based coating approaches used in Li-ion battery manufacturing would reduce the cost and complexity of manufacturing solid state batteries. Until now, no such encapsulation coating has been developed or demonstrated that can provide such stability to an ionically-conductive SSE material to render it suitable for processing in a conventional dry room, even as coatings used as barrier films on sulfide-based host materials in other fields. By way of example, U.S. Pat. No. 7,833,437 teaches how the ALD method can be used to encapsulate ZnS-based electroluminescent phosphor materials to render them impervious to oxygen and moisture, but tens of nanometers of coating were required, which would tend to be too thick and non-conductive, rendering such coating thicknesses unsuitable for use on SSE materials.

Many conventional SSE materials produced using solid state synthesis techniques (e.g. thermally-treating $Li_2S$, $P_2S_5$ and $GeS_2$ precursor powders in appropriate stoichiometry under appropriate conditions) tend to be in size ranges of 10-250 μm in diameter, and further post-processing techniques (e.g. ball milling and other common methods) have been deployed to reduce the size of SSE materials sometimes from 0.5-20 μm, and sometimes provide reductions to 5 μm in maximum diameter. However, the SSE particles may be made smaller through bottom-up synthesis approaches, for example, via a modification of the flame spray process described in U.S. Pat. No. 7,211,236 that is designed to produce oxygen-free materials such as sulfides or preferentially a process that at least partially incorporates a plasma spray process as described in U.S. Pat. No. 7,081,267, or similar processes; and the encapsulation process of this invention can be performed directly in-line after such SSE particles are produced using an apparatus described in U.S. patent Ser. No. 13/169,452. More generally, particles to be encapsulated in accordance with the invention can be of any type produced using known ionically-conductive particle manufacturing processes. The encapsulation process of this invention can be performed as part of an integrated manufacturing process which includes a manufacturing step to produce the particle followed directly or indirectly by the coating process of the invention. Ultimately since encapsulated SSE materials are commonly intended to be used as part of a bulk SSE layer interposed between anode and cathode, as well as in the form of a homogeneous blend of electroactive materials, binders, conductive additives or other materials, it is understood that the encapsulated SSE materials described herein may have a different coating composition or thickness when used in the bulk electrolyte layer, the portion of the electrolyte layer that is in close proximity to the anode or cathode layers but not at the interface, the actual interfaces in contact with the electrolyte and each electrode, the SSE material that is blended with electroactive powders, a layer of SSE material that interfaces with either electrode and its respective current collector, or any other useful location in which an encapsulated SSE will provide value to the produced device. By way of example, when used with cathode particles, with or without ALD coatings, of 5 μm in mean diameter with a relatively narrow size distribution, such as may be found in a cell designed for high energy density, a homogeneous blend of this material paired with an ALD-encapsulated 100 nm SSE powder derived using a plasma spray approach may provide for better uniform distribution and interstitial void space accumulation than would an encapsulated 5 μm SSE powder. In other cases, a flame or plasma spray derived 50-500 nm electroactive particle may be desirable, such as for cells designed for high power applications, and homogenizing these particles may be substantially easier when paired with 20-30 μm encapsulated SSE powders.

The optimal ALD thickness and composition of each encapsulating species has been determined to be substantially different in different circumstances. One processes and apparatus that may be suitable for such homogenization is a fluidized bed reactor, described in U.S. Pat. No. 7,658,340 and U.S. application Ser. No. 13/651,977, further advantaged by the use of vibration, stirring or micro-jet incorporation to expedite homogenization, described in U.S. Pat. No. 8,439,283. Thermal treatments that have been shown to be advantageous to SSE substrate materials and ALD coated cathode particles taught in U.S. application Ser. No. 13/424,017 can also be employed during such a dry homogenization step. SSE materials and ALD-coated electroactive materials can be thermally treated in an inert or reducing atmosphere, at 200° C.-600° C., preferably 300° C.-550° C., for a period of time, from 1 to 24 hours for example, to obtain the desired properties (typically degree of homogeneity, conductivity, interfacial composition, diffusion of coating/substrate species to form solid, glassy-solid or other pseudo-solid solutions, sulfidation of the materials, crystallite size modification, or other phenomenon understood to be beneficial to the performance of solid state batteries).

Said ALD coating encapsulating the SSE powder co-located with a cathode powder may benefit from $Ti^{3+}$ or $Ti^{4+}$ based ALD coatings found in $TiO_2$, TiN, $Ti_3N_4$, oxynitrides, TiC, etc., and synergistic incorporation of sulfur to form titanium sulfide or titanium phosphide phases. Similarly, $GeO_2$ containing ALD coatings may be particularly beneficial for cathode materials due to the potentially higher stability of germanium in the presence of cathode materials in solid state batteries. As nearly the entire periodic table can be deposited using ALD, these are two of many cations that can be considered useful in SSE materials, and their specific reference in no way limits the applicability of any other suitable materials.

One feature of this invention relies on the ability to deposit controlled quantities of material on the surfaces of SSE particles or SSE surfaces, where the typical conductivity of the coating materials is known to be insufficient for use as an electrolyte material, for example those with conductivities less than $1\times10^{-6}$ S $cm^{-1}$. This is derived from the typical increase in protective benefits provided by an ALD coating of increasing thickness, and the typical decrease in usability of the substrate in its intended role with a similarly increasing thickness. As this invention further allows the SSE materials to be solvent castable in layers, there is a feature of tailoring the composition of a plurality of layers by utilizing coated SSE materials with different coating properties, to thereby produce a gradient when these plurality of layers are viewed in aggregate (for instance an air-protective layer, a sacrificial layer for casting, and an interface layer for improving battery performance and multiples. Similarly, if the materials are gas-phase deposited directly onto a moving substrate using a spray drying, plasma spray process, etc., downstream-deposited materials may have a different set of compositions or properties than those deposited upstream.

Any of the particles made in such a preliminary particle-manufacturing step can be directly produced in a particle production process using an convenient continuous flow process, can be delivered into a weigh batching system with a metering valve (rotary airlock or similar), and can then enter into the process described in the present invention.

Molecular layer deposition (MLD) processes are conducted in a similar manner, and are useful to apply organic or inorganic-organic hybrid coatings. Examples of MLD methods are described, for example, in U.S. Pat. No. 8,124,179, which is incorporated herein by reference in its entirety.

ALD and MLD techniques permit the deposition of coatings of about 0.1 to 5 angstroms in thickness per reaction cycle, and thus provide a means of extremely fine control over coating thickness. Thicker coatings can be prepared by repeating the reaction sequence to sequentially deposit additional layers of the coating material until the desired coating thickness is achieved.

Reaction conditions in vapor phase deposition processes such as ALD and MLD are selected mainly to meet three criteria. The first criterion is that the reagents are gaseous under the conditions of the reaction. Therefore, temperature and pressure conditions are selected such that the reactants are volatilized when the reactive precursor is brought into contact with the powder in each reaction step. The second criterion is one of reactivity. Conditions, particularly temperature, are selected such that the desired reaction between the reactive precursor and the particle surface occurs at a commercially reasonable rate. The third criterion is that the substrate is thermally stable, from a chemical standpoint and from a physical standpoint. The substrate should not degrade or react at the process temperature, other than a possible reaction on surface functional groups with one of the reactive precursors at the early stages of the process. Similarly, the substrate should not melt or soften at the process temperature, so that the physical geometry, especially pore structure, of the substrate is maintained. The reactions are generally performed at temperatures from about 270 to 1000 K, preferably from 290 to 450 K.

Between successive dosings of the reactive precursors, the particles can be subjected to conditions sufficient to remove reaction products and unreacted reagents. This can be done, for example, by subjecting the particles to a high vacuum, such as about $10^{-5}$ Torr or greater, after each reaction step. Another method of accomplishing this, which is more readily applicable for industrial application, is to sweep the particles with an inert purge gas between the reaction steps. This sweep with inert gas can be performed while the particles are being transported from one reactor to the next, within the apparatus. Dense- and dilute-phase techniques, either under vacuum or not, are known to be suitable for the pneumatic conveying of a wide variety of industrially relevant particles that would be well-served by the functionalization process described herein.

The starting powder can be any material which is chemically and thermally stable under the conditions of the deposition reaction. By "chemically" stable, it is meant that the powder particles do not undergo any undesirable chemical reaction during the deposition process, other than in some cases bonding to the applied coating. By "thermally" stable, it is meant that the powder does not melt, sublime, volatilize, degrade or otherwise change its physical state under the conditions of the deposition reaction.

The applied coating may be as thin as about 1 angstrom (corresponding to about one ALD cycle), and as thick as 100 nm or more. A preferred thickness range is from 2 angstroms to about 25 nm.

Figure 19:
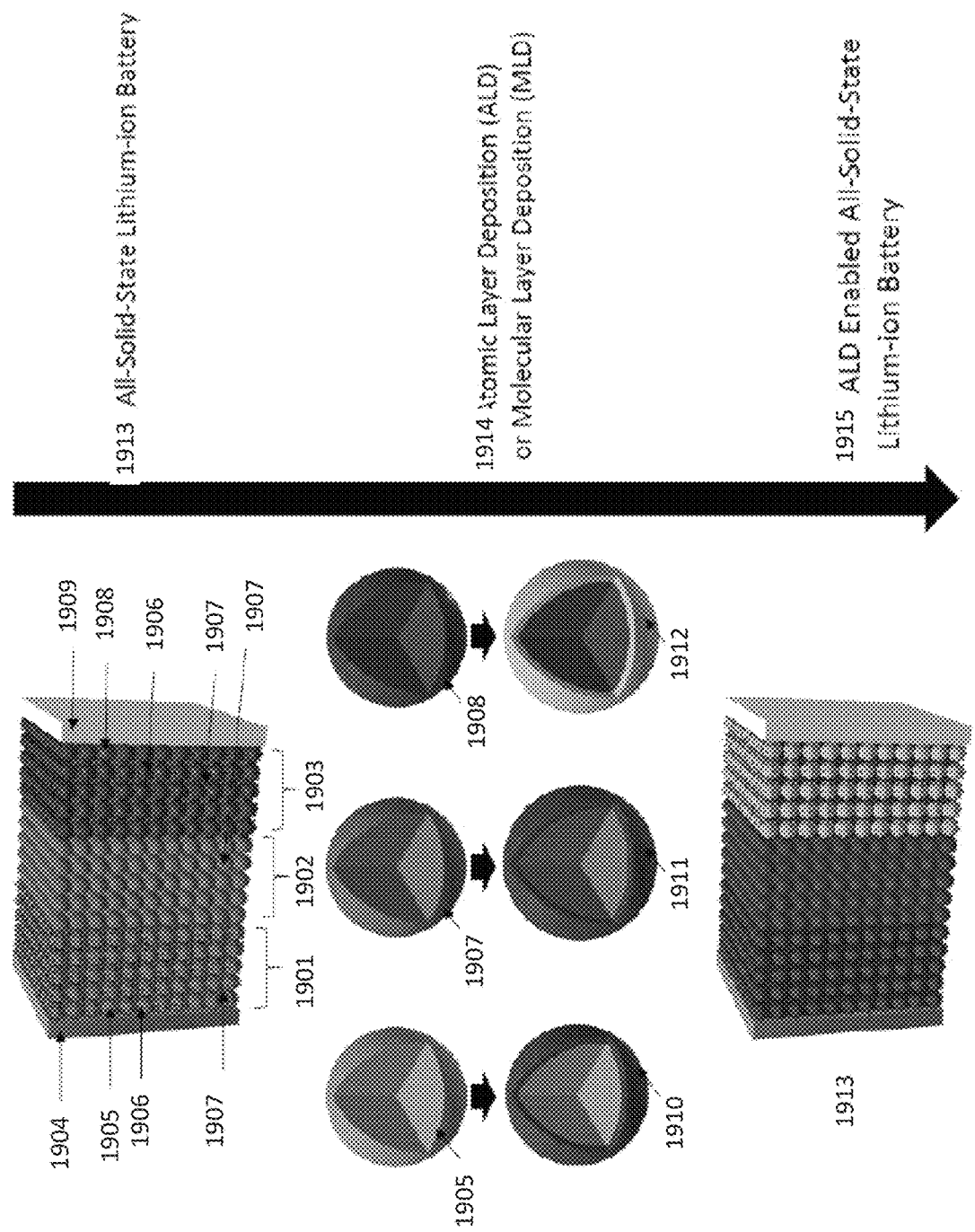
FIG. 19 shows schematic of an ALD-coated all-solid-state lithium ion battery.
Figure 20:
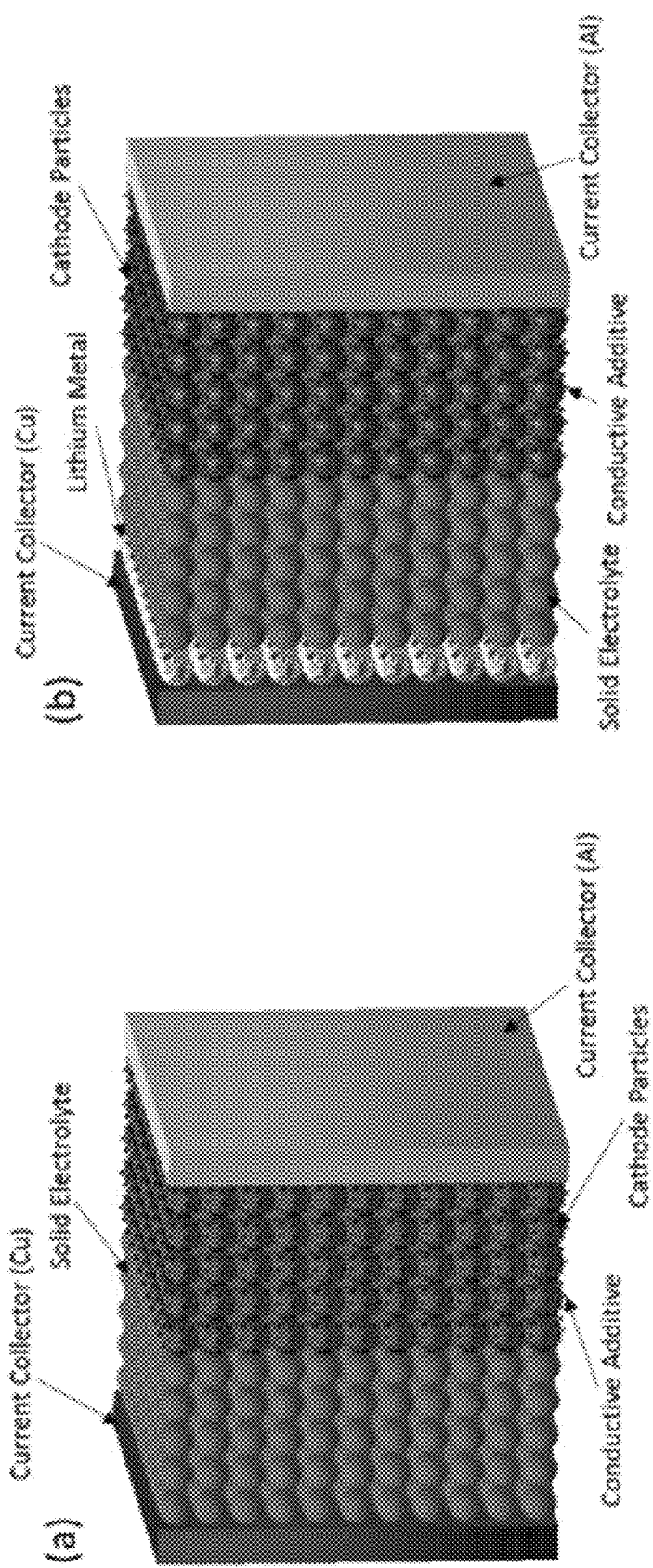
FIG. 20 shows: (A) schematic of one embodiment of the present invention that includes no anode; and (B) schematic of another embodiment of the present invention that includes a lithium metal anode.
Figure 21:
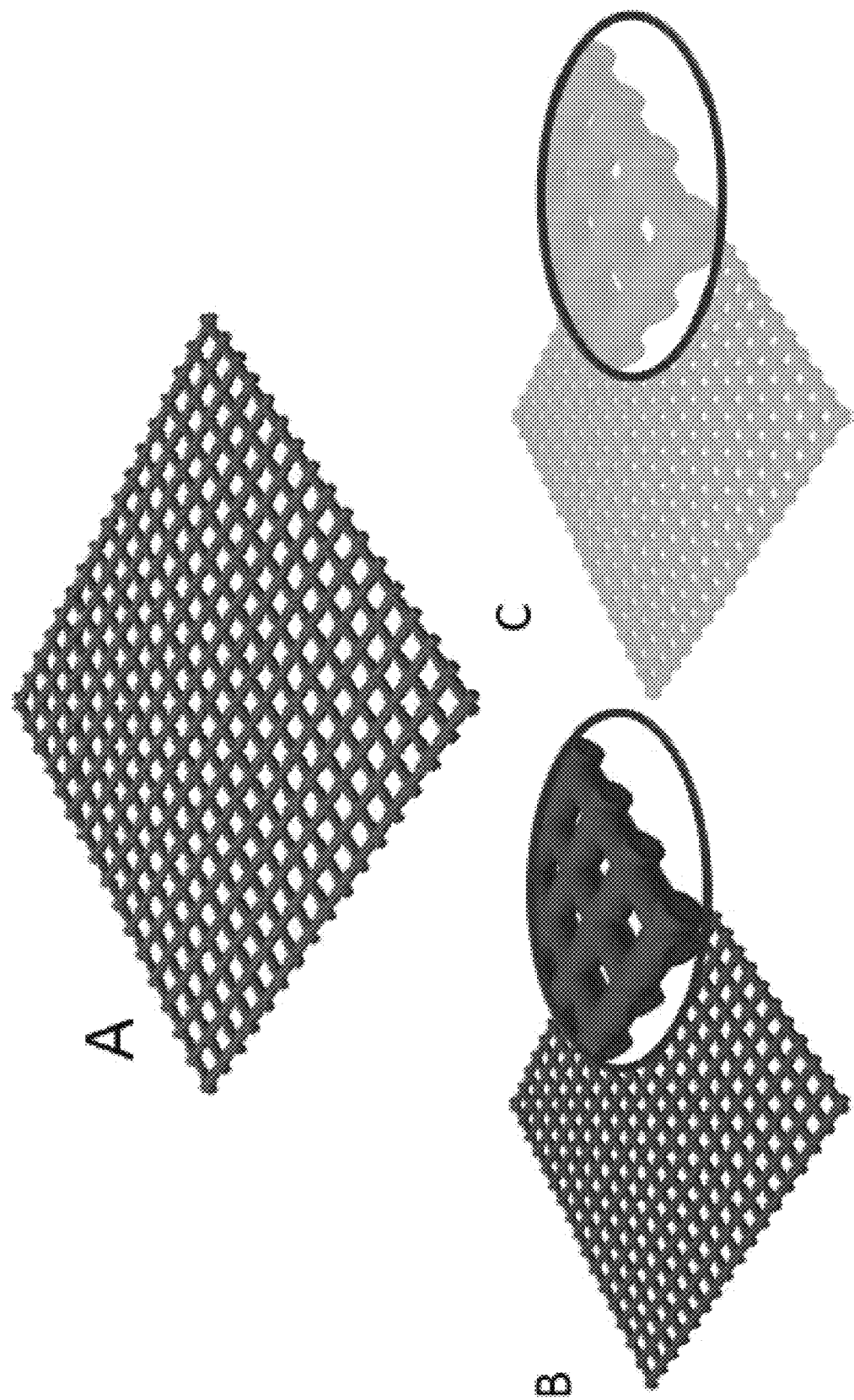
FIG. 21 shows: (A) schematic of microporous grid, separator, membrane, fabric, planar foam or other semi-rigid, permeable scaffold; (B) schematic of a first ALD coating applied to the scaffold of (A), where the first ALD coating represents a solid state electrolyte coating possessing a sufficient ionic conductivity with negligible electrical conductivity, whereas the first ALD coating may also be utilized to reduce the pore size of the scaffold of (A); and (C) schematic of a second ALD coating applied to the first ALD coated scaffold of (B), where the second ALD coating represents an environmental barrier coating that does not decrease the ionic conductivity by more than a factor of two, nor increase the electrical conductivity relative to (B), whereas the second ALD coating may also be utilized to reduce the pore size of the scaffold of (B).

An All-Solid-State Lithium-ion Battery (1913) and an ALD Coated All-Solid-State Lithium-ion Battery (1915) are shown in FIG. 19. The All-Solid-State Lithium-ion Battery (1913) comprises an Anode Composite Layer (1901) which comprises a combination of Anode Active Material (1905), Conductive Additive (1906), and Solid Electrolyte (1907), which is in contact with an Anode Current Collector (1904). Similarly, a Cathode Composite Layer (1903) comprises a combination of Cathode Active Material (1908), Conductive Additive (1906), and Solid Electrolyte (1907), which is in contact with a Cathode Current Collector (1909). The two layers, the Anode Composite Layer (1901) and the Cathode Composite Layer (1903), are separated by a Solid Electrolyte Layer (1902) which can be entirely composed of Solid Electrolyte (1907). Solid Electrolyte (1907) may be composed of one solid electrolyte material or a plurality of materials, for example as an ALD coating of a solid electrolyte material onto a different solid electrolyte material, or two layers of solid electrolyte materials, or a coated electrolyte (e.g., coated with ceramic, electrolyte, conductive materials), or a combination of solid electrolyte materials (e.g., two different solid electrolytes—one in contact with anode and one in contact with cathode—each optionally having a different ALD coating on it).

As show in FIG. 19, the All-Solid-State Lithium-ion Battery (1913) can be transitioned to an ALD Coated All-Solid-State Lithium-ion Battery (1915) through the Atomic Layer Deposition (1914) process in which atomic layer deposition is used to encapsulate the particles of Anode Active Material (1905), Conductive Additive (1906), and Solid Electrolyte (1907), and/or Cathode Active Material (1908). In some embodiments, Anode Active Material (1905) has Anode ALD Coating (1910), Conductive Additive (1906) has Conductive Additive ALD Coating, Solid Electrolyte (1907) has Solid Electrolyte ALD Coating (1911), and Cathode Active Material (1908) has Cathode ALD Coating (1912). In some embodiments, Anode Active Material (1905), Conductive Additive (1906), and Solid Electrolyte (1907), and Cathode Active Material (1908) have the same coating in which Anode ALD Coating (1910), Conductive Additive ALD Coating, Solid Electrolyte ALD Coating (1911), and Cathode ALD Coating (1912) are the same material applied by ALD (but can be different layers/thicknesses). In another embodiment Anode ALD Coating (1910), Conductive Additive ALD Coating, Solid Electrolyte ALD Coating (1911), and Cathode ALD Coating (1912) are different coatings (at different thicknesses).

The ratios of Anode Active Material (1905):Conductive Additive (1906):Solid Electrolyte (1907) and Cathode Active Material (1908):Conductive Additive (1906):Solid Electrolyte (1907) can range widely depending on the desired performance of the cell. Similar to electrodes for conventional liquid electrolyte batteries, solid-state electrodes can be a composite made of active material (AM), conductive additive (CA), and electrolyte. The active material, such as $LiCoO_2$ for a cathode and/or graphite for an anode, stores the lithium moving through the battery during charging and discharging. The conductive additive, which is commonly a carbon material such as acetylene black or carbon nanotubes, acts as a means to ensure rapid electron transport through the electrode to the current collector. Electrolyte is necessary within the electrode to ensure rapid ion transport into and out of the electrode as a whole. Different from liquid electrolyte batteries, however, solid state batteries utilize the solid electrolyte as both separator and electrolyte, which simplifies the system as compared to liquid electrolyte batteries which requires a polymer-based separator between the electrodes. Moreover, having the solid electrolyte act as the separator ensures intimate contact with the electrodes as well as an unbroken path for ion conduction. Furthermore, due to the physical separation of the electrodes by the solid electrolyte, reactions at either electrode would not indirectly cause problems at the other electrode, such as with batteries utilizing a Mn-containing cathode material which has been found to cause parasitic losses at the graphite based anode via indirect contact through the liquid electrolyte.

Another important benefit of a solid-state battery is the capability to construct a "lithium-free" battery in which there is no anode composite or bulk lithium metal foil to act as an anode to form a lithium battery. In a Li-free battery, a cell is constructed such that during the first charging cycle, metallic lithium is electroplated in between the solid electrolyte and the thin film current collector. While this design follows the concept of a Li-metal battery which is capable of high energy density. Such battery is safer as there is no excess Li with can lead to dangerous conditions if punctured. This design leads to significant improvement in realizable energy density resulting from high loading of active materials in the cathode, a virtual elimination of the current collector and separator, and a high packing efficiency due to the solid structure.

In designing a battery from the ground up, one should ensure the highest relative weight of active material in order to maintain the highest possible energy density. Ideally, a battery would comprise solely of a cathode with 100% active material and an anode with 100% active material. However, because active materials are typically designed for lithium storage and not ion/electron conduction, it is desirable to generate a composite electrode with conductive additive and solid electrolyte to ensure target performance metrics through faster electron/ion conduction. While excess proportions of both the conductive additive and solid electrolyte can be used to increase powder density with faster electron/ion transport, doing so may reduce the relative ratio of active material within an electrode thereby reducing the highest energy density the battery can achieve.

Ratios of active material:solid electrolyte:conductive additive can range widely, preferably from about 5:30:3 to about 80:10:10, or from about 1:30:3 to about 95:3:2, for both anode and cathode composites, or up to 97:3:0 if SSE ALD coated cathode active materials are used. In one case can have a lithium battery with a lithium anode. In another case can have lithium-free battery where initial cycle deposits lithium for later cycling. In some embodiments, powders of pristine active material and/or coated active material are used to prepare a slurry with precursors for the solid electrolyte materials, which are run through a slurry spray pyrolysis system. In other words, rather than blending finished particles, one can create composite materials and then apply a final protective coating.

In some embodiments of the battery described herein, the composite cathode can comprise a high voltage lithium manganese nickel oxide spinel (e.g., $LiMn_{1.5}Ni_{0.5}O_4$ (LMNO)) with a maximum capacity of 147 Ah $kg^{-1}$ when cycled between 3.5-5.0 V having an average voltage of 4.7 V, yielding a maximum energy density of a lithium battery based on LMNO to be 690 Wh $kg^{-1}$. In some embodiments, the composite cathode further comprises a sulfur based solid electrolyte (e.g., $Li_{10}SnP_2S_{12}$ (LSPS)) with high ionic conductivity up to $10^{-2}$ S $cm^{-1}$, and a conductive additive (e.g., Super C65) which has demonstrated good results with LMNO in liquid electrolyte batteries. LMNO has a theoretical density of 4.45 g $cm^{-3}$ from which an estimated realizable pellet density of 3.4 g $cm^{-3}$ can be derived from previous demonstrations of similar materials. Assuming a complete filling of the remaining porosity in the pellet with the LSPS having density 2.25 g $cm^{-3}$, an 87:13 weight ratio of LMNO and LSPS can be obtained. For the solid-state composite battery, 82% of the theoretical energy density can be achieved as follows:

$$0.87 \times 0.99 \times 0.95 \div 1.09 = 82\%$$

where 0.95 is from packing efficiency which is often achieved in pouch cells, 0.99 is from 1 wt % of CA, and 1.09 from 9 μm of LSPS electrolyte with respect to a 110 μm total thickness of battery cathode, electrolyte, and anode layers. As a result, the energy density of the solid-state Li battery is projected to be 565 Wh $kg^{-1}$ from:

$$690 \text{ Wh kg}^{-1} \times 82\% = 565 \text{ Wh kg}^{-1}.$$

Because LMNO maintains its high capacity of 147 Ah $kg^{-1}$ at high rate, using a nominal cycling rate of 2C/2C for charge and discharge a minimum power density of the all-solid-state Li-ion battery was calculate to be over 1 kW kg$^{-1}$:

$$565 \text{ Wh kg}^{-1} \times 2C \text{ h}^{-1} = 1130 \text{ W kg}^{-1}.$$

Table 1 shows a comparison between one example of a proposed all-solid-state Li-ion battery and a state-of-the-art Li-ion battery. The typical state-of-the-art Li-ion battery contains numerous inactive materials such as porous polymer separator, metal foil current collectors, and packaging and safety devices that do not contribute to energy storage. These inactive components are responsible for 37% of the total weight of a battery cell (see Table 1). In addition, each electrode contains up to 12.5% polymer binder which brings the highest achievable energy density even lower. The solid-state composite battery described herein would allow the use of electrolyte and current collectors in thin film form, eliminating most of the inactive weight. Moreover, high loading of active materials in the electrode allowed by the solid-state composite electrode design and high packing efficiency due to the solid structure further improve the realizable energy density of the all-solid-state described herein.

TABLE 1

Comparison between the proposed all-solid-state battery and a state-of-the-art battery described by Argonne National Labs.

| Battery Component | Weight Percentage (%) | |
| --- | --- | --- |
| | Liquid SOA | All-Solid-State composite Battery |
| Composite Cathode | 41 | 90 |
| Composite Anode | 16 | <1 |
| Separator | 2 | 0 |
| Electrolyte | 18 | <5 |
| Aluminum Current Collector | 2 | <0.2 |
| Copper Current Collector | 4 | <0.2 |
| Other components including safety devices | 17 | 5 |
| Total Weight | 100 | 100 |

The following examples are provided to illustrate coating processes applicable to making the compositions of the invention. These examples are not intended to limit the scope of the inventions. All parts and percentages are by weight unless otherwise indicated.

Working Examples

Example 1

Material Processing

ALD Coating of SE Materials: 10 g of pristine SE (LPS, NEI Corp.) samples were loaded into a standard stainless steel fluidized bed reactor under Ar atmosphere and connected to a PneumatiCoat PCR reactor to conduct ALD. For proof-of-concept, low quantities of SE powder were ALD-coated using a fluidized bed system instead of a high throughput system. The sample was placed under minimum fluidization conditions in which 100 sccm of $N_2$ was flowed for the entirety of the ALD process. ALD was performed at 150° C. to prevent the SE from any additional heat treatment and reactivity during the ALD process. Due to the potentially reactive nature of the SE with the precursors TMA/$H_2O$ for $Al_2O_3$ and $TiCl_4$/$H_2O_2$ for $TiO_2$ a timed schedule was used to apply 4, 8, and 20 layers of $Al_2O_3$ and $TiO_2$, respectively. For $Al_2O_3$ coatings the TMA was applied for 15 minutes and the $H_2O$ for 7.5 minutes, with 10 minute vacuum purging steps between. For $TiO_2$ coatings the $TiCl_4$ was applied for 10 minutes and the $H_2O_2$ for 20 minutes, with 15 minute vacuum purging steps between.

ALD Coating of Electrode Samples 1: 1.5 kg of Lithium Nickel Manganese Oxide (LMNO) powder (SP-10, NEI Corp.) was processed through the PCT high throughput reactor to produce 250 g sample batches of 2, 4, and 8 cycle $Al_2O_3$ coated materials. During this high throughput process, Trimethylaluminum (TMA) is used as Precursor A and Deionized Water ($H_2O$) is used as the second precursor (Precursor B). Each precursor is applied in series using the PCT patented semi-continuous reactor system in appropriate quantities as determined using the specific surface area and quantity of particles being processed. Similarly, 2, 4, and 8 cycle $TiO_2$ ALD coated LMNO samples were generated using Titanium Tetrachloride ($TiCl_4$) as Precursor A and Hydrogen Peroxide ($H_2O_2$) as Precursor B. All samples were handled in air before being dried in a vacuum oven at 120° C. and moved into the Argon filled glovebox for later processing.

ALD Coating of Electrode Materials 2: 1 kg of pristine Lithium Nickel Cobalt Aluminum Oxide (NCA) powder (NCA-7150, Toda America) was processed through the PCT high throughput reactor to produce 250 g samples of 2, 4, 6, and 7 cycle $Al_2O_3$ coated materials. Similarly, 2, 4, and 8 cycle $TiO_2$ ALD coated NCA samples were generated using Titanium Tetrachloride ($TiCl_4$) as Precursor A and Hydrogen Peroxide ($H_2O_2$) as Precursor B. All samples were handled in air before being dried in a vacuum oven at 120° C. and moved into the Argon filled glovebox for later processing.

Example 2

Material Characterization

Conductivity of SE Materials: Electrolyte pellets were formed by cold pressing 200 mg of SE powder to 8 tons, using a polytetrafluoroethylene (PTFE) die ($\phi$=0.5 in) and Titanium metal rods for both pelletization and as current collectors for both working and counter electrodes. Li foil (MTI, 0.25 mm thick) is then attached to both sides of the electrolyte and the cell configuration secured. Electrochemical impedance analysis (EIS) is performed using a Solartron 1280 Impedance analyzer at a frequency range of 1 MHz to 2 Hz and an AC Amplitude of 10 mV. All pressing and testing operations are carried out in an Ar-filled glove box.

Cyclic Voltammetry of SE Materials: Electrolyte pellets were formed by cold pressing 200 mg of SE powder to 8 tons, using a polytetrafluoroethylene (PTFE) die ($\phi$=0.5 in) and Titanium metal rods for both pelletization and as current collectors for both working and counter electrodes. Li foil (MTI, 0.25 mm thick) is then attached to one side of the electrolyte and cyclic voltammetry performed on a Solartron 1280 using cutoff voltages of −0.5 V and 5.0 V for 5 cycles with a scan rate of 1 mV/s. All pressing and testing operations are carried out in an Ar-filled glove box.

Air/Moisture Stability of SE Materials: 1 g of SE was loaded into a small fluidized bed reactor in an Ar-filled glovebox and connected to the PCR Reactor with a Residual Gas Analyzer (RGA) (Vision 2000-P, MKS Instruments). All atmospheric conditions were carefully removed from the system prior to testing in order to minimize any non-intended air/moisture from entering the reactor. Once sufficient vacuum conditions were met, the reactor was placed under vacuum for 5 minutes to remove the Ar. Following purging, the reactor was exposed to air/moisture through the application of dry compressed air at a flow rate equivalent of a 5 torr increase in pressure while vaporized $H_2O$ was applied at varying pressure.

Electrochemical Cell Fabrication and Testing: Composite cathodes were prepared by mixing LMNO powder or NCA powder as the active material (AM), solid electrolyte (SE) for fast lithium ion conduction, and acetylene black (MTI) as a conductive additive (CA) for electron conduction at a weight ratio of 1:30:3 for the AM:SE:CA, respectively. The SE and CA were mixed thoroughly using a mortar and pestle, followed by mixing-in of the AM. SE pellets were formed by pressing 100 mg of SE powder to 0.2 tons, using a polytetrafluoroethylene (PTFE) die ($\phi$=0.5 in) and Titanium metal rods for both pelletization and as current collectors for both working and counter electrodes. A 5 mg layer of the composite cathode material was then spread evenly on one side of the SE layer and the two-layer cell was pelletized by cold pressing (8 tons) for 1 min. Li foil (MTI, 0.25 mm thick) was then attached to the opposite side of the electrolyte and hand pressed. Galvanostatic charge-discharge cycling took place at cut off voltages of 2.5-4.5 V and 2.5-5.0 V for the LMNO, and 2.5-4.2 V and 2.5-4.5 V for the NCA to look at differences in stability imparted by ALD coatings. Cycling was performed at a current of C/20 for the first ten cycles followed by C/10 for the remaining cycles. All pressing and testing operations are carried out in an Ar-filled glove box.

Example 3

Results

ALD was performed on the SEs to make them more air/moisture tolerant as well as to observe any electrochemical effects. Using $Al_2O_3$ and $TiO_2$ as the coating chemistries applied to the SEs, three different levels of coating were targeted—4 cycles (2 nm), 8 cycles (4 nm), and 20 cycles (10 nm) of each ALD coating with 1 cycle roughly equivalent to about 0.1-1.0 nm thick shell around particles of solid electrolyte. For these initial trials TMA and $H_2O$ were used as the precursors as they are the most commonly accepted precursors for applying ALD to any substrate powder. Initial consideration was given to using TMA and Isopropyl Alcohol (IPA) precursors to avoid $H_2O$ exposure to the powders, but in the interest of producing these coatings on a commercial scale the most viable high-throughput-capable candidates should be investigated. For the $TiO_2$ coating $TiCl_4$ and $H_2O_2$ were used. Initial consideration was given to avoiding the use of $H_2O_2$ due to its strong likelihood to react negatively with the SE due to the general sensitivity of the electrolyte. Similar to the justification for $H_2O$ as the second precursor for applying $Al_2O_3$, it was decided to use the most well understood and the least complex method for proof-of-concept.

Figure 22:
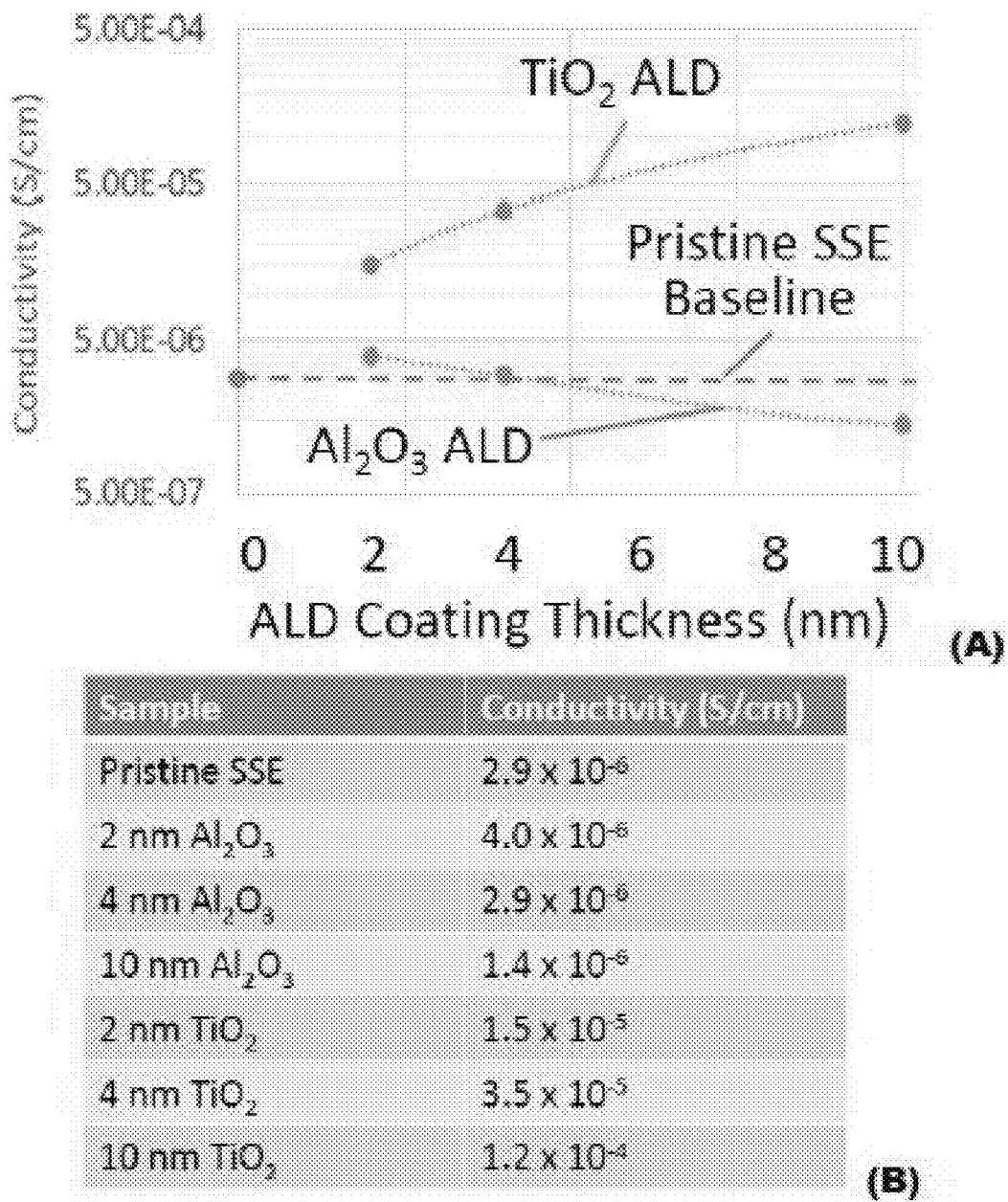
FIG. 22 shows the ionic conductivity of ALD-coated SSE particles, where <4 nm of $Al_2O_3$ and 10 nm of $TiO_2$ neither reduce the ionic conductivity, nor increase the electrical conductivity, of the substrate.

Observation of the conductivity of these ALD-coated samples are shown in FIG. 22(A). Lower number of cycles of $Al_2O_3$ exhibited an increase in conductivity. However, higher number of cycles of $Al_2O_3$ coated samples exhibited a decrease in conductivity. This is likely because higher number of cycles of ALD would increase resistance when coating with a ceramic, but lower number of cycles would result in improved material properties due to the protection obtained from $Al_2O_3$ in which the thin shell imparts no excess impedance because it is thin. Interestingly, unexpected results were found for $TiO_2$ coated SE samples—higher number of ALD cycles also exhibited a significant increase in conductivity for $TiO_2$ coated SE. Specifically, a nearly two orders of increase in conductivity was observed for the 20 cycle $TiO_2$ sample as compared to the pristine electrolyte, as shown in FIG. 22(B).

Figure 23:
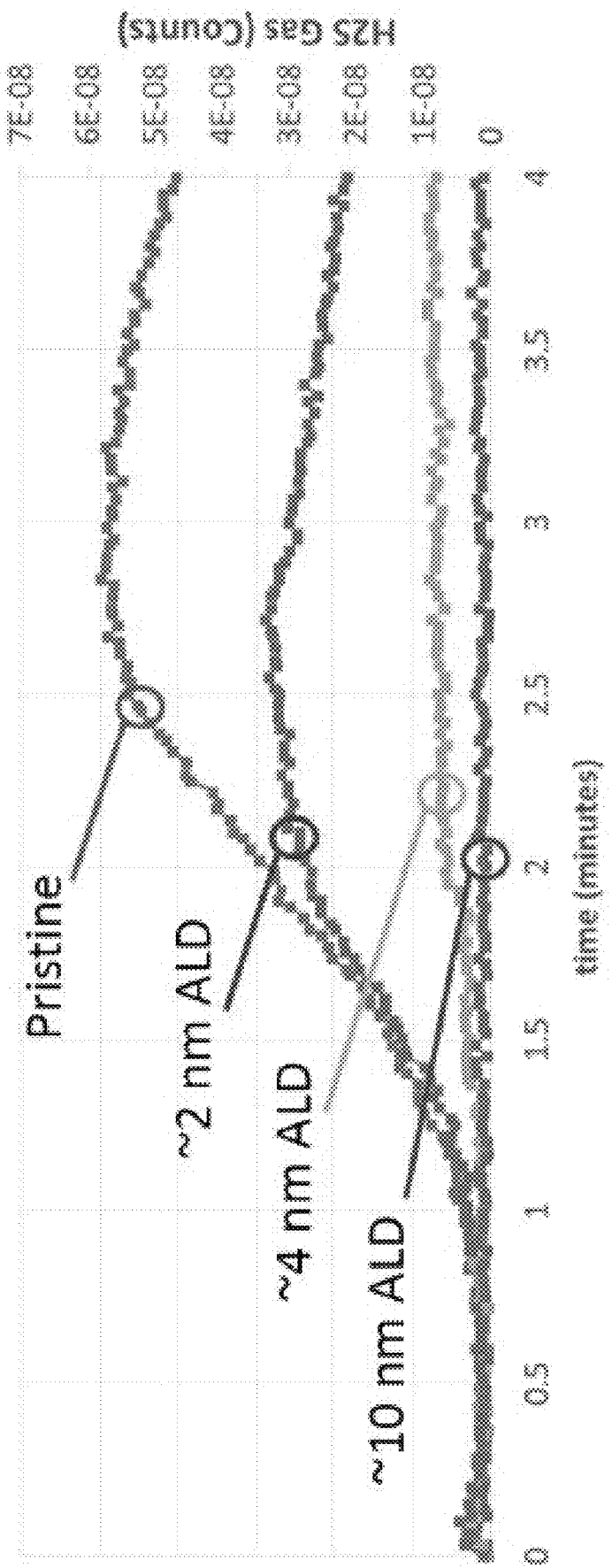
FIG. 23 depicts the environmental barrier performance of varying thicknesses of ALD coatings applied to SSE particles, where an increasing performance benefit is observed with increasing thickness. The barrier coating is preventing ingress of $H_2O$ and egress of $H_2S$ from the sulfide-based SSE substrate.

The capability of ALD to reduce the SE sensitivity to air and moisture while at the same time improving cell performance was investigated. Stabilizing the SE to air allows a realistic commercialization path in which SEs can be handled and used without the need for an inert environment, making them drop-in capable for existing battery manufacturing equipment. FIG. 23 shows the Pristine and coated SE reaction when being exposed to air and moisture. It was observed that $Al_2O_3$ coated SEs yielded a significantly reduced concentration of $H_2S$ gas. A strong correlation was observed in which increasing cycles of $Al_2O_3$ deposited on SEs results in a two-fold improvement: a reduced overall concentration of $H_2S$ gas output as well as a delayed reaction time. These data are an excellent indication of the positive benefits capable of being obtained by using ALD on the SEs.

Figure 25:
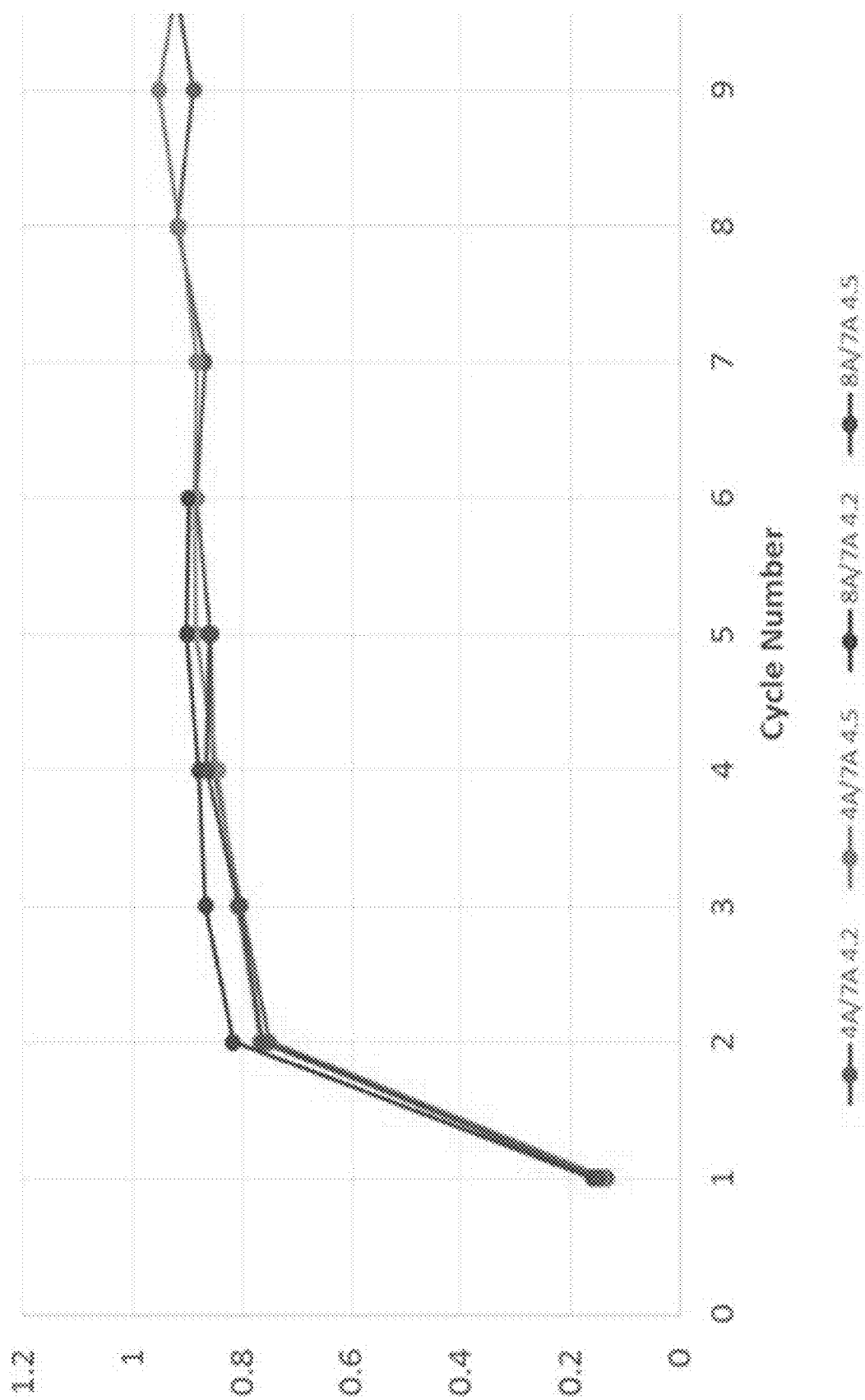
FIG. 25 shows coulombic efficiencies for best performing cells showing a rising efficiency for all samples. Plot labels indicate the type of SE, the type of NCA, and the upper cut-off voltage used, as for example, "8A/7A 4.2" indicates a cell made with 8 Cycle $Al_2O_3$-coated SE, 7 cycle $Al_2O_3$-coated NCA, and an upper cut-off voltage of 4.2 V.

High-capacity NCA was used to realize the extraordinary benefit to the all-solid-state cells through ALD-coatings. For proof-of-concept, only 7 Cycle $Al_2O_3$ coated NCA is shown. However, as can be seen in FIGS. 24 and 25, testing of the 7 Cycle $Al_2O_3$-coated NCA with the panel of available coated SEs is showing tremendous benefit from ALD. Here, it is observed that cells made with pristine SE and pristine NCA did not perform well, achieving only a first cycle discharge capacity of less than 5 mAh/g for both 4.2 V and 4.5 V cut-off voltages. However, upon the introduction of $Al_2O_3$-coated SEs, a significant improvement in cycling behavior was achieved. Multiple beneficial effects can be distilled from electrochemical cycling such as a much higher achievable reversible discharge capacity and high voltage cycling. For example, when comparing the P/7A 4.2, 4A/7A 4.2, and 8A/7A 4.2 curves in FIG. 24 and improvement in first cycle discharge capacity from 5 mAh/g, to 57 mAh/g, to 100 mAh/g, respectively, is observed. Similarly, when comparing both 4A/7A 4.2 and 4A/7A 4.5 curves and 8A/7A 4.2 and 8A/7A 4.5 curves, we see not only a capacity increase due to the higher cut-off voltage, but also a sustained capacity with the higher cut-off voltage indicating that the $Al_2O_3$ coatings on the SE and NCA allow stabilized higher voltage cycling. If high voltage can be sustained by the $Al_2O_3$ coatings on material then the overall energy density that can be achieved by this system increases dramatically.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Preferred embodiments of the present invention relate generally to electrochemical cells that include: Embodiment 1: an ionically-conductive coating for a cathode active material, an anode active material, or a solid state electrolyte for use in a battery. The coating includes a layer of coating material disposed on a surface of the cathode active material, the anode active material, or the solid state electrolyte of the battery; the layer of coating material including one or more of a metal, polymetallic or non-metal: (i) oxide, carbonate, carbide or oxycarbide, nitride or oxynitride, or oxycarbonitride; (ii) halide, oxyhalide, carbohalide or nitrohalide; (iv) phosphate, nitrophosphate or carbophosphate, or (v) sulfate, nitrosulfate, carbosulfate or sulfide.

The anionic combination descriptions above may represent from 0.1% to 99.5% of each combined anion, or 1% to 95%, 5% to 15%, 35% to 65%, or about 50%. By way of example, a polymetallic oxynitride may be represented as nitrogen-niobium-titanium-oxide, where the oxygen to nitrogen ratio may be 0.1:99.9, 5:95, 35:65 or 50:50; a metal nitrophosphate may include LiPON, AlPON or BPON. A non-metal oxide may include phosphorous oxide. A polymetallic oxide may include lithium-lanthanum-titanium-oxide or lithium-lanthanum zirconium-oxide, the latter of which may be deposited with alternating layers of Li—O, La—O, Zr—O. A polymetallic phosphate, lithium-aluminum-titanium-phosphate, may be deposited using alternating layers of $TiPO_4$, $Al_2O_3$ and $Li_2O$, or $LiPO_4$, $TiO_2$, $AlPO_4$, or $Li_2O$, $TiPO_4$ and $AlPO_4$, in any order, ratio or preferred composition.

The layer or layers of coating material, may be preferentially similar or different for any cathode active material, anode active material or solid state electrolyte material onto which each layer of coating material is disposed, and may be coated prior to the fabrication and formation of the electrochemical cell, or produced in situ after any formation step of the electrochemical cell itself.

Each layer of coating material may be further described as having structures that include (vi) amorphous; (vii) olivine; (viii) NaSICON or LiSICON; (ix) perovskite; (x) spinel; (xi) polymetallic ionic structures, and/or (xii) structures with preferentially periodic or non-periodic properties. The preferred embodiments of coating layers that combine one or more of the coating materials (i)-(v) with structures that can be described by one or more of (vi)-(xii), may further possess: (xiii) functional groups that are randomly distributed, (xiv) functional groups that are periodically distributed, (xv) functional groups that are checkered microstructure, and may include (xvi) 2D periodic arrangements, or (xvii) 3D periodic arrangements; however in all preferred embodiments the layer of coating material is mechanically-stable at the interface between the substrate material and the coating, independent of whether the composition, structure, functionality or arrangement is chemically-altered prior to the fabrication of the electrochemical cell, during the formation step of the electrochemical cell, or throughout the useful life of the electrochemical cell.

The coating of Embodiment 1, wherein the layer of coating material further includes one or more of a metal selected from a group consisting of: alkali metals; transition metals; lanthanum; boron; silicon; carbon; tin; germanium; gallium; aluminum; titanium, and indium. The coating of Embodiment 1, wherein the layer of coating material has a thickness of less than or equal to about 2,500 nm, or between about 2 nm and about 2,000 nm, or about 10 nm, or a thickness of about 5 nm to 15 nm. The coating of Embodiment 1, wherein the layer of coating material is uniform or non-uniform on the surface, conforms to the surface, and/or is preferentially continuous or discontinuous, either randomly or periodically, on the surface of any substrate.

In some embodiments, the thickness, uniformity, continuity and/or conformality may be measured using an electron microscope, and may preferentially have a deviation from a nominal value of at most 40%, most often 20%, and sometimes 10% or lower, across any or all coating materials. An additional unexpected observation of Embodiment 1 was that the features and benefits of some or all layers comprising one or more of (i)-(xvi) above coated on the cathode, anode or solid electrolyte materials could be achieved even with non-uniform, discontinuous and/or non-conformal layers, in which a minimum of 40% variation, most often 80% variation, oftentimes even up to 100% variation, yet at maximum up to 400% variation. With respect to frequency, standard deviations, reproducibility, and/or random error, the variation observations described herein generally hold true at least 95% of the time.

The coating of Embodiment 1, wherein the layer of coating material further includes one or more of: complexes of aluminum, lithium, phosphorous, boron, titanium or tin cations with organic species with hydroxyl, amine, silyl or thiol functionality, especially being derived from glycol, glycerol, glucose, sucrose, ethanolamine, or diamines. The coating of Embodiment 1, wherein the layer of coating material further includes alumina, titania, nitrogen-niobium-titanium oxide, or LiPON, and is coated on a lithium-nickel-manganese-cobalt-oxide (NMC) surface, a lithium-nickel-cobalt-aluminum-oxide (NCA) surface, or an NMC or NCA surface that is enriched or deficient in lithium, manganese, cobalt, aluminum, nickel or oxygen, where the term 'rich' or 'deficient' can generally imply at a 0.1% to 50% deviation from stoichiometry, sometimes 0.5% to 45%, oftentimes 5% to 40%, and most often 10% to 15%, 20% to 25%, or 35% to 40%.

The coating of Embodiment 1, wherein the layer of coating material is coated on a material comprising one or more of a graphite, lithium titanate, silicon, silicon alloy, lithium, tin, molybdenum containing surface, or may further be deposited on a carbon-based conductive additive, a polymeric binder material, a current collector that is used alongside any coated cathode active material, anode active material, or solid state electrolyte material of the electrochemical cell.

When a battery is made using materials from Embodiment 1, the layer of material deposited on the surface of the anode active material or the cathode active material can provide the battery with longer lifetime, higher capacity with number of charge-discharge cycles, reduced degradation of the constituent components, increase a discharge rate capacity, increase safety, increase the temperature at which thermal runaway occurs, and allow for safer higher voltage operation during natural or unnatural phenomena or occurrences.

A battery comprising one or more deposited material layers of Embodiment 1 can demonstrate a Peukert Coefficient that is either 0.1 lower than a battery devoid of said deposited material layer or layers, or 1.1 or lower, or both. The battery of Embodiment 1, wherein the layer of material deposited on the surface of the anode active material or the cathode active material allows the battery to pass a nail penetration test at a voltage of 4.05 V or higher, sometimes 4.10 V or higher, and sometimes 4.20 V or higher. A battery of Embodiment 1 can also demonstrate higher thermal runaway, with a thermal runaway temperature at least 25° C. higher, most often 35° C. higher and often 50° C. higher or more, relative to a battery that is devoid of one or more deposited layer materials on the surfaces of the constituent electroactive materials.

In some embodiments, the layer of material is coated on at least one of the cathode active material or the anode active material prior to mixing the coated at least one of the cathode or anode active material to form active material slurries for electrode casting for cells that are at least 2 Ah in size, most often at least 15 Ah, oftentimes at least 30 Ah and sometimes 40 Ah or larger, and wherein the layer of material mitigates gelation phenomena and occurrences during a battery manufacturing process. In this embodiment, the active material slurry viscosity is always less than 10 Pas over a shear rate range of 2 $s^{-1}$ to 10 $s^{-1}$ shear rates. The slurry viscosity using uncoated materials may be higher than 10 Pas at a shear rate of 5 $s^{-1}$, or higher than 5 Pa·s at a shear rate of 20 $s^{-1}$ or higher, whereas the slurry viscosity using active materials with deposited layer coating materials shows at least a 10% reduction, most often a 20% reduction, often a 30% reduction and sometimes a 40% reduction in viscosity at a given shear rate. In addition, the hysteresis behavior, as measured by the difference between the measured viscosity at increasing versus decreasing shear rates is at least 10% lower, most often 20% lower, oftentimes 30% lower, and sometimes 40% lower at a given shear rate.

In certain embodiments, the property improvements to a battery can be similarly enhanced using two or more distinct coating layer materials with a particular composition, structure, functionality, thickness or ordering, however when combined or cladded as a multi-layer, multi-functional coating, wherein layers in the multi-layer coating are arranged in a predetermined combination and a predetermined order to provide similar or different properties or functions compared to one another, such that the total coating has more or greater properties than a coating formed by any single distinct coating layer.

In certain embodiments, the layer of material forms strong bonds between coating atoms and surface oxygen. In certain embodiments, the layer of material is coated on at least one of the anode or cathode active materials for use of the active materials with a BET of greater than 1.5 $m^2/g$ and particle size of the active materials smaller than 5 µm. In some embodiments, the layer of material is coated on at least one of the anode or cathode active materials to form electrodes that do not contain additives besides the coated active materials, and/or utilize electrolytes that have fewer or no electrolyte additives.

In some embodiments, the layer of material is coated on at least one of the anode or cathode active materials for at least one of controlled surface acidity, basicity, and pH, where the pH of the active material substrate with said layer of coating material is at least 0.1 higher or lower than that of the active material substrate devoid of a layer of coating material. Control over pH and other aspects of surfaces and compositions has practical ramifications in battery manufacturing, as electrodes cast from active materials comprising a layer of coating material may become more advantageous for aqueous, UV, microwave, or e-beam slurry preparation and electrode casting, curing and/or drying.

The materials that include a layer of coating material may reduce the required energy input or time to process, cure, dry or otherwise carry out a step in a manufacturing process by at least 5%, most often by at least 10%, often by at least 15% and sometimes by at least 20%. In addition, certain embodiments wherein the layer of material is coated on at least one of the anode or cathode active materials provide for electrode and battery manufacturing without environment humidity control.

In some embodiments wherein the layer of material is coated on at least one of the anode or cathode active materials for battery production with a simplified or eliminated formation step. In some embodiments, the formation time or energy consumption or both are reduced by at least 10% relative to battery production without said layer of material. In other embodiments, the layer of material is coated on at least one of the anode or cathode active materials for increased wettability of electrodes with electrolyte, changing the contact angle by at least 2°, most often by 5°, and sometimes by 10° or more.

In some embodiments, the layer of material forms strong bonds between coating atoms and surface oxygen. As embodied herein, the layer of material may be coated on at least one of the anode or cathode active materials for use of the active materials with a BET of greater than 1.5 $m^2/g$ and particle size of the active materials smaller than 5 µm, and may be used to further reduce gas generation by at least 1%, most often by 5%, sometimes by 10% and even by 25% or more.

Further, the elements or components of the various embodiments disclosed herein may be used together with other elements or components of other embodiments.

It is intended that the specification and examples be considered as exemplary only, with a true scope and spirit of the invention being indicated by the following claims.

We claim:

1. A solid state battery comprising a solid electrolyte layer which comprises a solid electrolyte particle coated by a protective coating, wherein the protective coating has a thickness of 100 nm or less and is obtained by atomic layer deposition (ALD) or molecular layer deposition (MLD),
   wherein the deposited protective coating has an ionic conductivity of $10^{-6}$ S $cm^{-1}$ or lower, and the solid electrolyte layer maintains an ionic conductivity of at least $10^{-6}$ S $cm^{-1}$ after 1 hour of exposure to ambient air;
   wherein the solid electrolyte particle coated by the protective coating is castable using a solvent comprising water or a solvent comprising N'-methylpyrrolidone (NMP); and
   wherein the solid electrolyte particle is encapsulated within the protective coating.

2. The solid state battery of claim 1, wherein the solid electrolyte particle comprises a lithium-conducting sulfide-based, phosphide-based or phosphate-based compound, an ionically-conductive polymer, a lithium or sodium superionic conductor, or an ionically conductive oxide or oxyfluoride.

3. The solid state battery of claim 1, wherein the solid electrolyte particle has a diameter of 60 µm or less.

4. The solid state battery of claim 1, wherein the solid electrolyte particle has a diameter of 10-500 nm and a surface area of 0.01 $m^2/g$ to 200 $m^2/g$.

5. The solid state battery of claim 1, wherein the protective coating has a thickness of 0.2-25 nm.

6. The solid state battery of claim 1, wherein the protective coating is adjacent coated or uncoated particles in the solid electrolyte layer.

7. The solid state battery of claim 1, wherein the protective coating comprises alumina or titania.

8. The solid state battery of claim 7 wherein the protective coating comprises alumina.

9. The solid state battery of claim 1, further comprising a cathode composite layer in contact with the solid electrolyte layer.

10. The solid state battery of claim 1, wherein the cathode composite layer comprises a cathode active material mixed with a conductive additive and a solid electrolyte.

11. The solid state battery of claim 10, wherein the cathode active material comprises a lithium metal oxide, lithium metal phosphate, sulfur, lithium sulfide, metal sulfide, lithium metal sulfide, metal fluoride, metal oxyfluoride, lithium metal fluoride, lithium metal oxyfluoride, or lithium excess material.

12. The solid state battery of claim 10, wherein the cathode active material comprises a cathode particle coated by a protective coating having a thickness of 100 nm or less, wherein optionally the protective coating of the cathode particle in the cathode composite layer and the protective coating of the solid electrolyte particle in the solid electrolyte layer comprise the same material.

13. The solid state battery of claim 1, further comprising an anode composite layer in contact with the solid electrolyte layer.

14. The solid state battery of claim 13, wherein the anode composite layer comprises an anode active material mixed with a conductive additive and a solid electrolyte.

15. The solid state battery of claim 14, wherein the anode active material comprises a carbon-based material, silicon, tin, aluminum, germanium, a metal alloy, a prelithiated metal, lithium, an oxide compound, or a mixture or combination thereof.

16. The solid state battery of claim 14, wherein the anode active material comprises an anode particle coated by a protective coating having a thickness of 100 nm or less, optionally wherein the protective coating of the anode particle in the anode composite layer and the protective coating of the solid electrolyte particle in the solid electrolyte layer comprise the same material.

17. The solid state battery of claim 1, which has a first cycle discharge capacity that is at least 100% higher than a corresponding solid state battery in which the solid electrolyte particle in the solid electrolyte layer is not coated by a protective coating when both the solid state battery and the corresponding solid state battery are fabricated under the same environment.

18. The solid state battery of claim 1, wherein the protective coating controls growth of native oxide on the solid electrolyte particle in ambient air to no more than about 5 nm in thickness, and/or maintains an oxygen content of the solid electrolyte particle to no more that about 5% after exposure to ambient air for 24 hours.

19. A cathode composite layer for a solid state battery, comprising a cathode active material mixed with a solid electrolyte material, wherein the cathode active material comprises a plurality of cathode particles each coated by a first protective coating, and wherein the solid electrolyte material comprises a plurality of solid electrolyte particles each coated by a second protective coating.

20. The cathode composite of claim 19 wherein the protective coating comprises $Al_2O_3$, $TiO_2$, or LiPON.

21. The cathode composite of claim 20 wherein the protective coating comprises $Al_2O_3$.

22. The cathode composite of claim 20, wherein the cathode particles comprise NCA, NMC, or LMR-NMC.

23. A solid state battery comprising a solid electrolyte layer which comprises a solid electrolyte particle coated by a protective coating, wherein the protective coating has a thickness of 100 nm or less and is obtained by atomic layer deposition (ALD) or molecular layer deposition (MLD),
wherein the solid electrolyte particle comprises one or more selected from the group: a lithium-conducting sulfide-based, phosphide-based or phosphate-based compound; an ionically-conductive polymer; a lithium and/or sodium super-ionic conductor (LiSICON, NaSICON or LiNaSICON); an ionically-conductive oxide or oxyfluoride; a Garnet; a Perovskite; Na Beta alumina; $xLi_2S-(1-x) P_2S_5$ where x is a molar ratio and ranges from 10 to 90; $Li_xGe_yP_zS_4$ where $2.3<x<4$, $0<y<1$ and $0<z<1$; $Li_3P$; lithium aluminum titanium phosphate; an ionically-conductive polymer based upon polyethylene oxide or thiolated materials (e.g. polyethylene-diethoxythiophene or PEDOT); lithium lanthanum titanate, tantalate or zirconate; lithiated and non-lithiated bismuth or niobium oxide and oxyfluoride; lithiated and non-lithiated barium titanate; lithium phosphorus sulfide; and lithium tin phosphorus sulfide;
wherein the protective coating comprises one or more selected from the group: a metal oxide; a metal nitride; a metal oxynitride; a metal carbide; a metal oxycarbide; a metal carbonitride; a metal phosphate; a metal sulfide; a metal fluoride; a metal oxyfluoride; a metal oxyhalide; a non-metal oxide; a non-metal nitride; a non-metal carbonitride; a non-metal fluoride; a non-metallic organic complex; a non-metal oxyfluoride; alumina; and titania; and wherein the solid electrolyte particle is encapsulated within the protective coating.

24. The solid state battery of claim 23, wherein the protective coating is adjacent coated or uncoated particles in the solid electrolyte layer.

25. The solid state battery of claim 23, wherein the protective coating comprises alumina or titania.

26. The solid state battery of claim 25 wherein the protective coating comprises alumina.

* * * * *